(12) United States Patent
Ell

(10) Patent No.: US 6,563,665 B1
(45) Date of Patent: May 13, 2003

(54) PQ ENHANCED OBSERVER BASED DUAL STAGE SERVO CONTROLLER

(75) Inventor: Travis E. Ell, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 367 days.

(21) Appl. No.: 09/620,778

(22) Filed: Jul. 21, 2000

Related U.S. Application Data

(63) Continuation-in-part of application No. 09/553,365, filed on Apr. 20, 2000.
(60) Provisional application No. 60/145,507, filed on Jul. 23, 1999.

(51) Int. Cl.[7] ............................................. G11B 5/596
(52) U.S. Cl. ............................. 360/78.05; 360/78.09
(58) Field of Search ........................ 360/78.05, 78.12, 360/78.09, 78.14, 75, 77.02

(56) References Cited

U.S. PATENT DOCUMENTS

| 5,452,275 A | 9/1995 | Ogawa | 369/44.11 |
| 5,510,939 A | 4/1996 | Lewis | 360/78.09 |
| 5,883,749 A | 3/1999 | Park | 360/75 |
| 5,920,441 A | 7/1999 | Cunningham et al. | 360/78.05 |

FOREIGN PATENT DOCUMENTS

| EP | 0 361 786 | 9/1989 | G11B/5/55 |
| EP | 0 924 689 A2 | 12/1998 | G11B/5/55 |

OTHER PUBLICATIONS

On Controller Design for Linear Time–Invariant Dual–Input Single–Output Systems, Steven J. Schroeck et al., Depart. of Mechanical Engineering and Data Storage System Center, Carnegie Mellon University, Pitts., PA.

Primary Examiner—Andrew L. Sniezek
(74) Attorney, Agent, or Firm—Joseph R. Kelly; Westman, Champlin & Kelly, P.A.

(57) ABSTRACT

The present invention includes a servo control system for controlling a dual stage actuator in a disc drive. The disc drive includes a data head for accessing information on a disc surface, and the dual stage actuator includes a coarse actuator and at least one fine actuator. The control system includes a fine actuator driver and a coarse actuator driver for driving the fine and coarse actuators, respectively. The control system also includes an observer which receives the coarse and fine actuator input signals and estimates a response of the coarse and fine actuators.

19 Claims, 66 Drawing Sheets

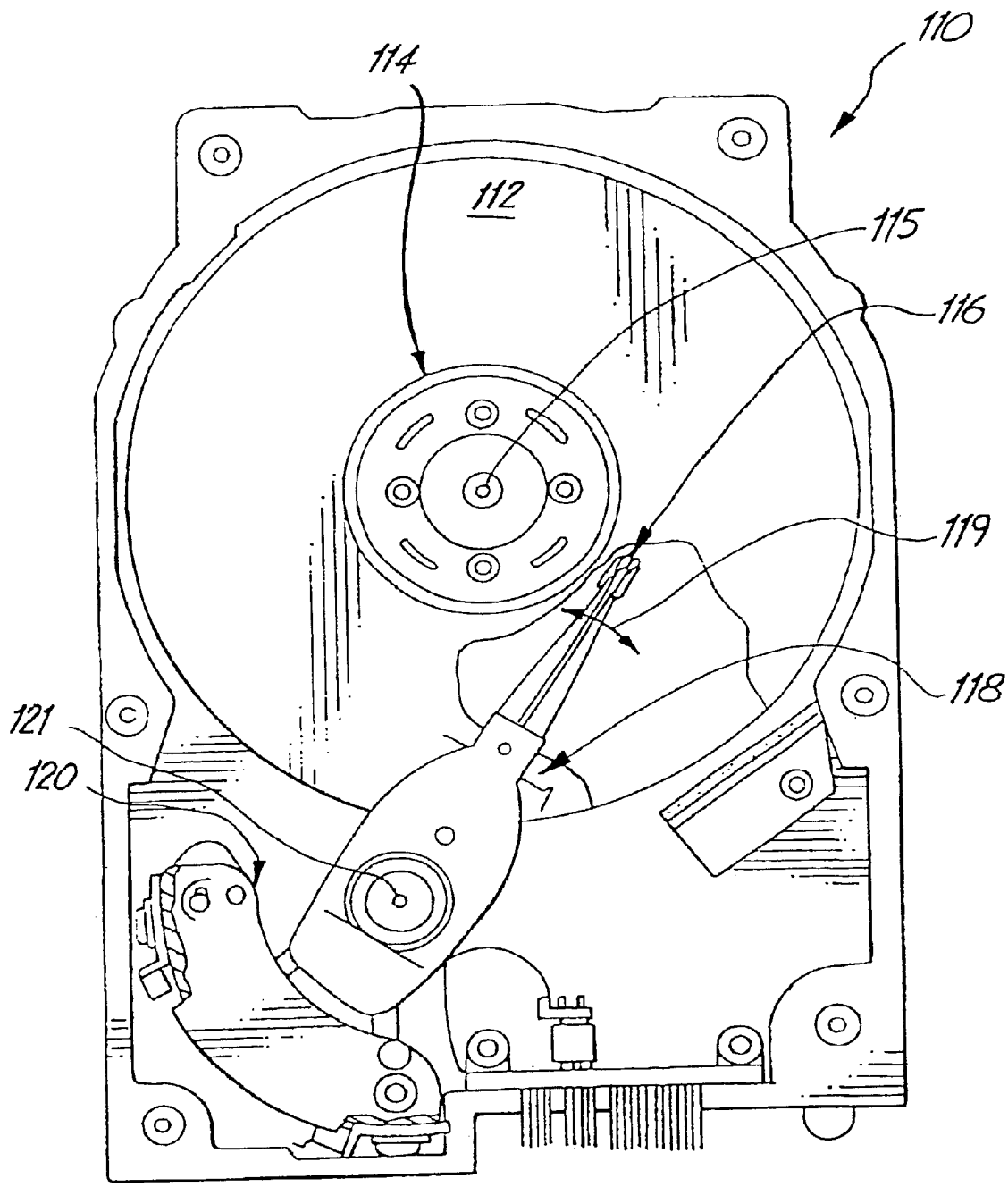
FIG._1

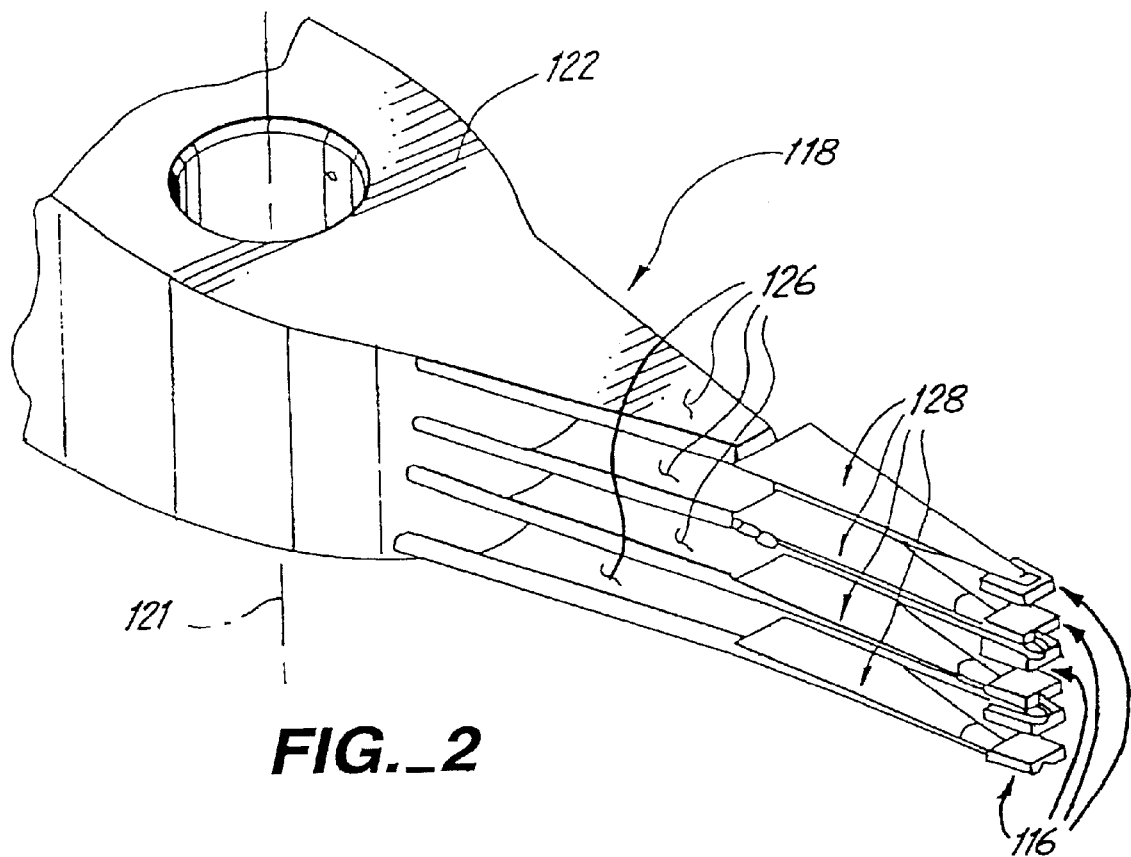
FIG._2
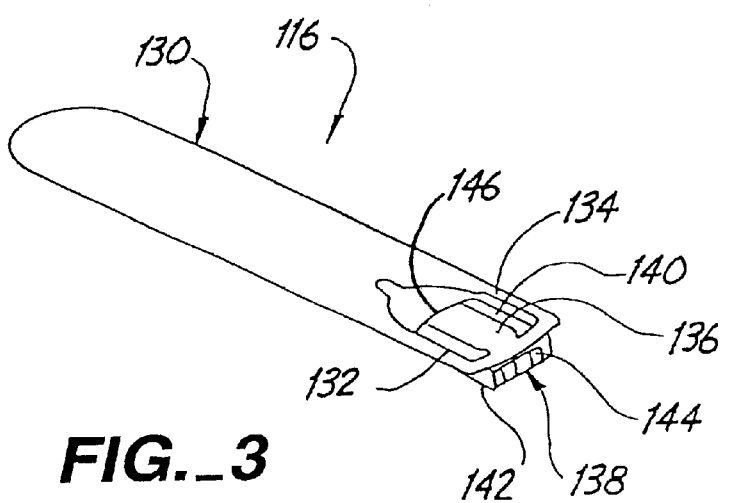
FIG._3

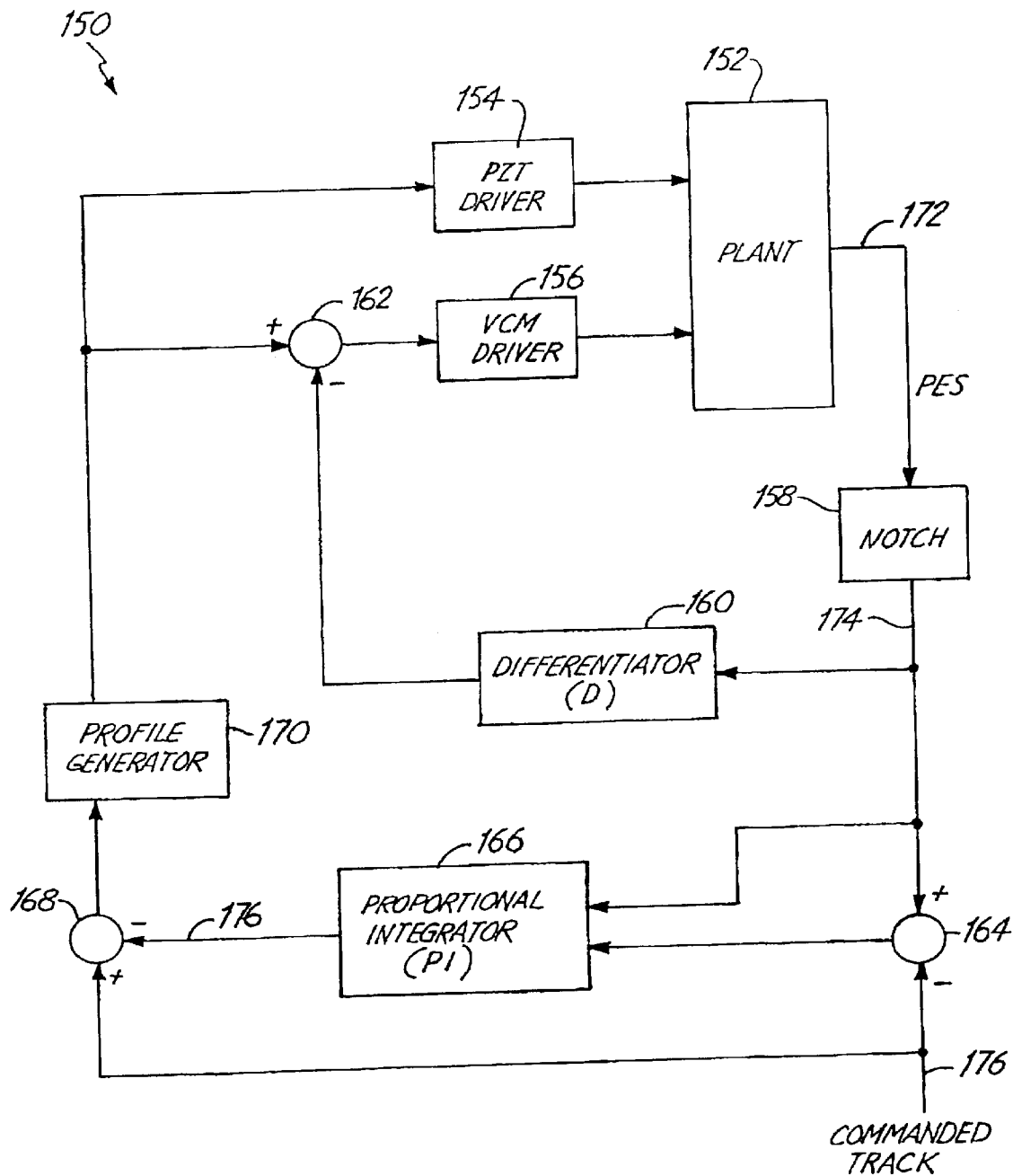
FIG._4

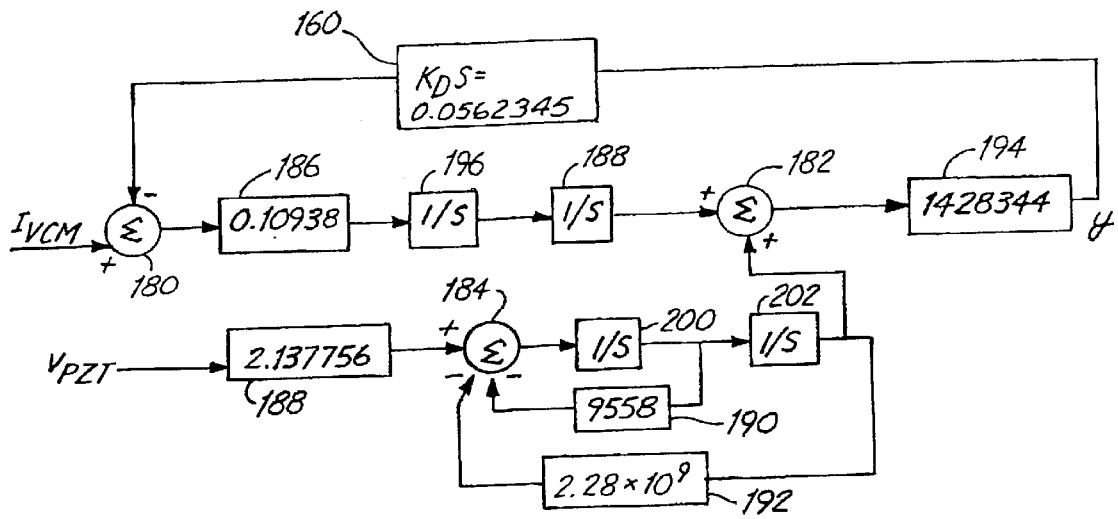
FIG._5
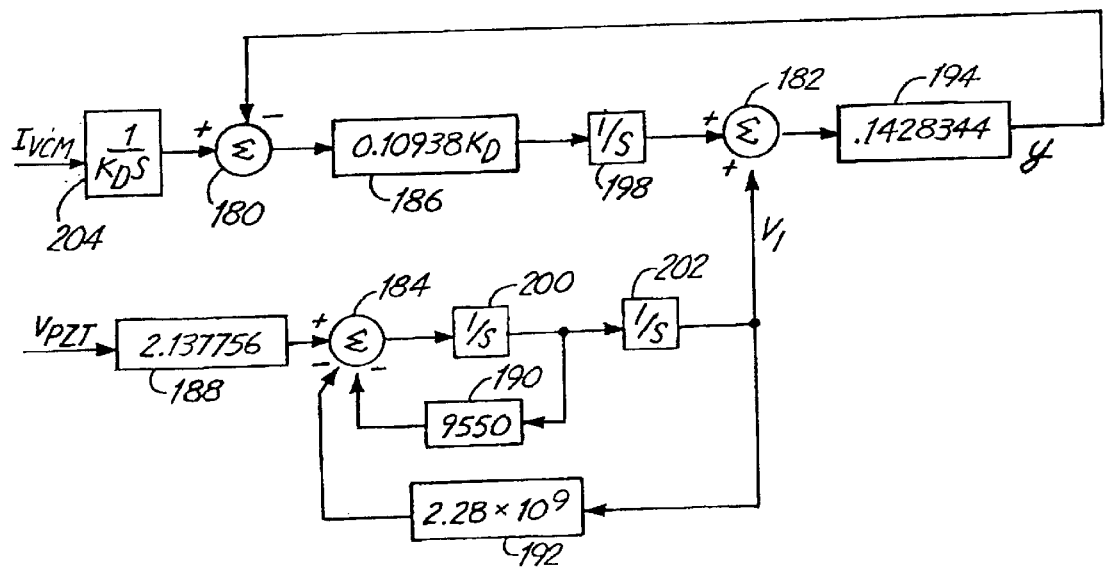
FIG._6

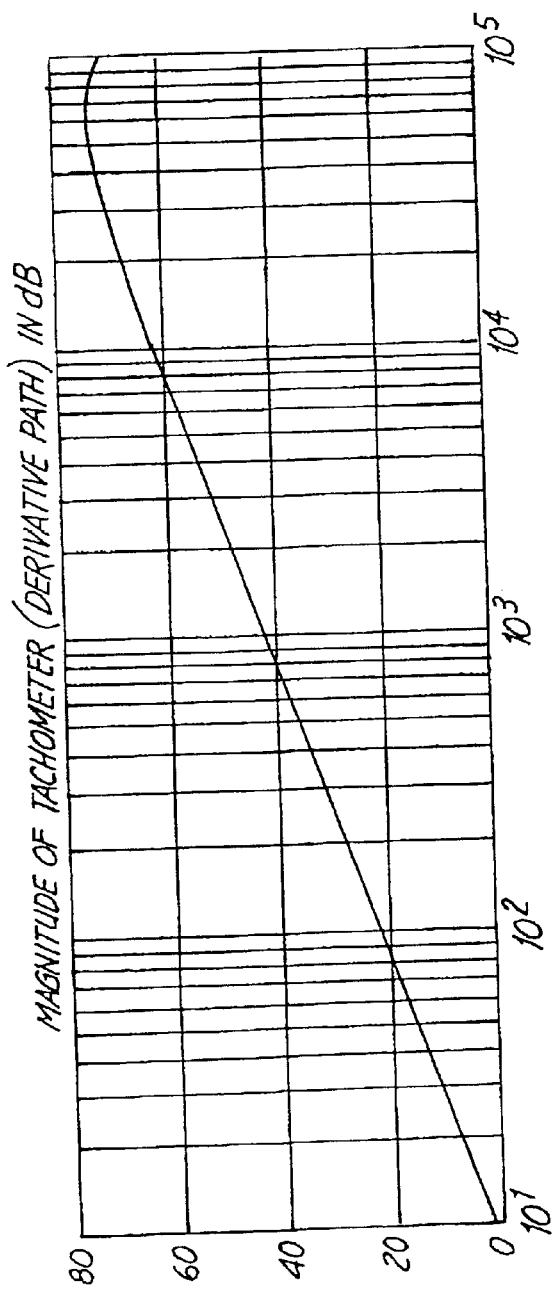
FIG._7-1
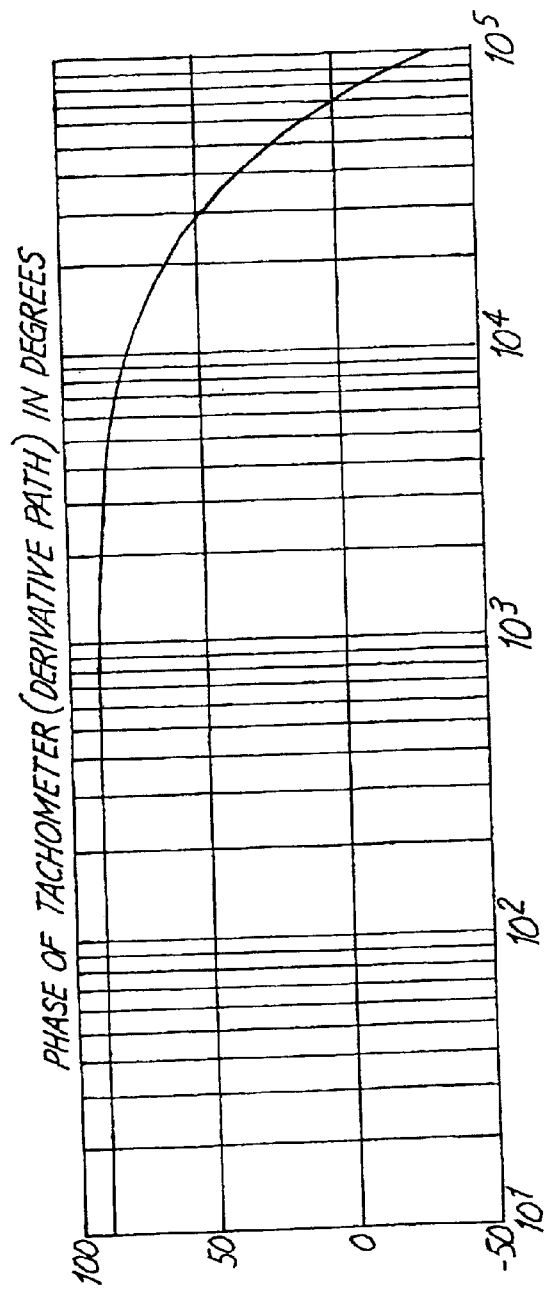
FIG._7-2

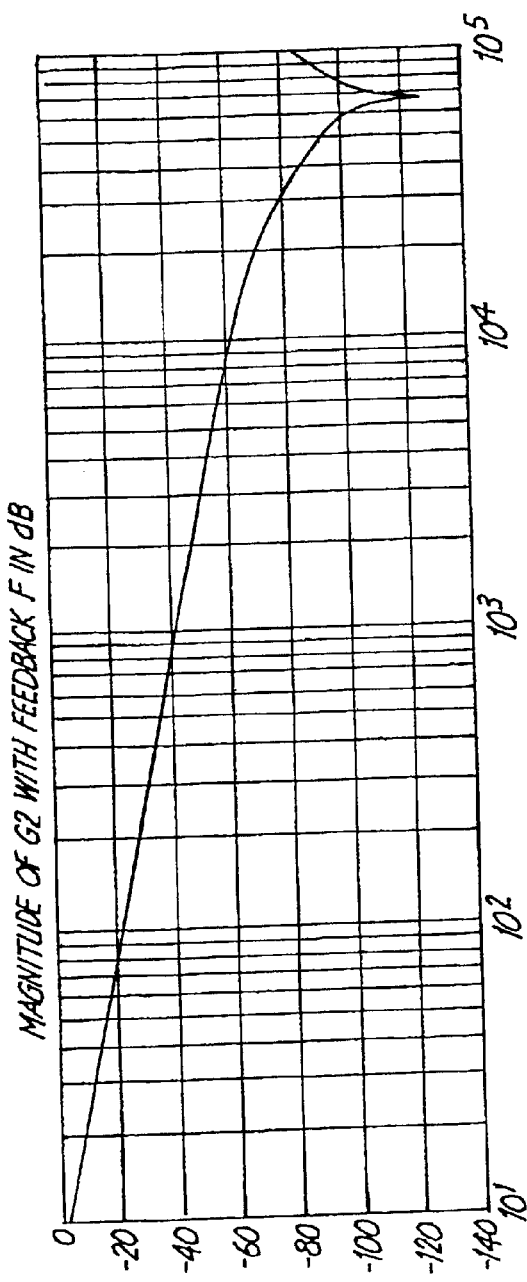
FIG._7-3
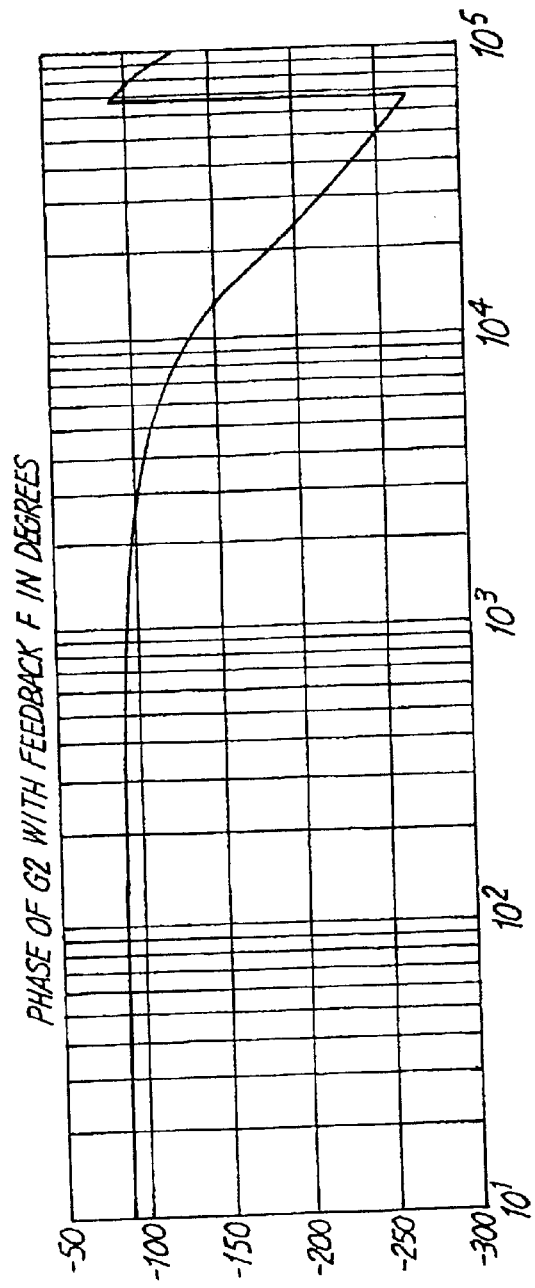
FIG._7-4

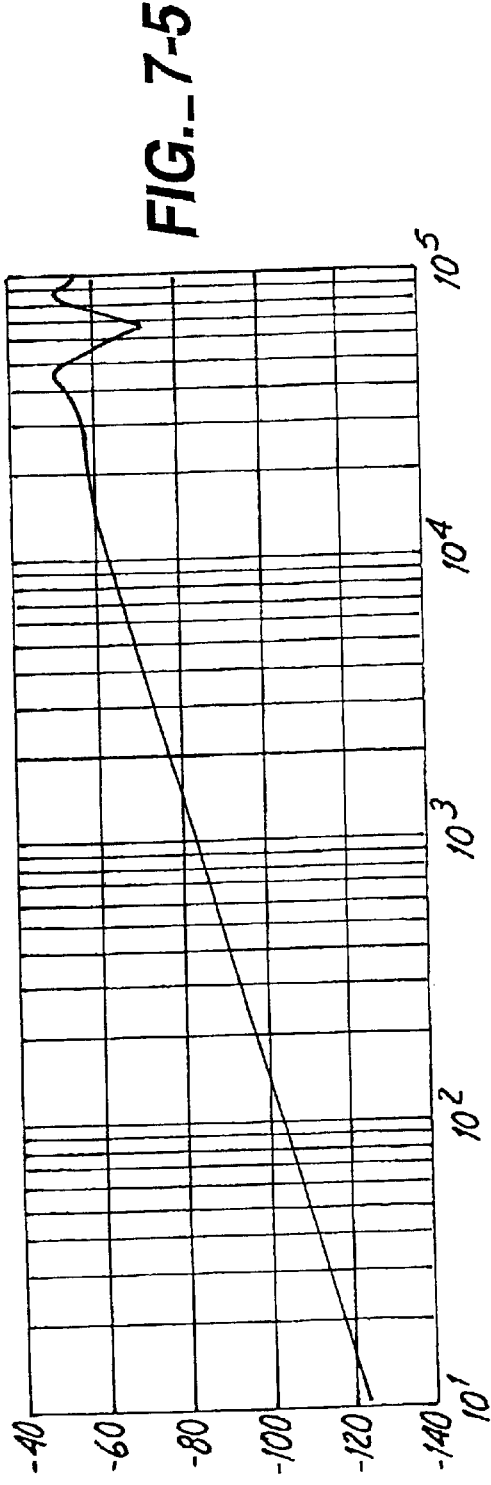
FIG._7-5
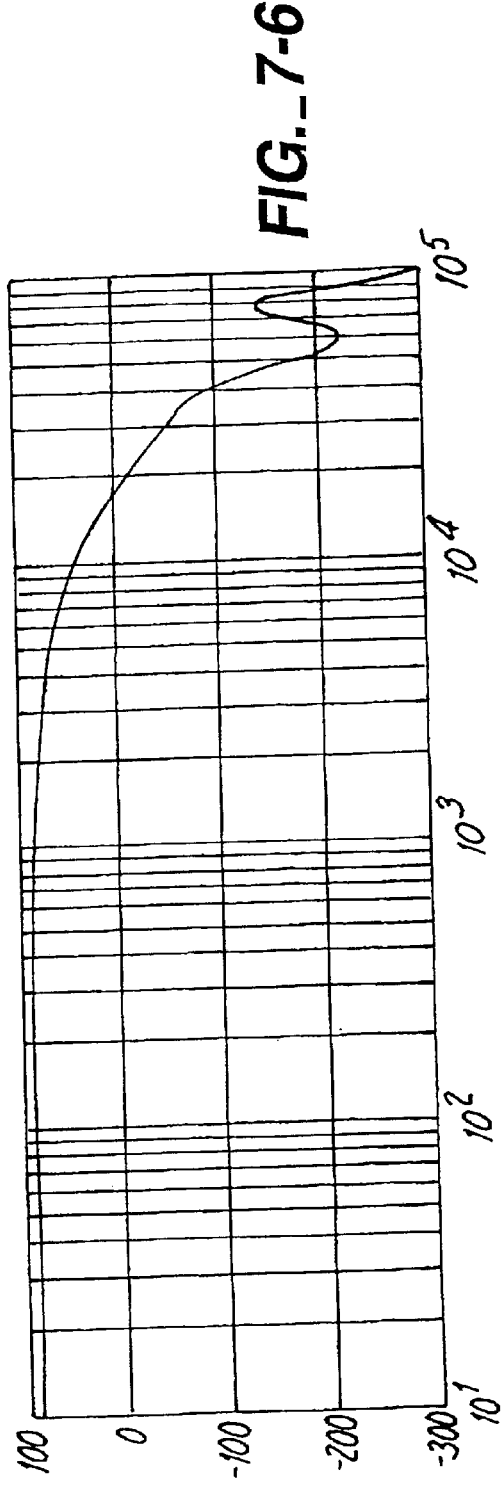
FIG._7-6

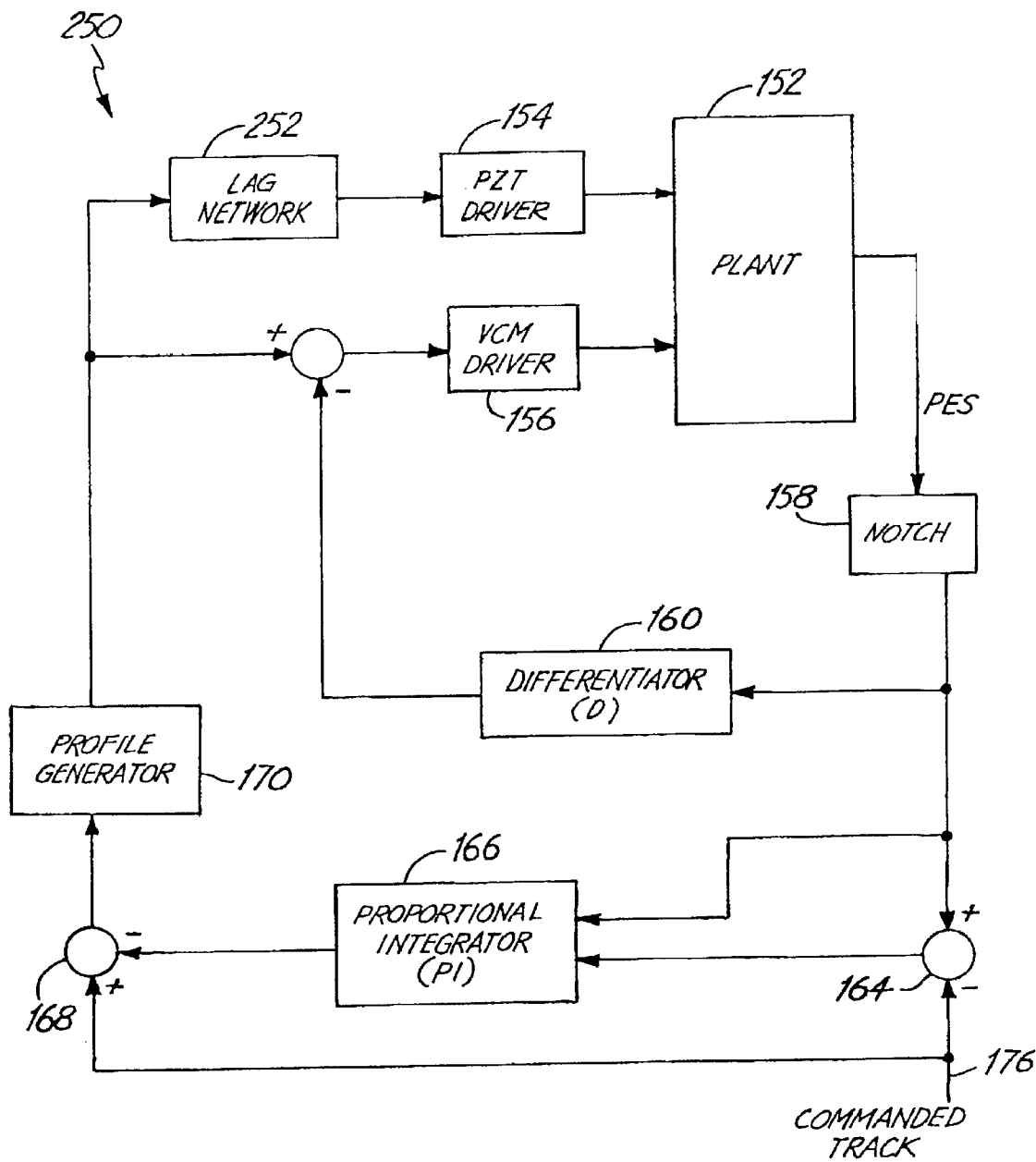
FIG._8

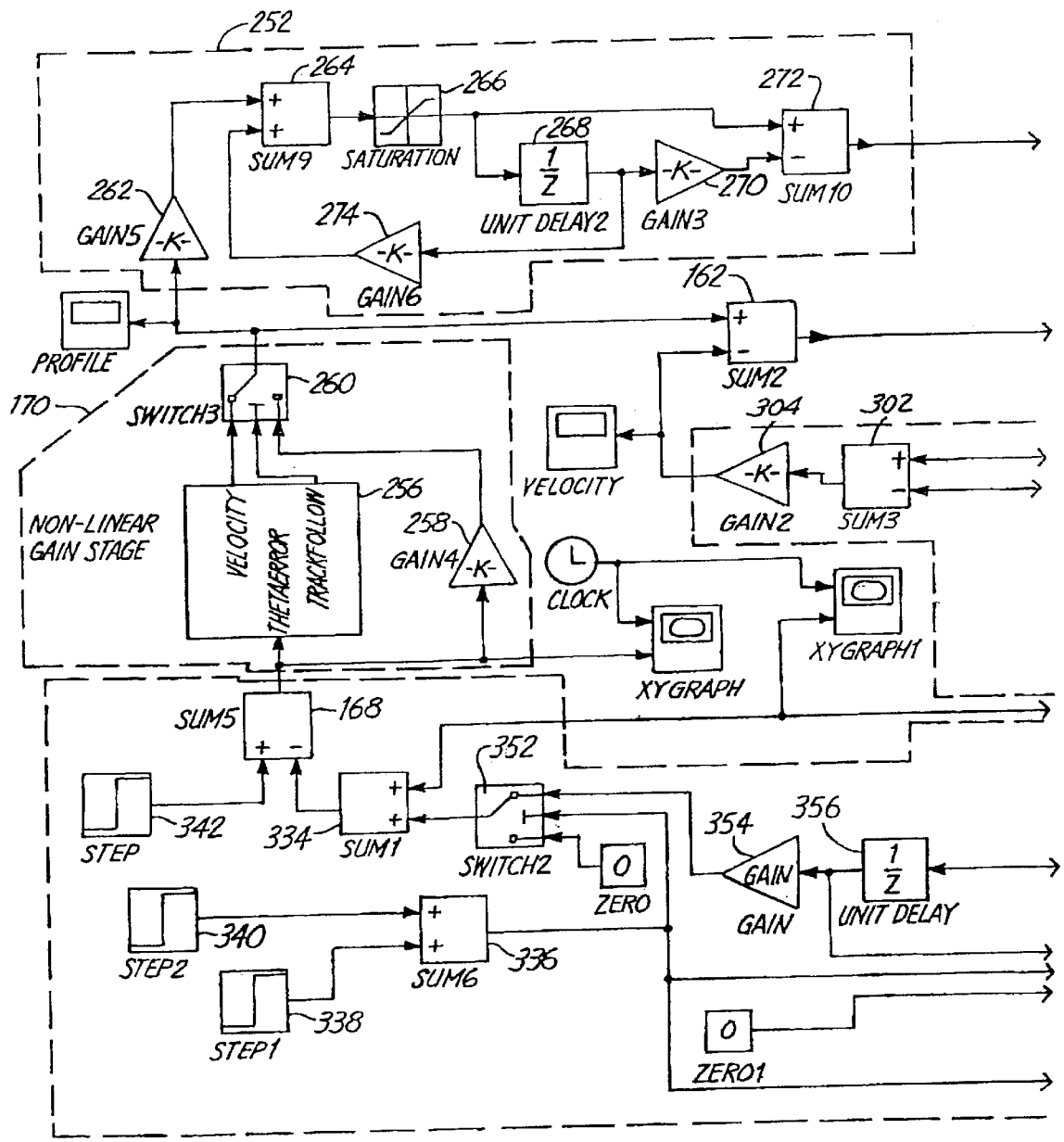
FIG._9A
FIG._9

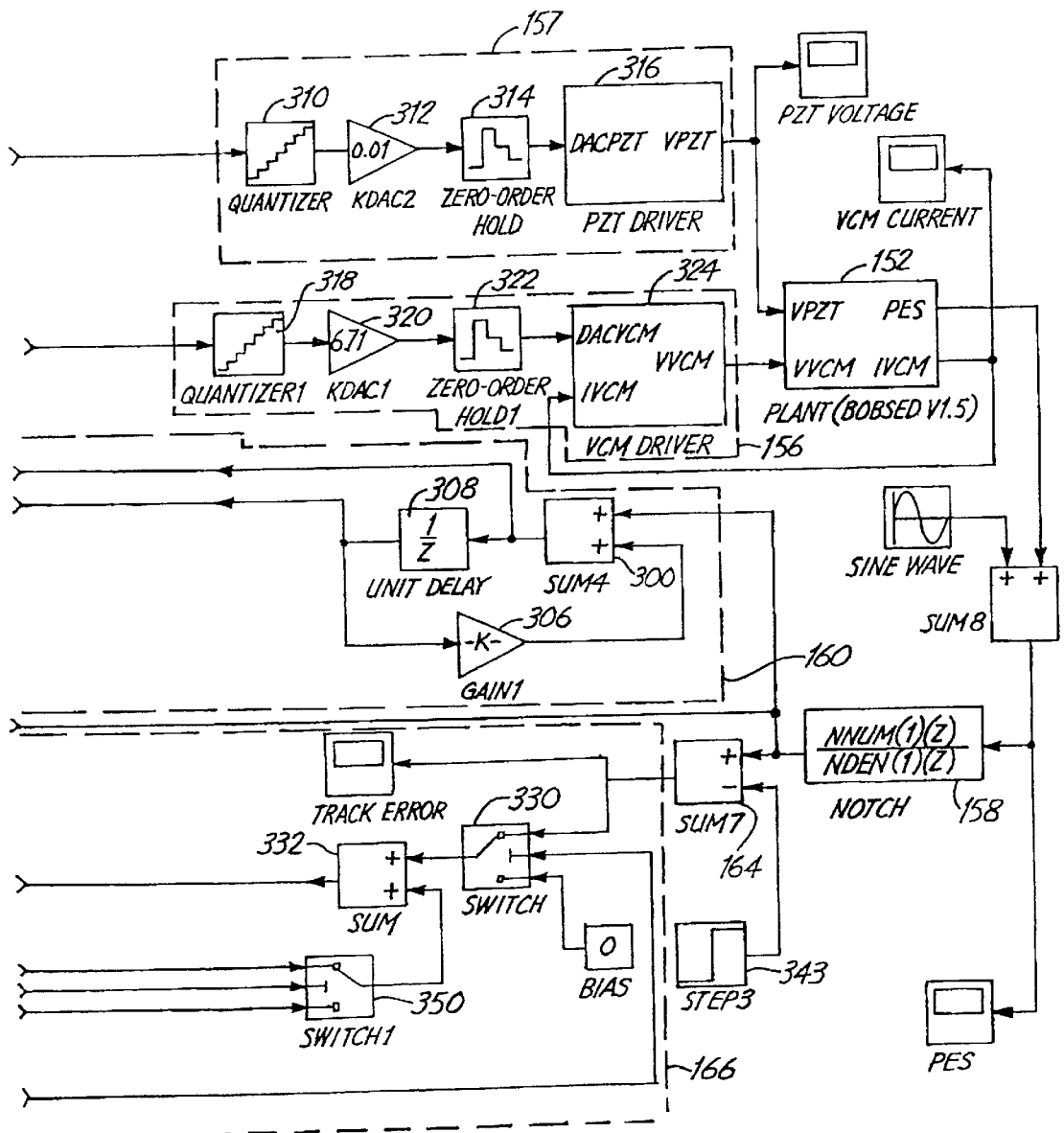
FIG._9B

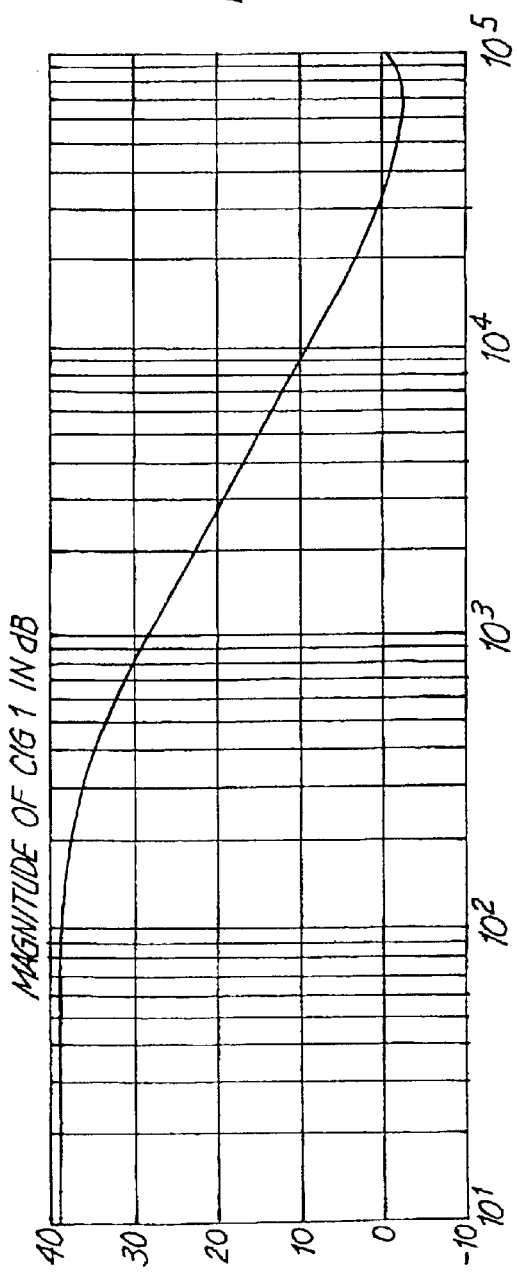
FIG._10-1
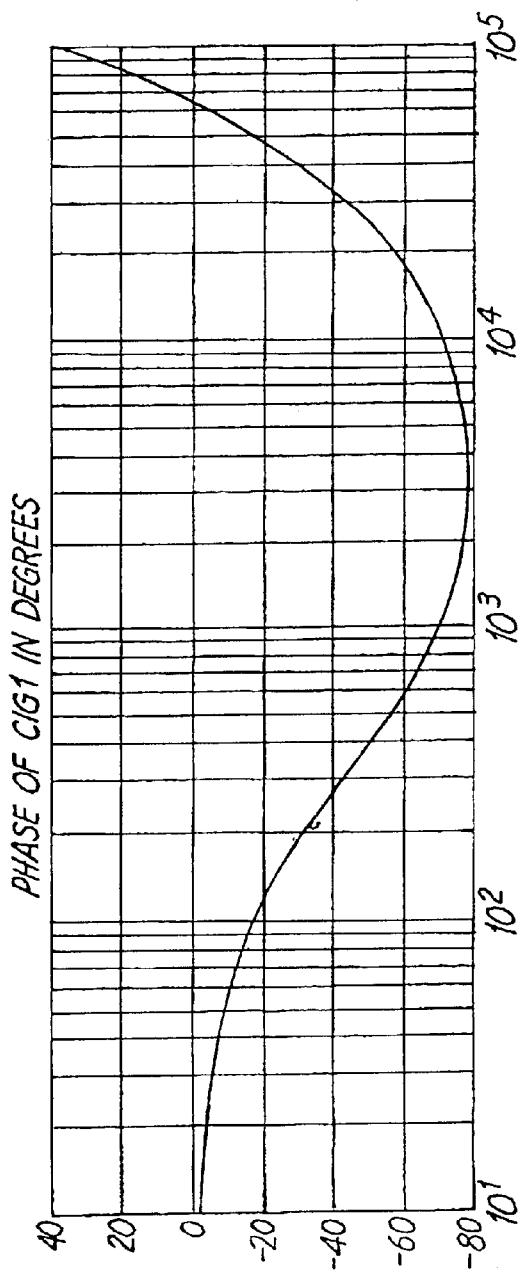
FIG._10-2

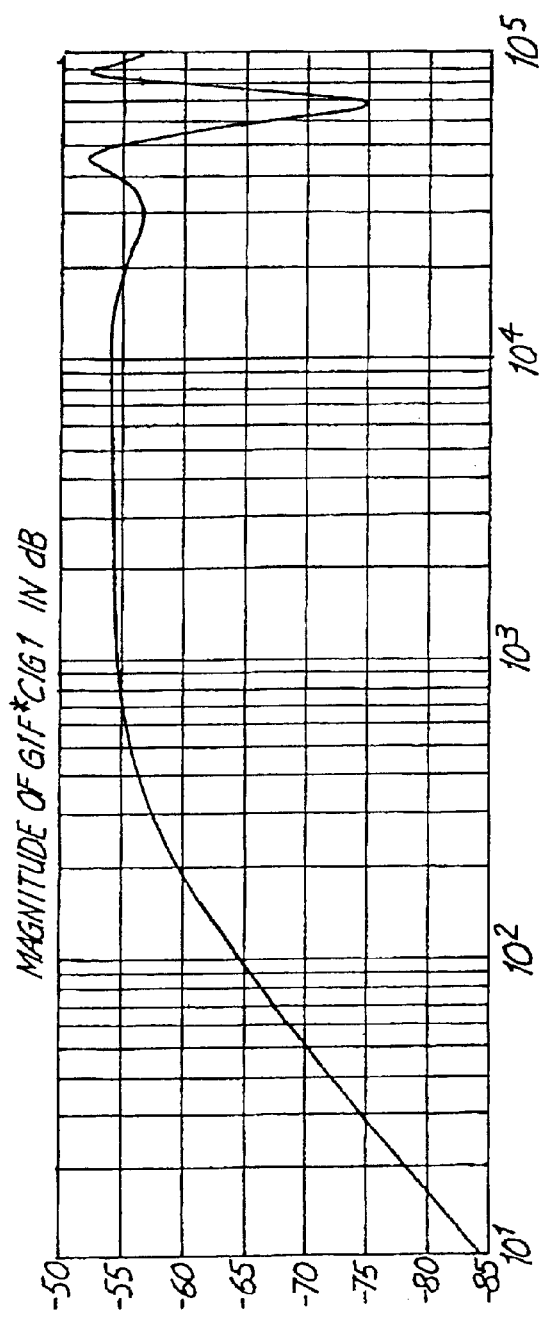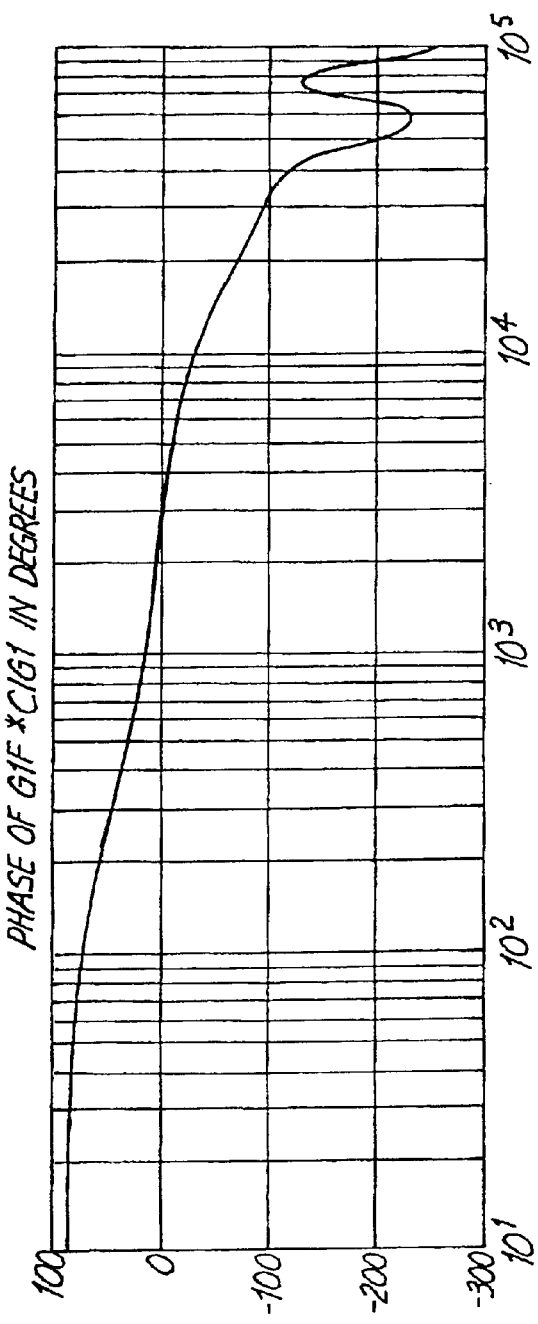
FIG._10-3
FIG._10-4

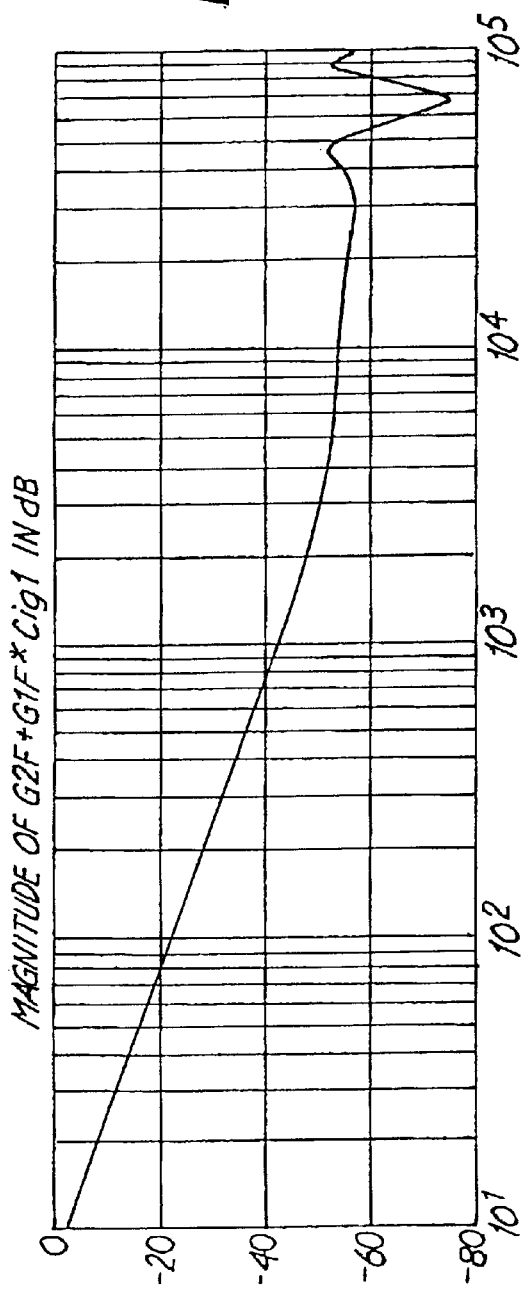
FIG._10-7
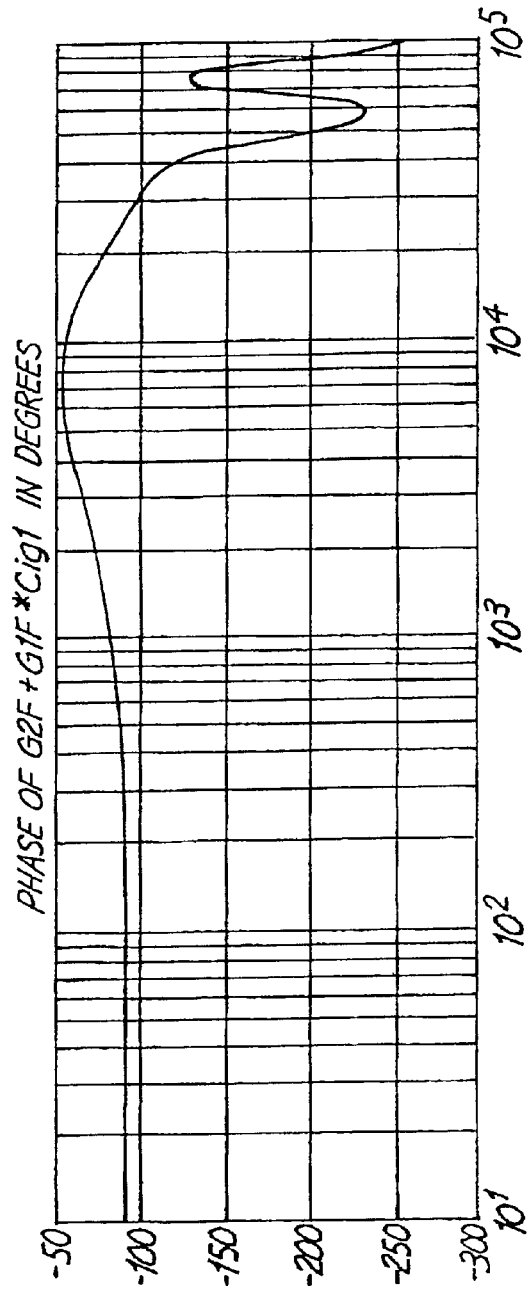
FIG._10-8

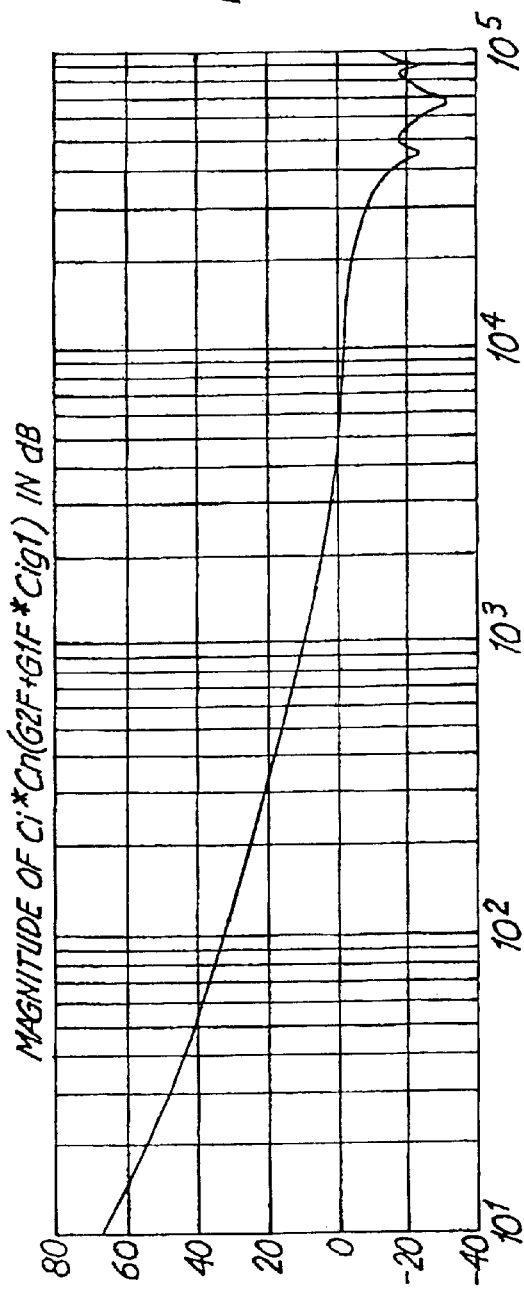
FIG._10-9
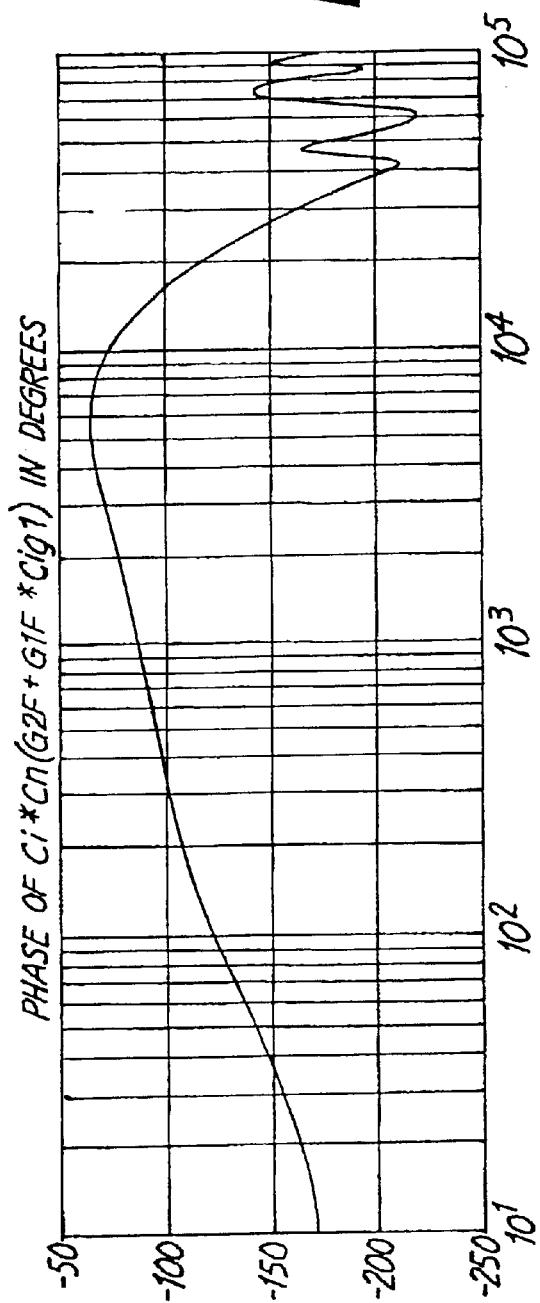
FIG._10-10

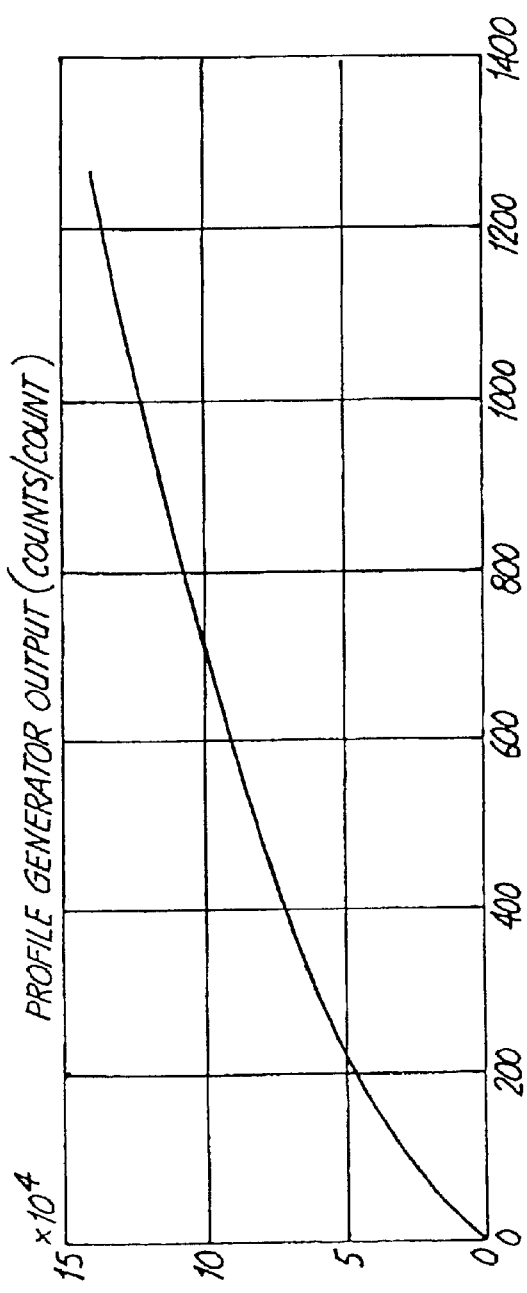
FIG._11-1
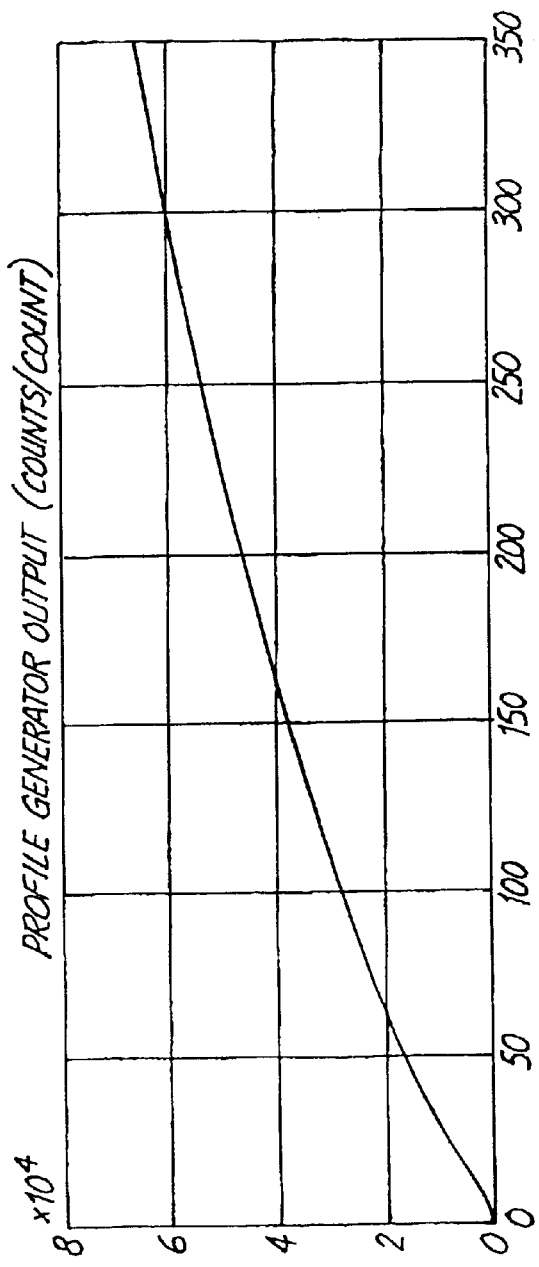
FIG._11-2

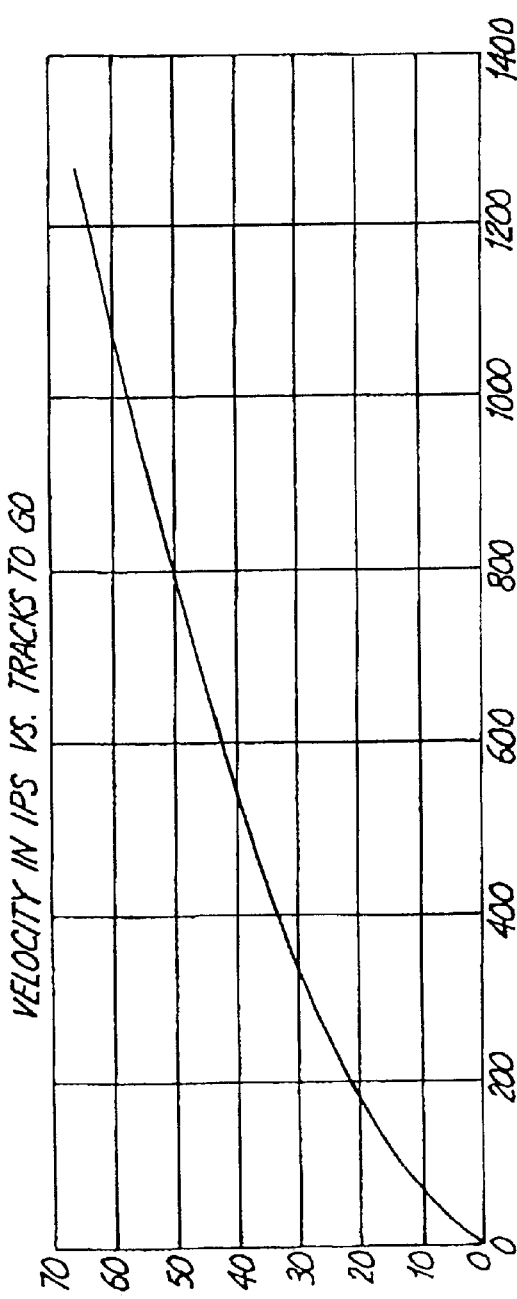
FIG._11-3
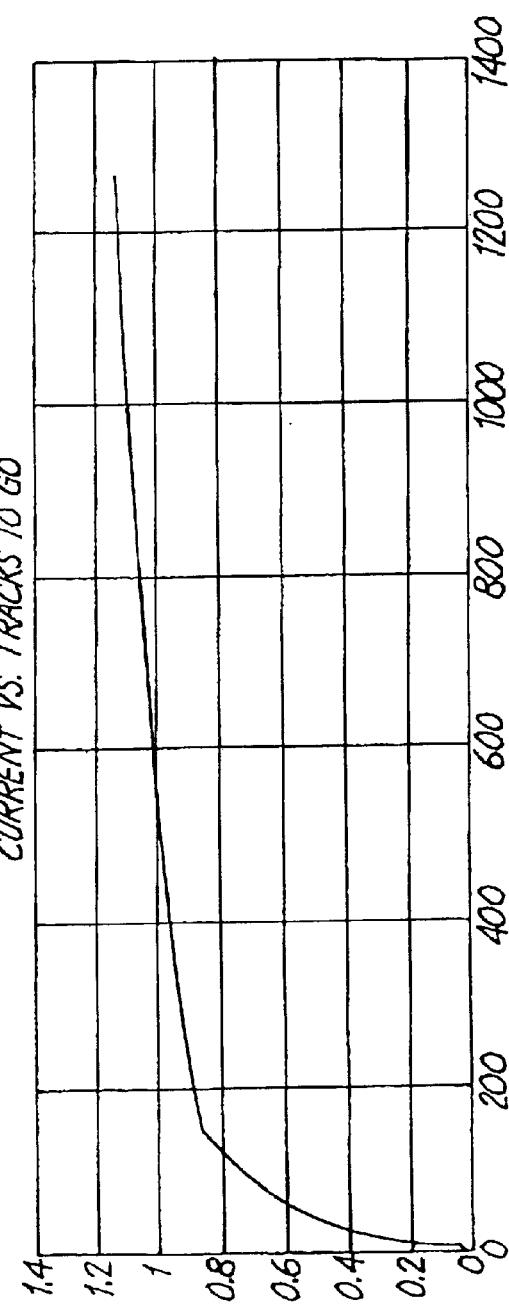
FIG._11-4

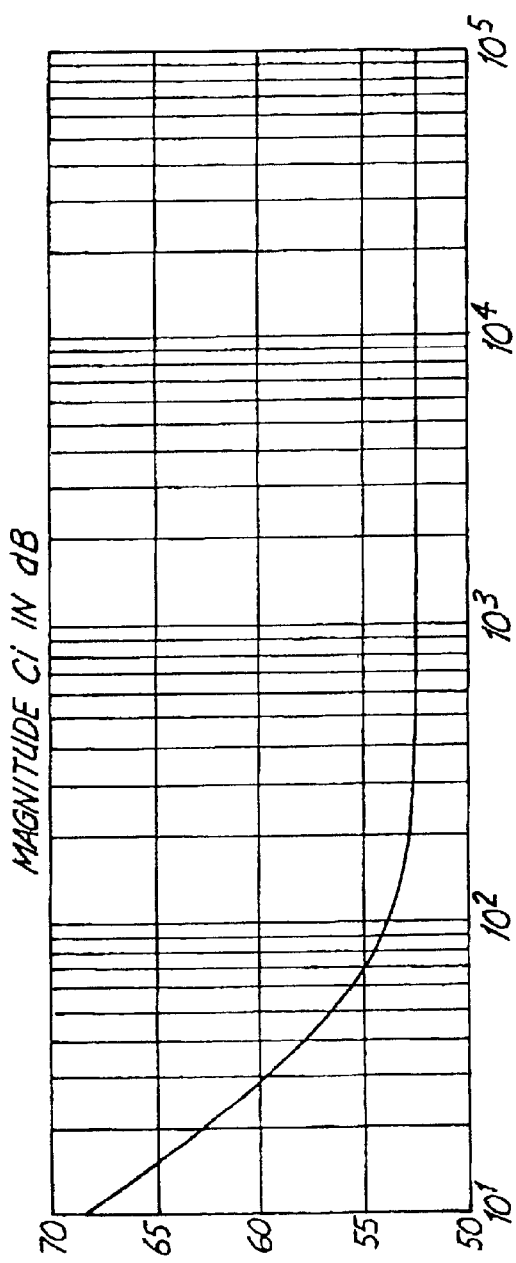
FIG._12-1
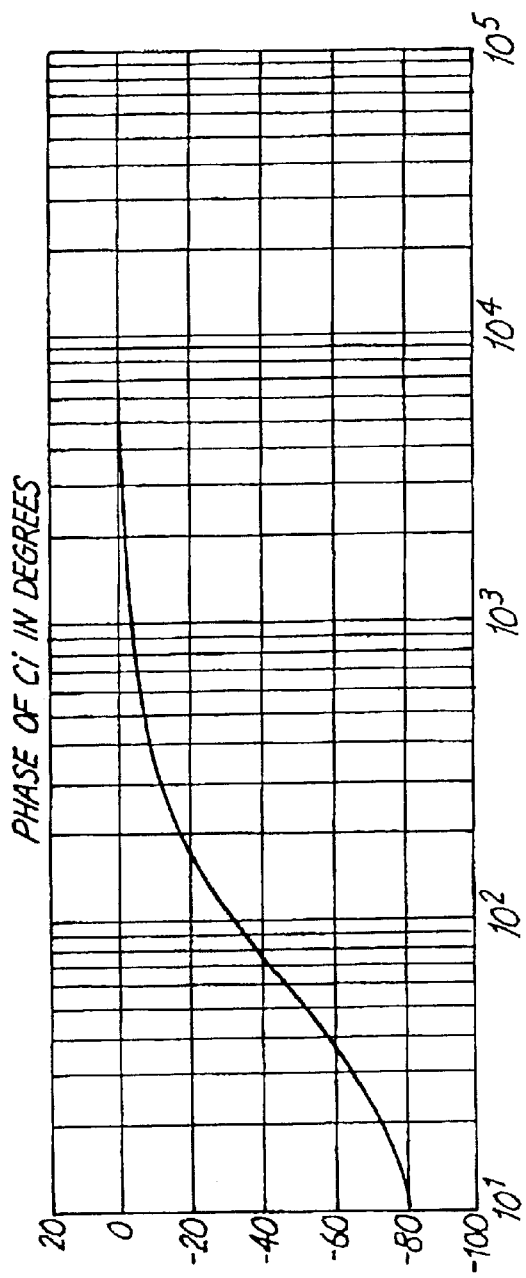
FIG._12-2

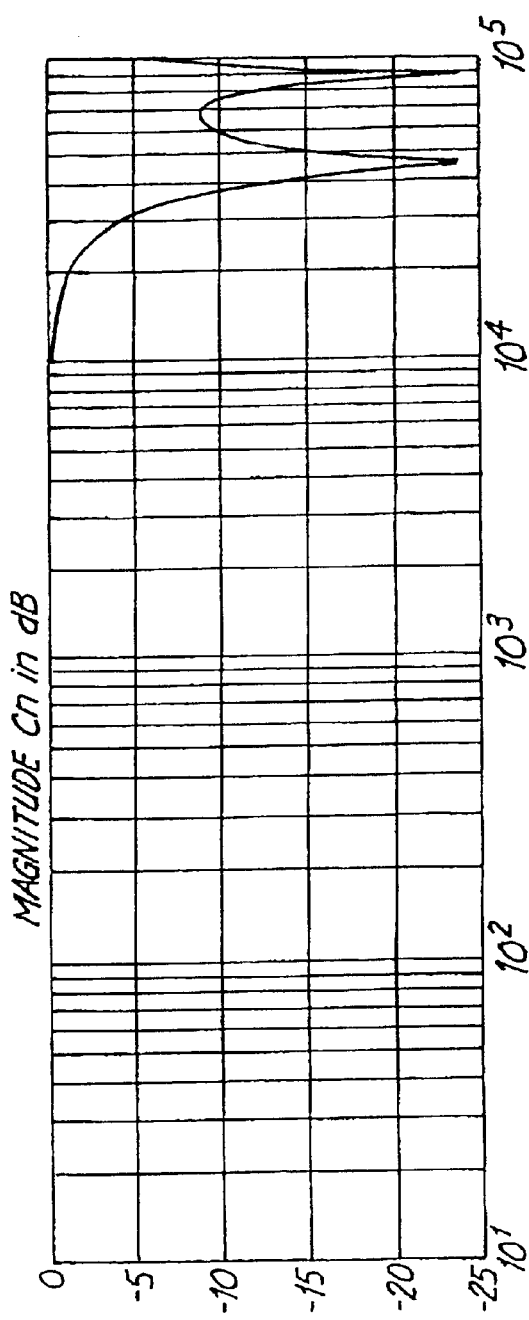
FIG._13-1
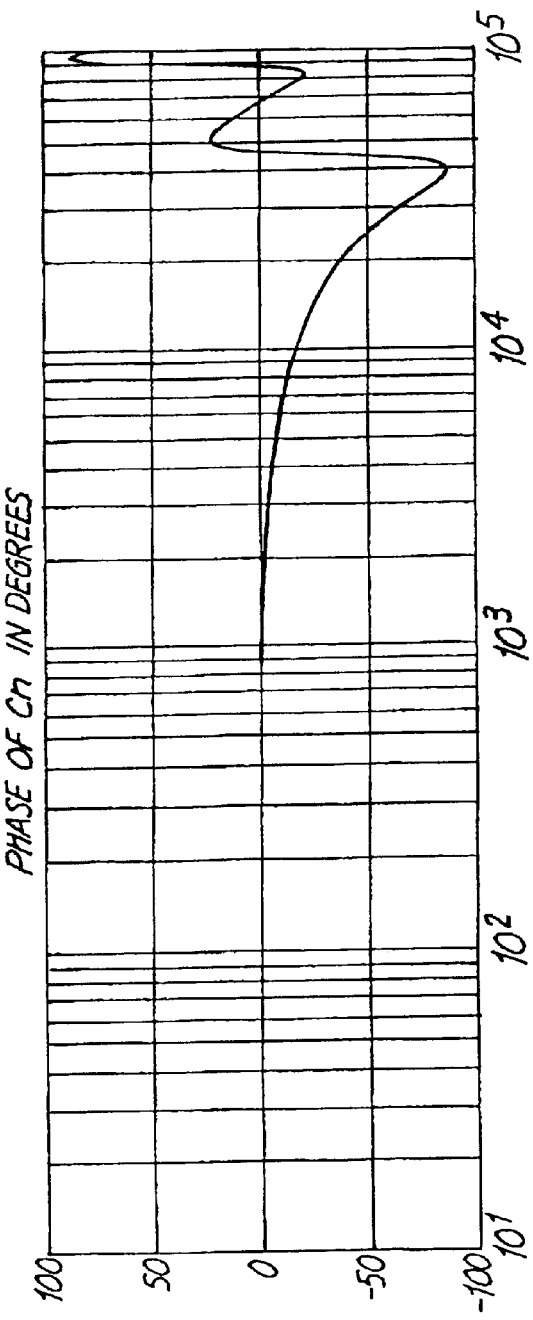
FIG._13-2

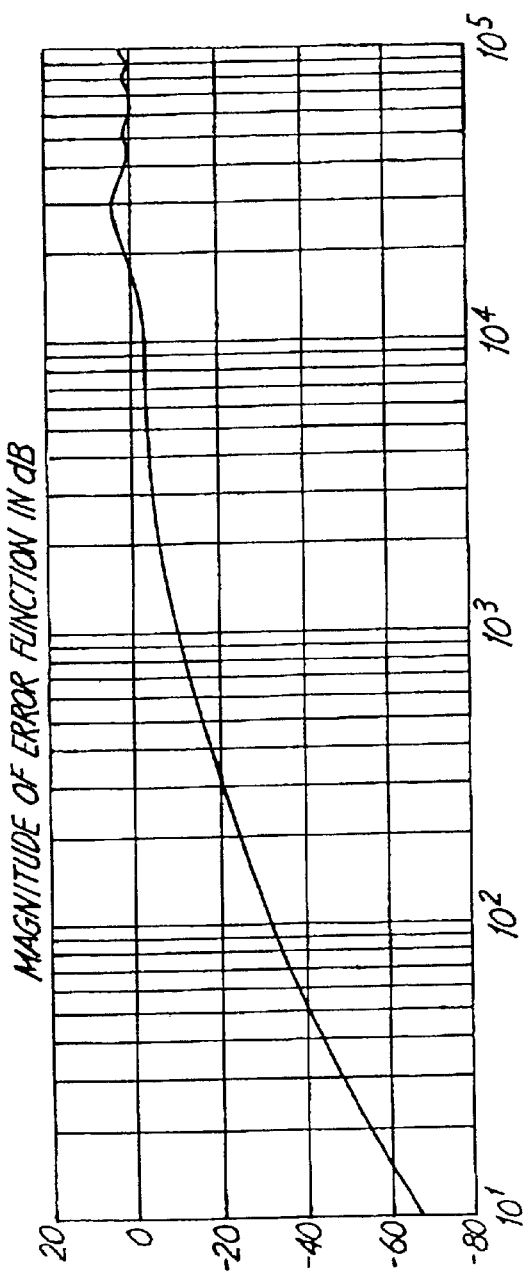
FIG._14-1
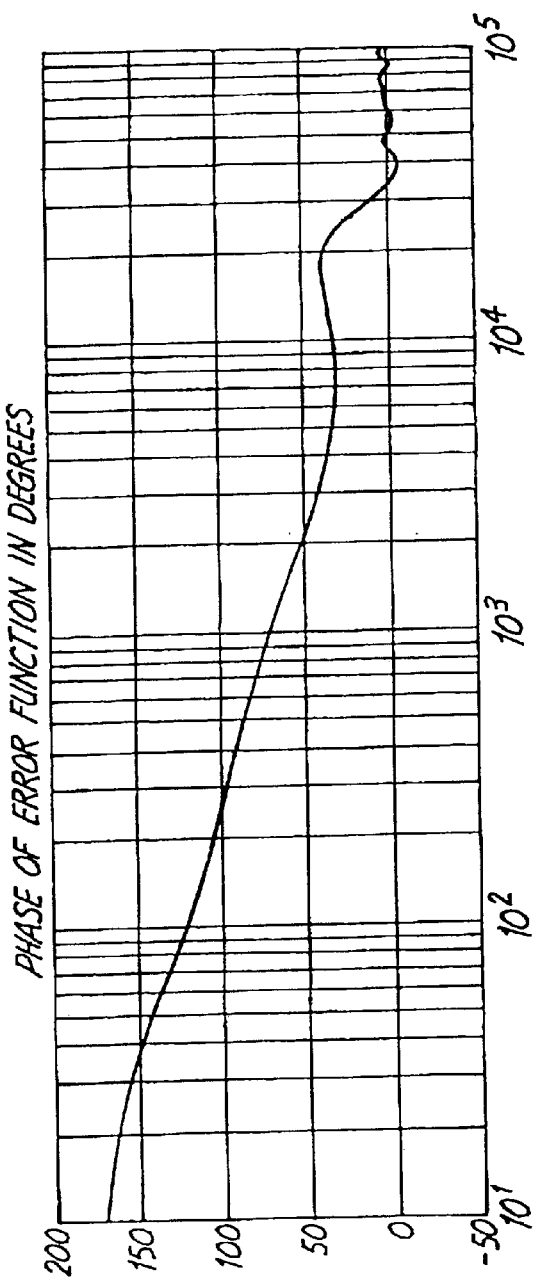
FIG._14-2

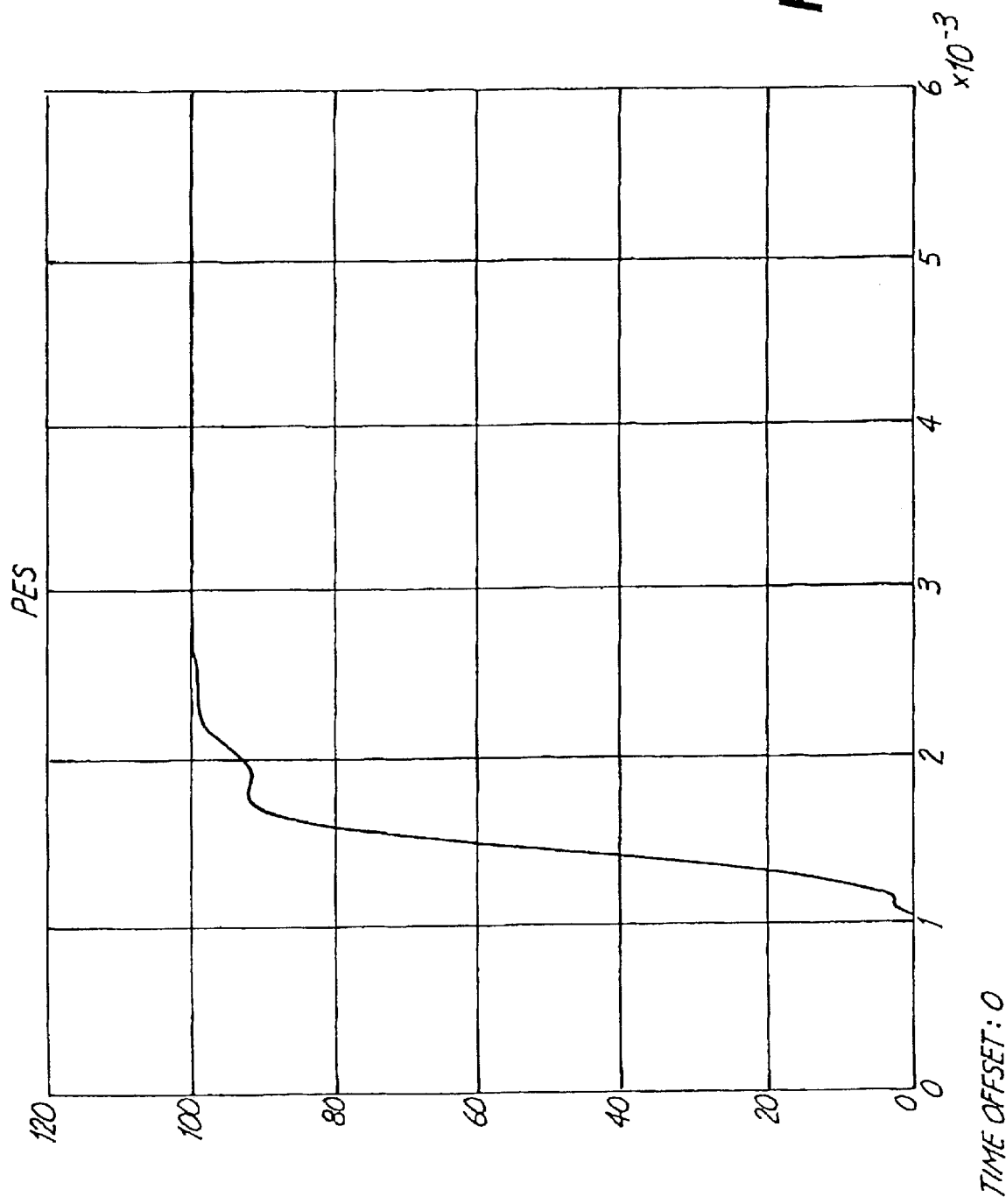
FIG._15

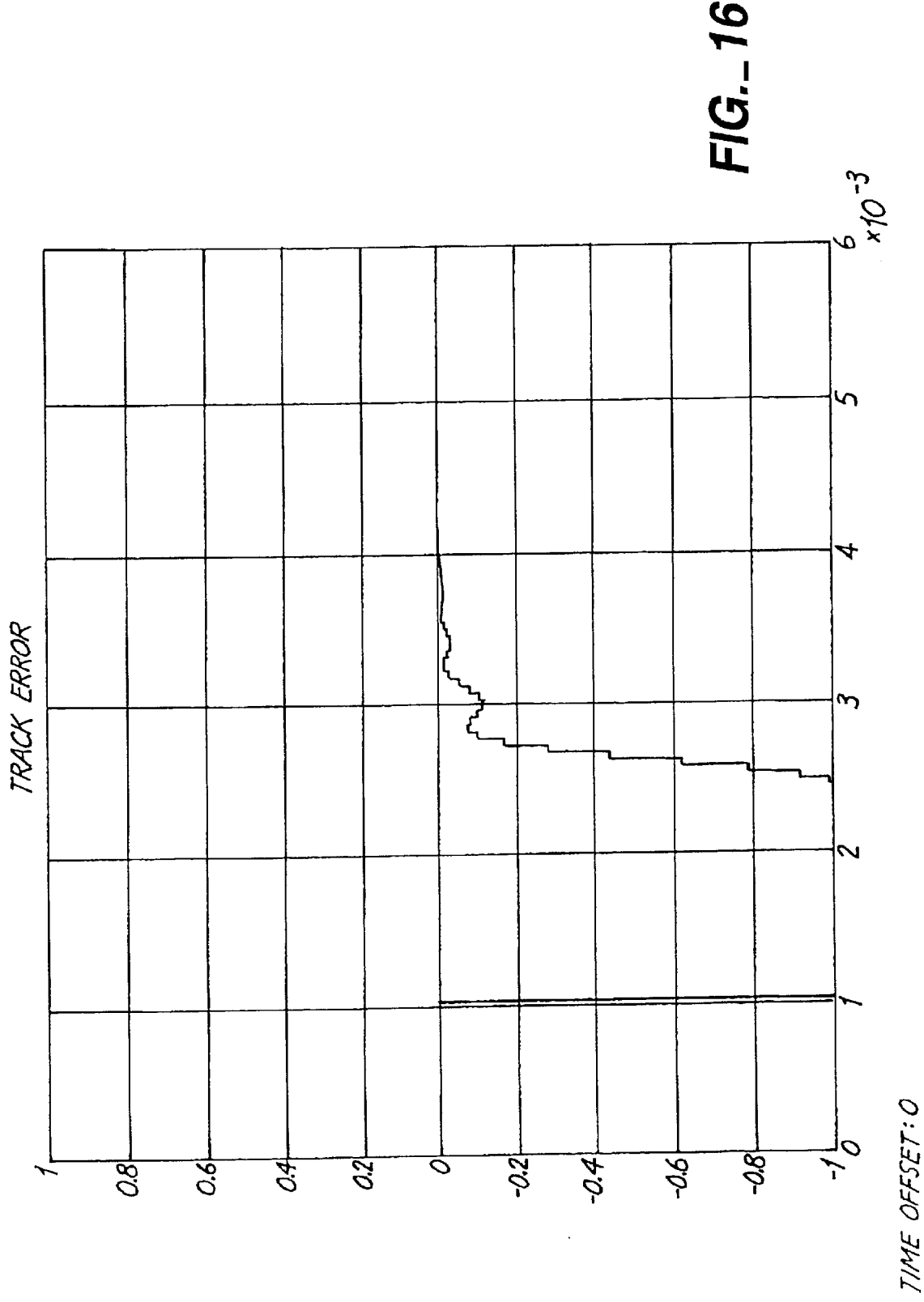
FIG._16

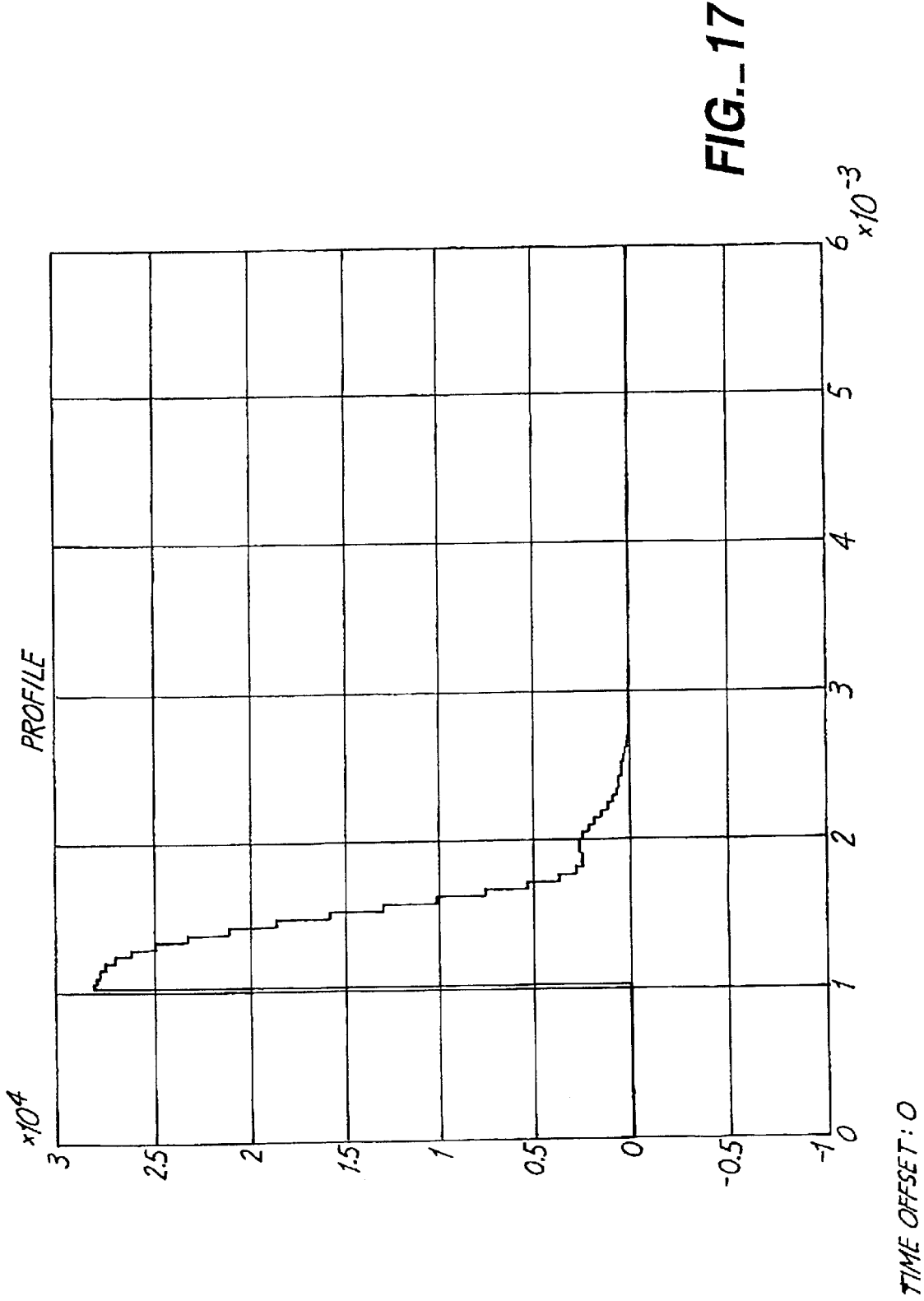
FIG._17

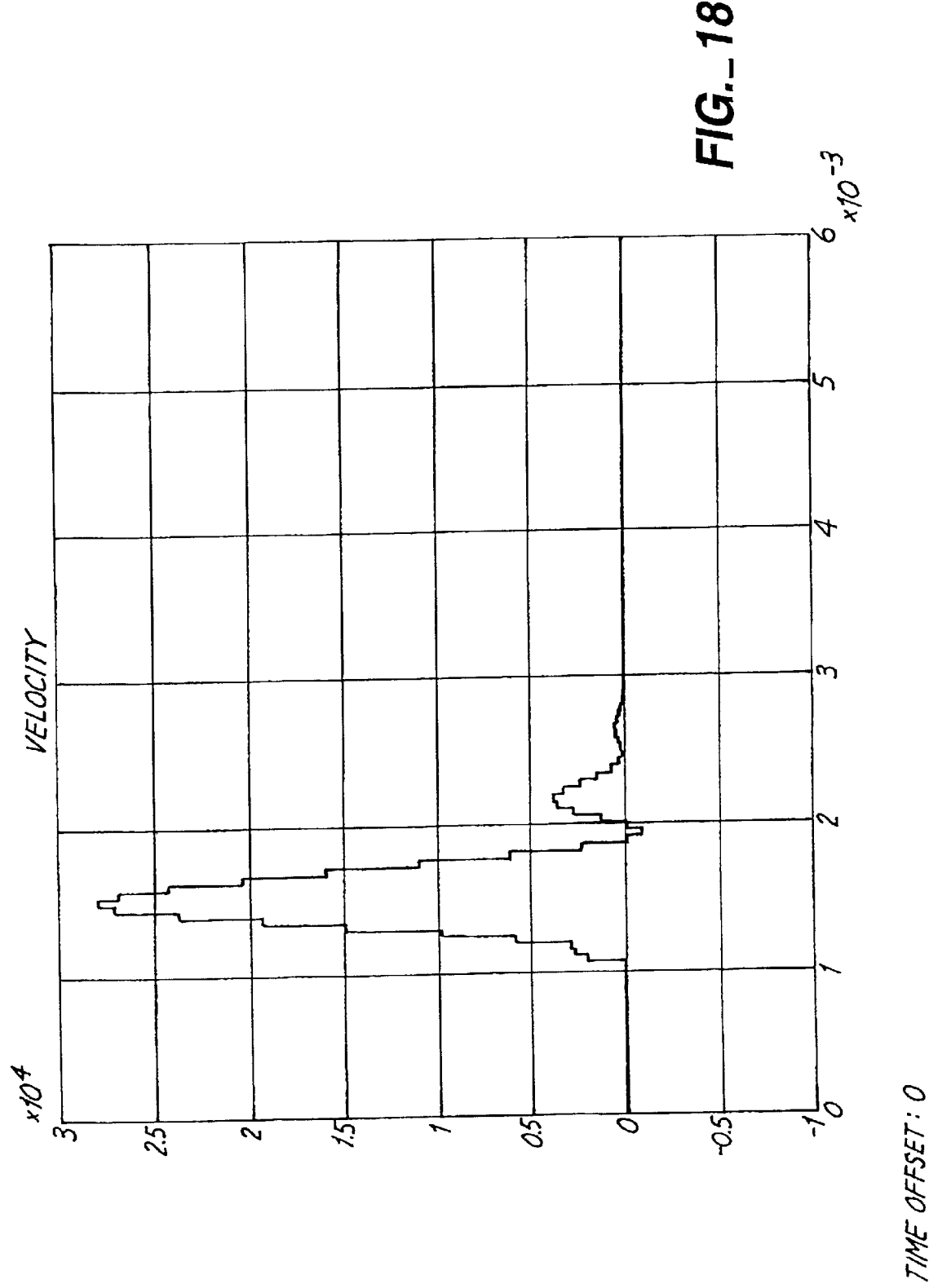
FIG._18

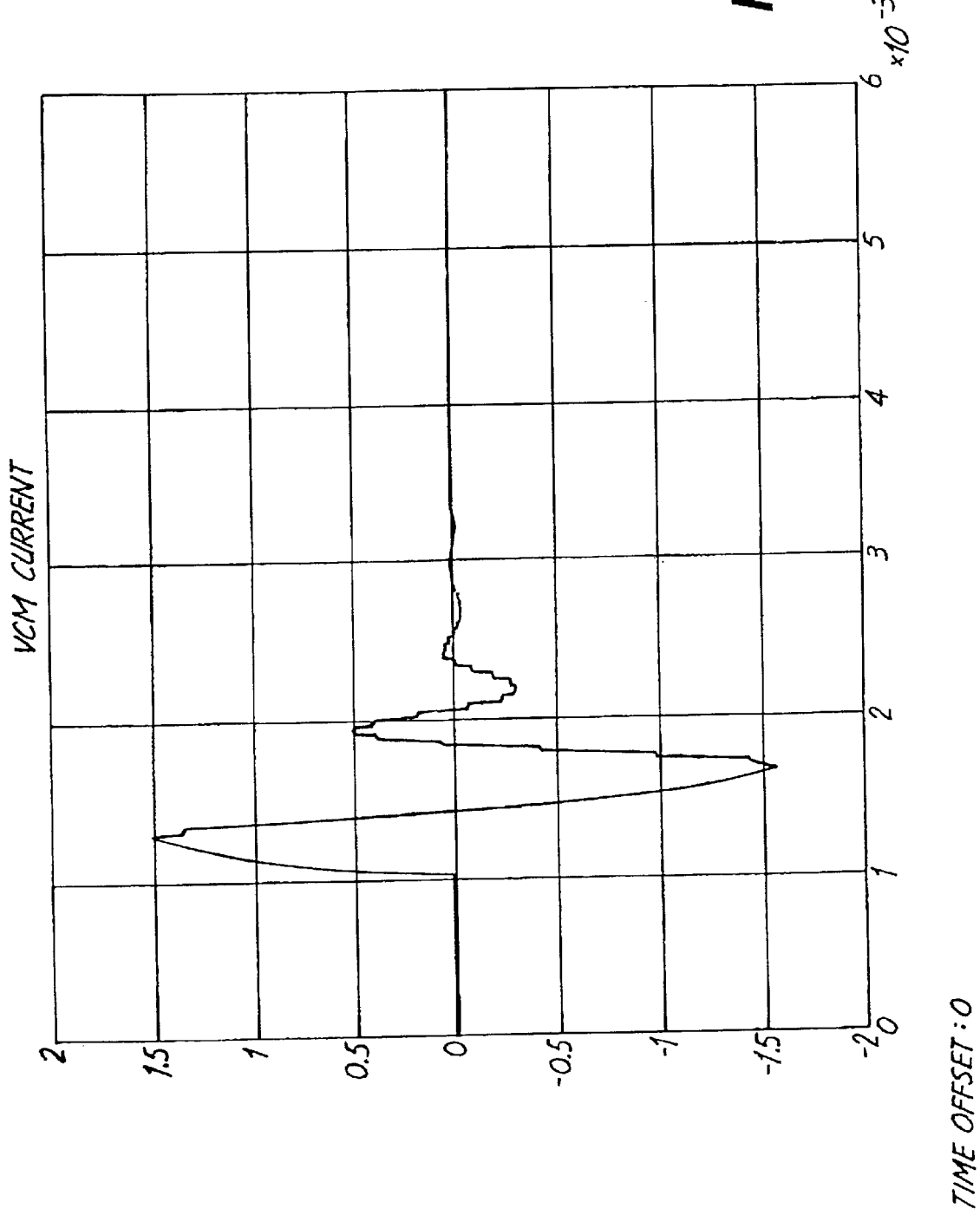
FIG._19

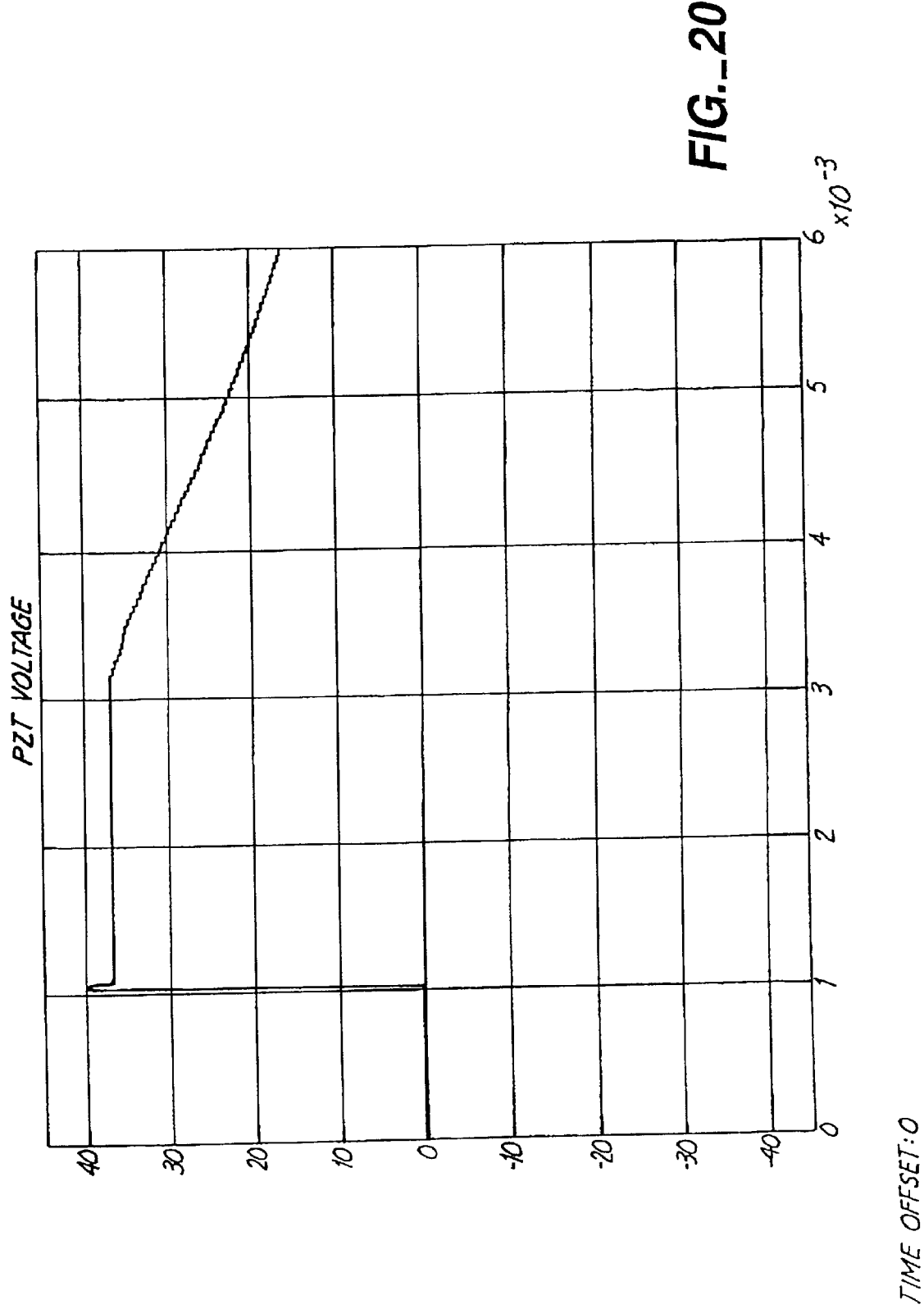
FIG._20

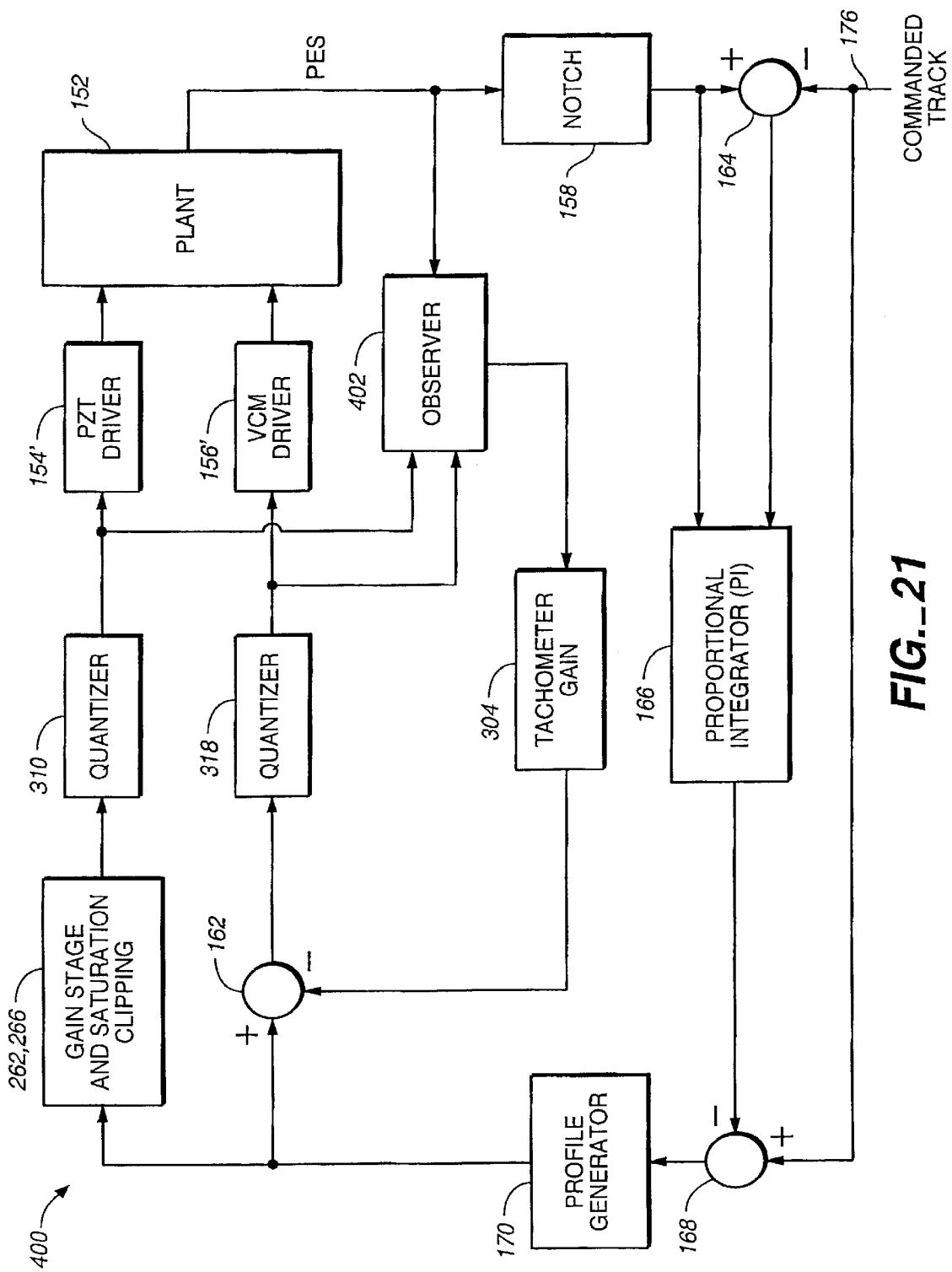
FIG._21

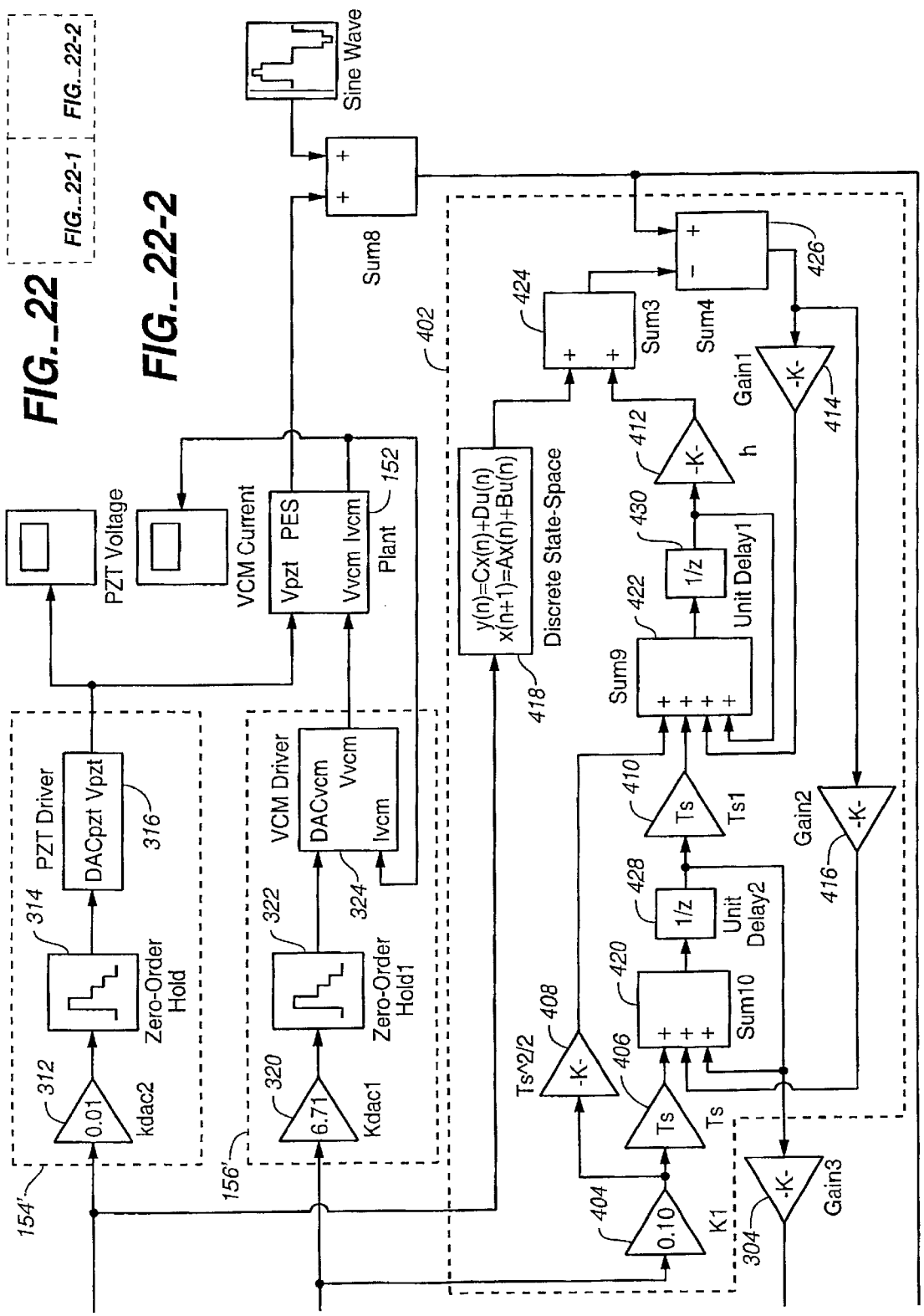
FIG._22
FIG._22-1
FIG._22-2

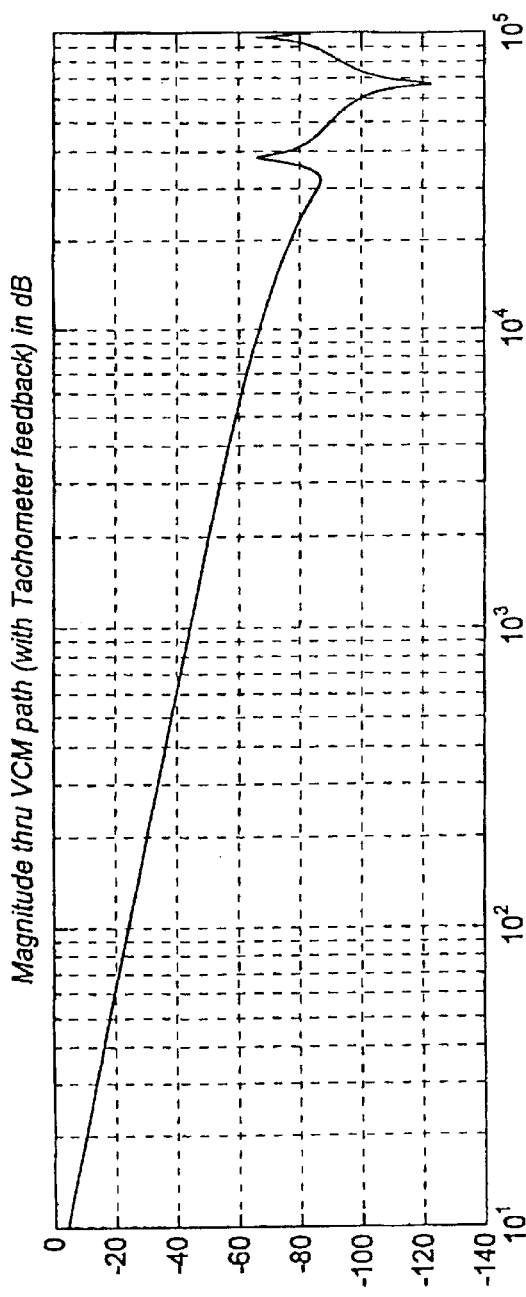
FIG._23-1
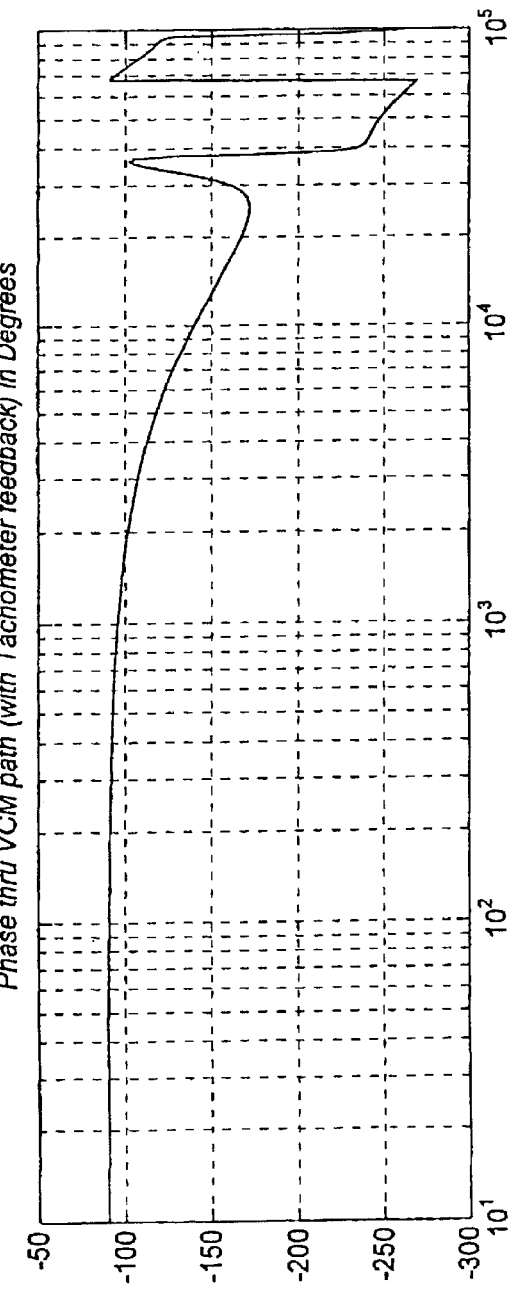
FIG._23-2

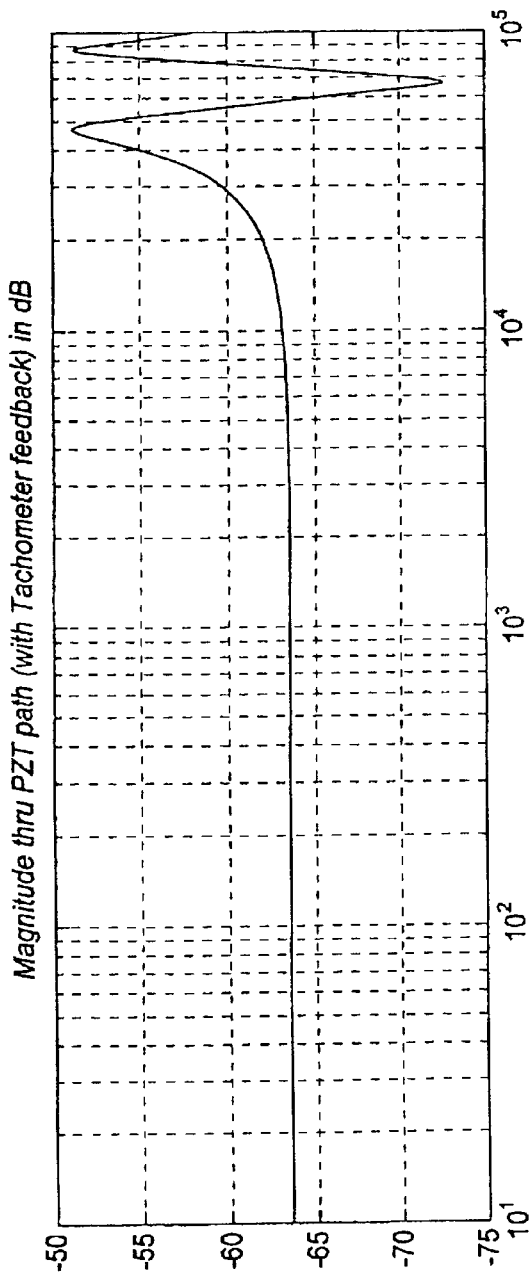
FIG._24-1
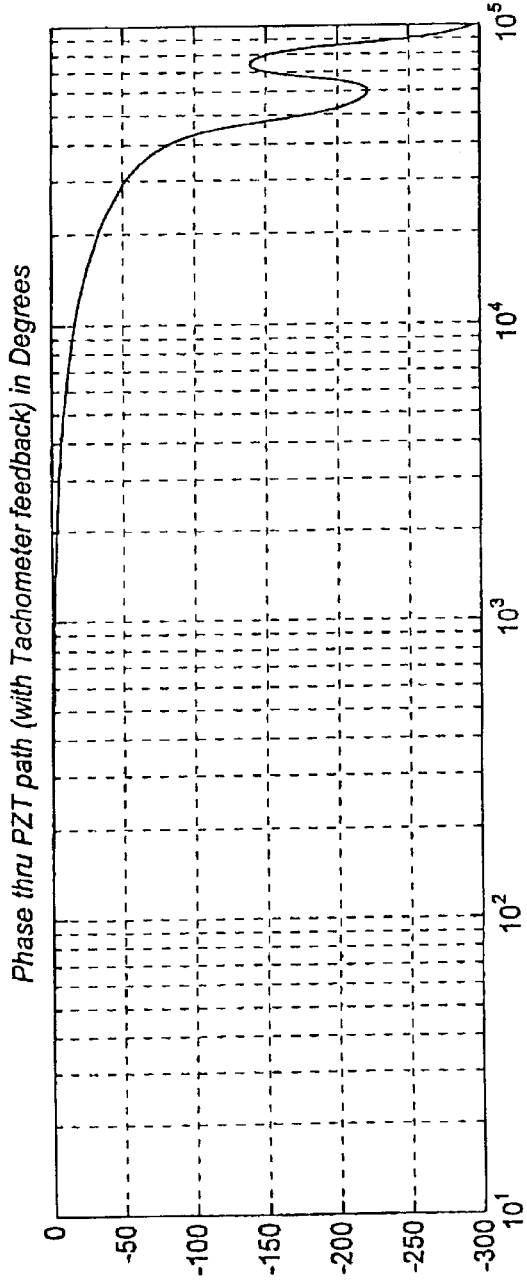
FIG._24-2

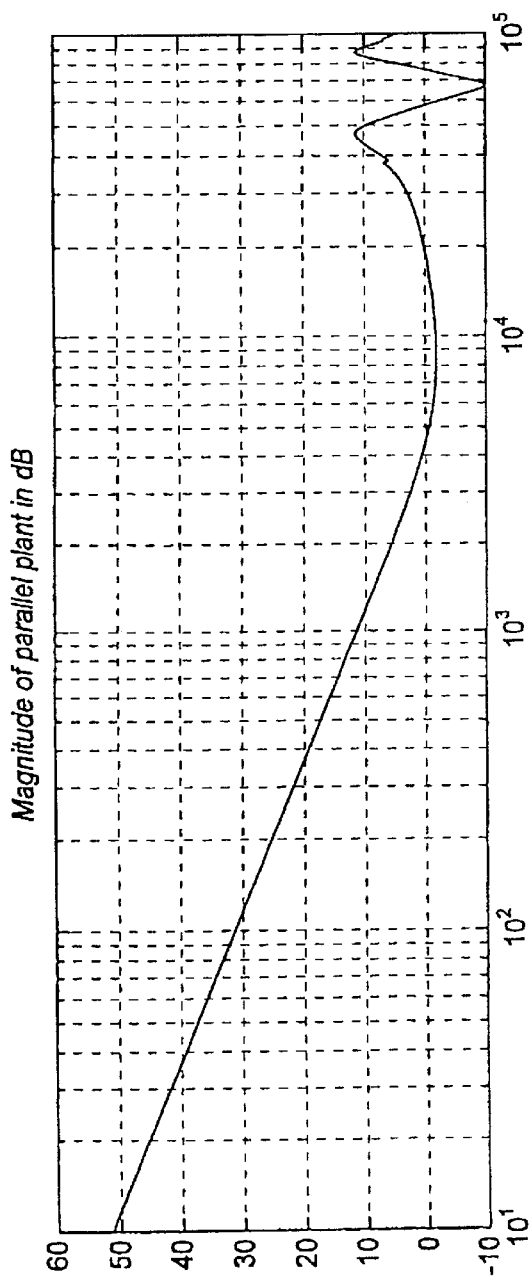
FIG._25-1
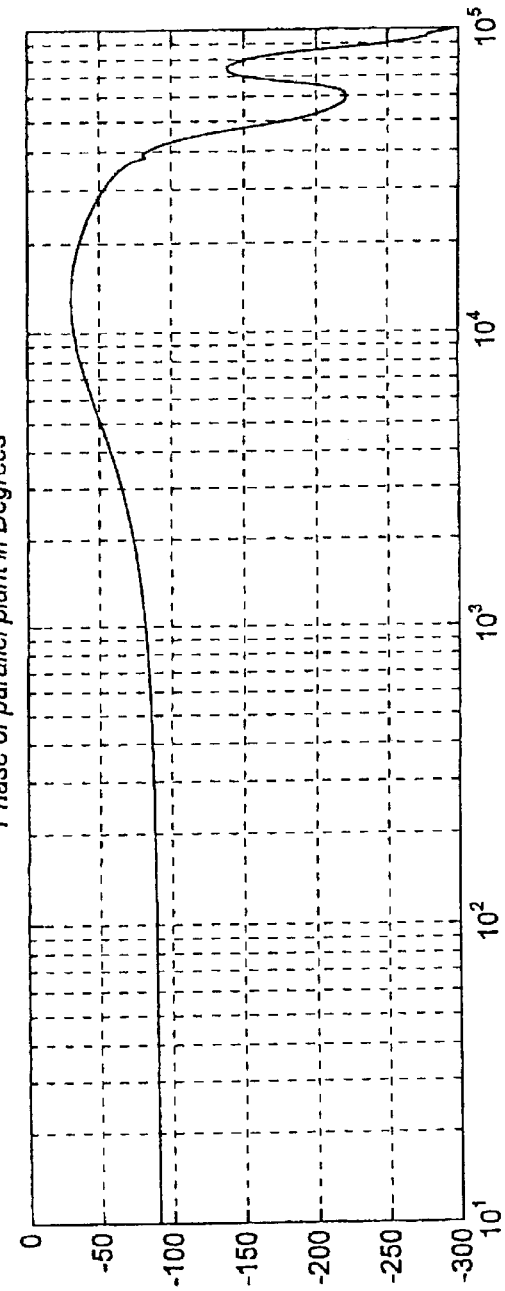
FIG._25-2

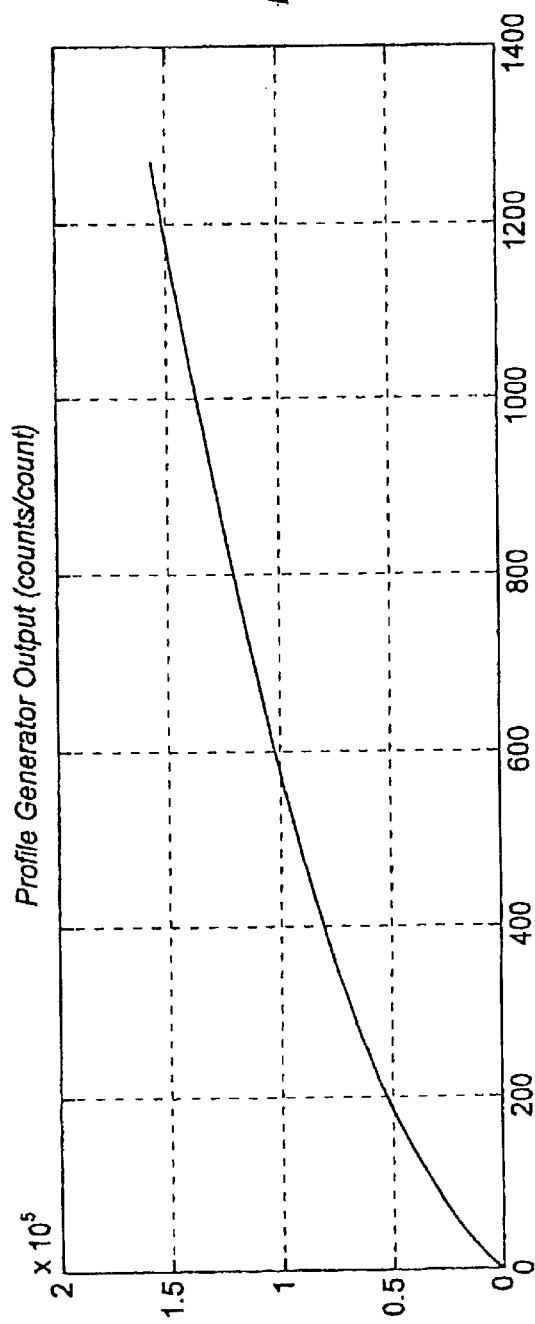
FIG._26-1
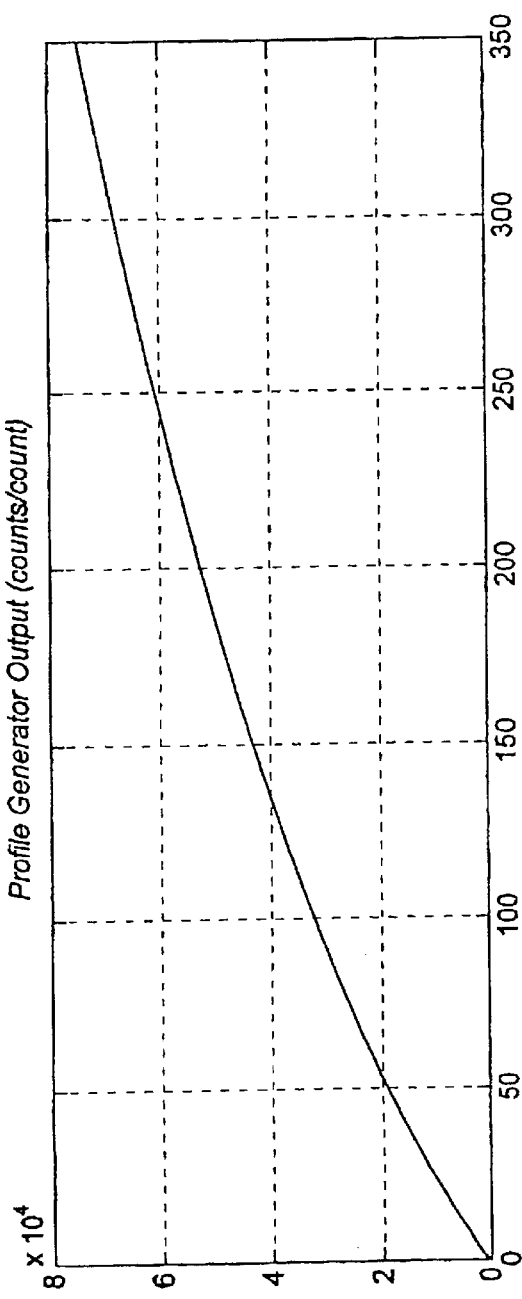
FIG._26-2

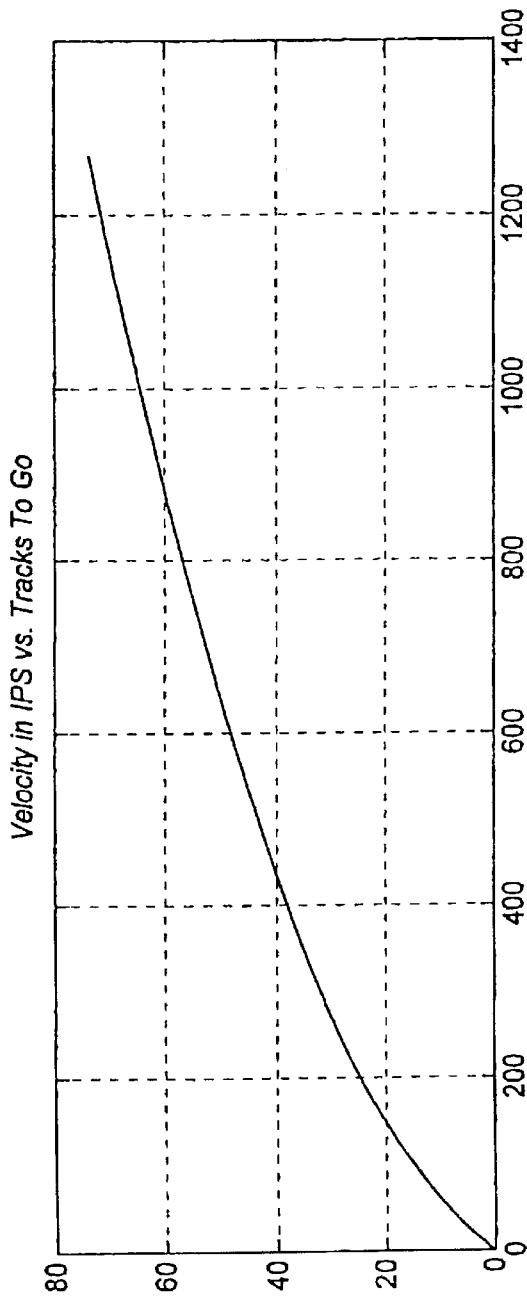
FIG._27-1
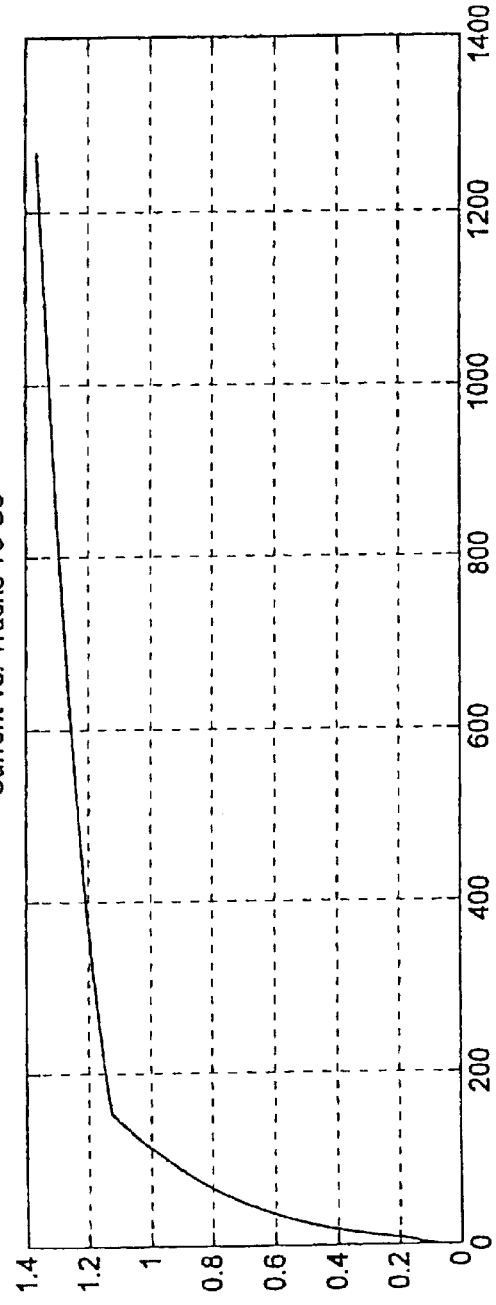
FIG._27-2

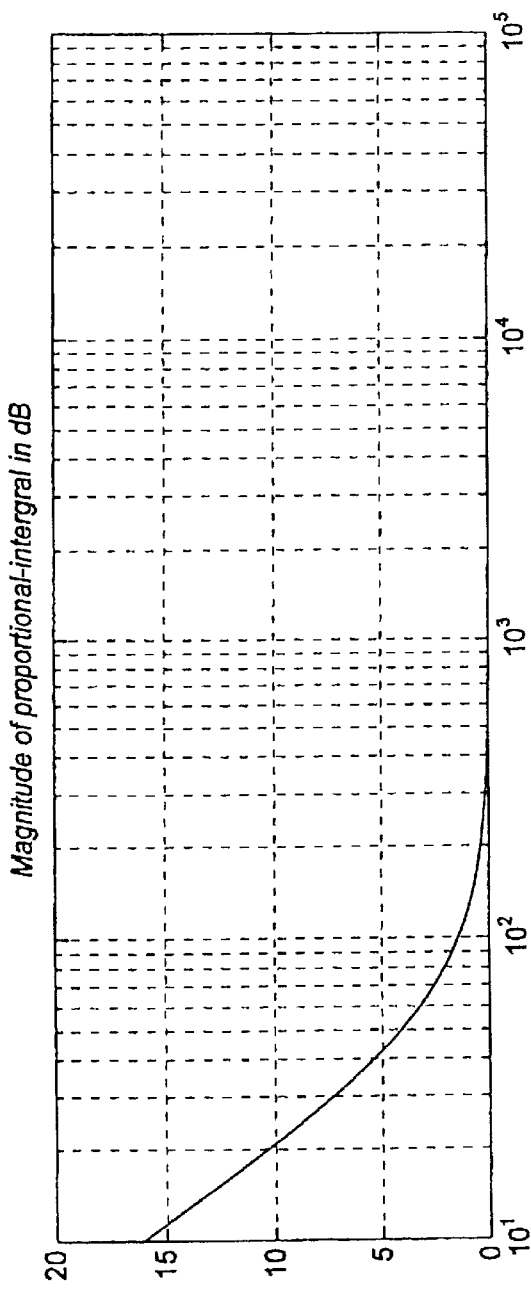
FIG._28-1
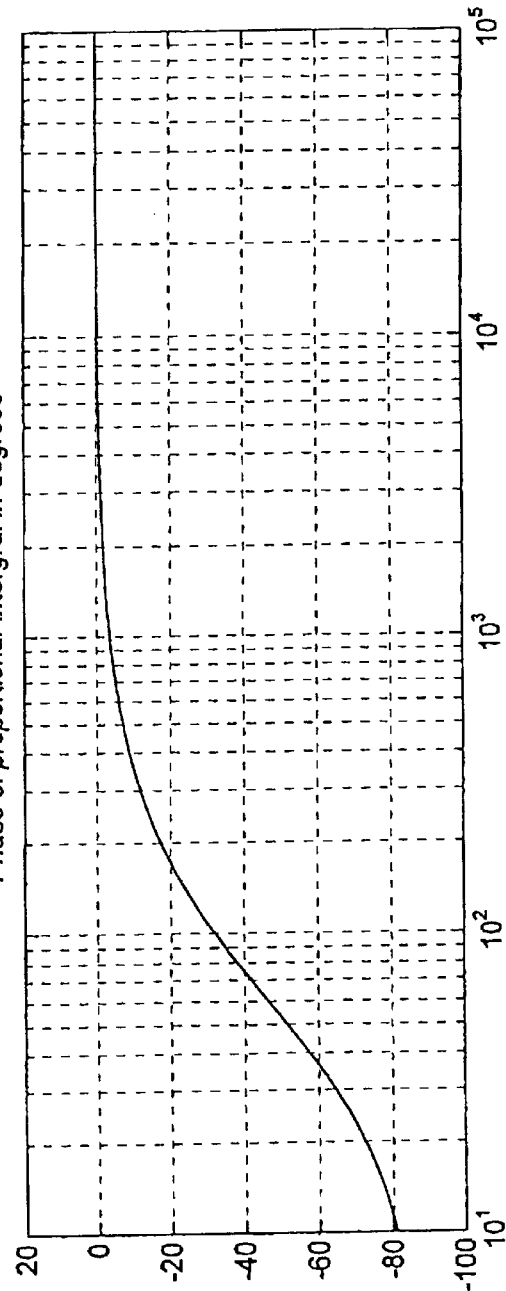
FIG._28-2

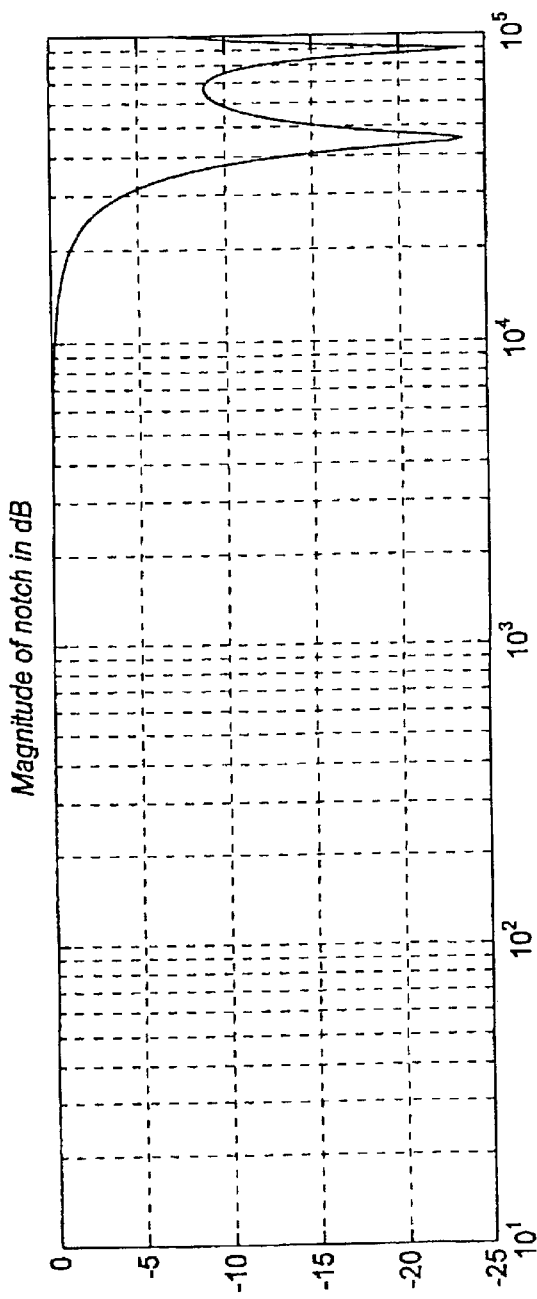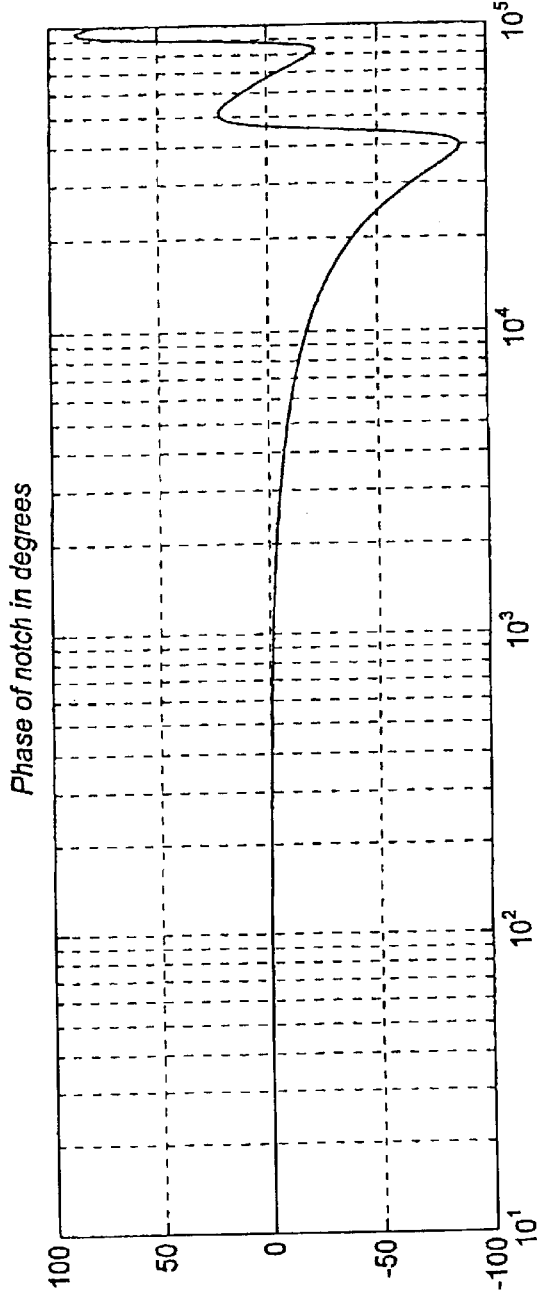
FIG._29-1
FIG._29-2

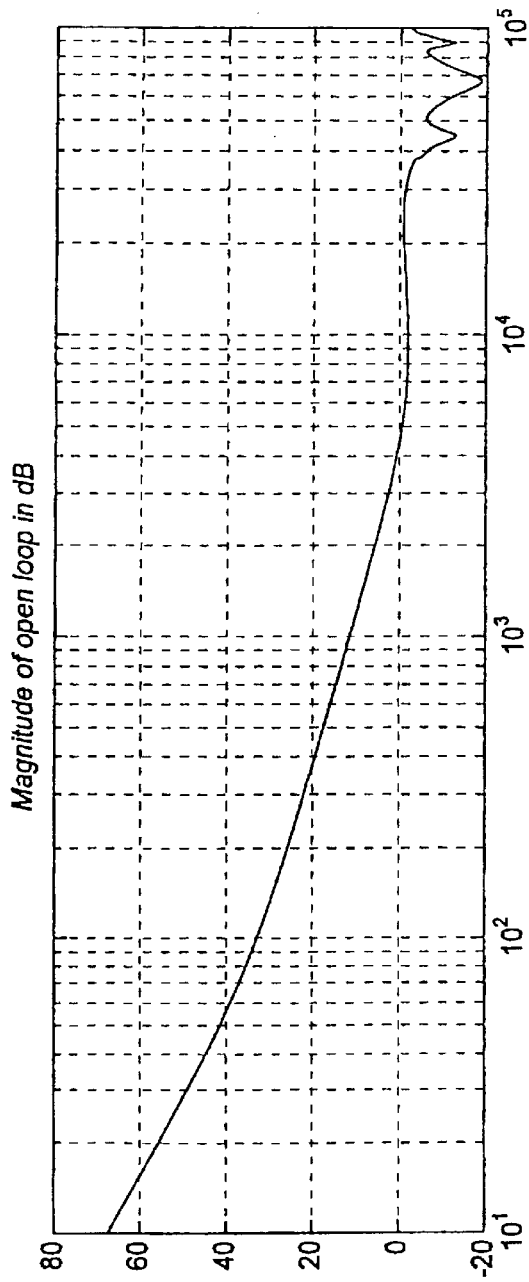
FIG._30-1
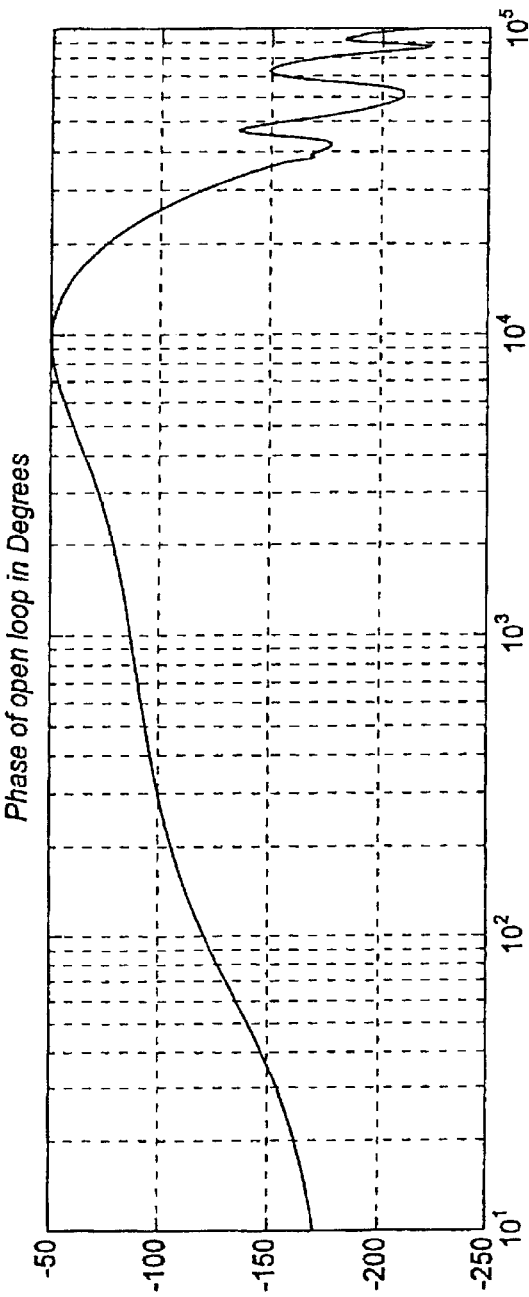
FIG._30-2

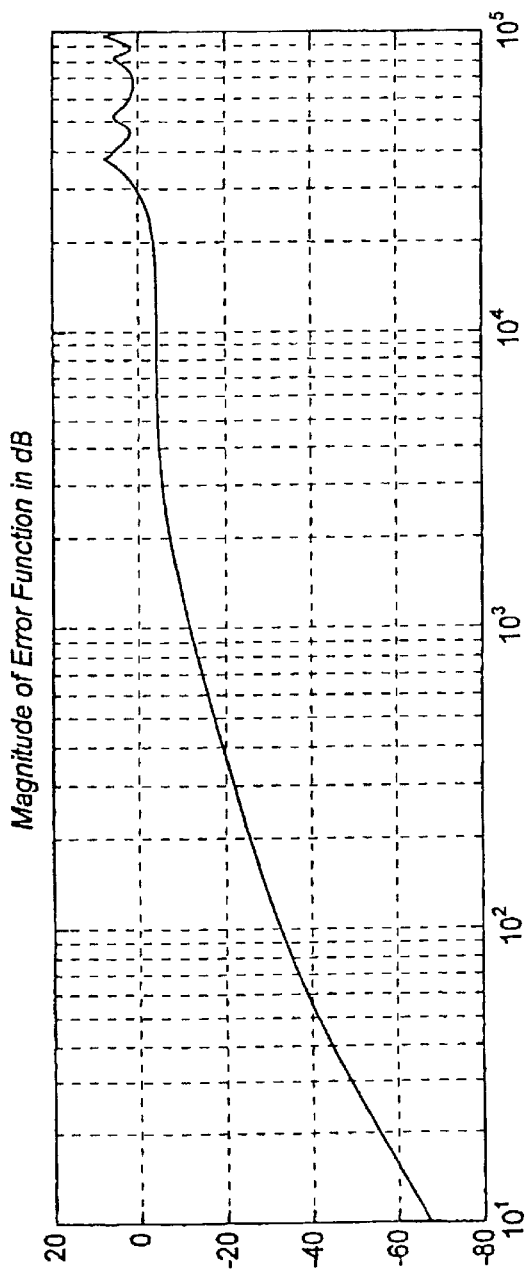
FIG._31-1
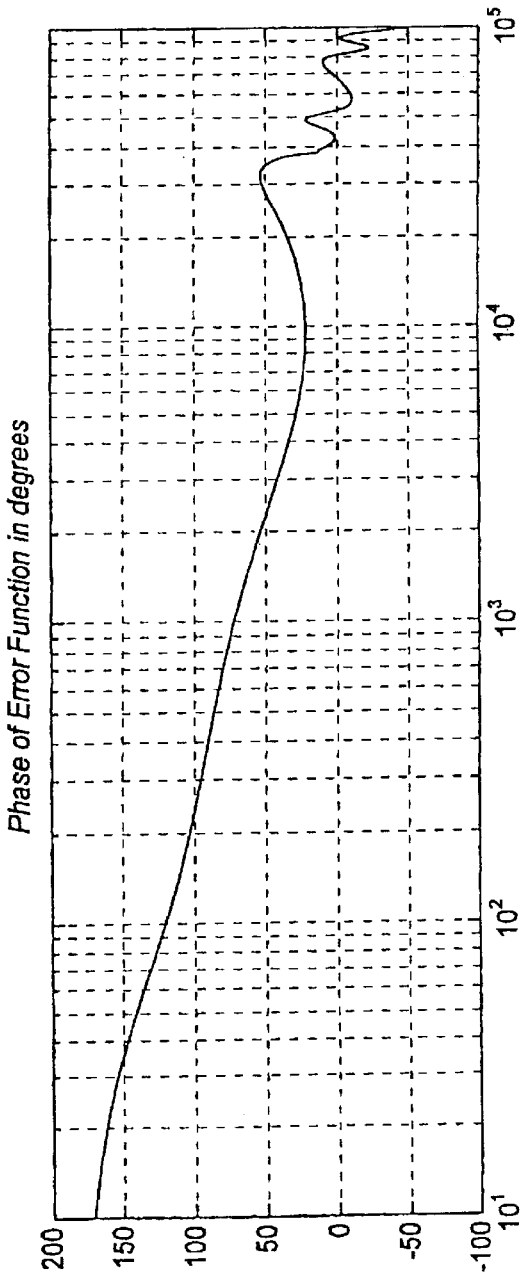
FIG._31-2

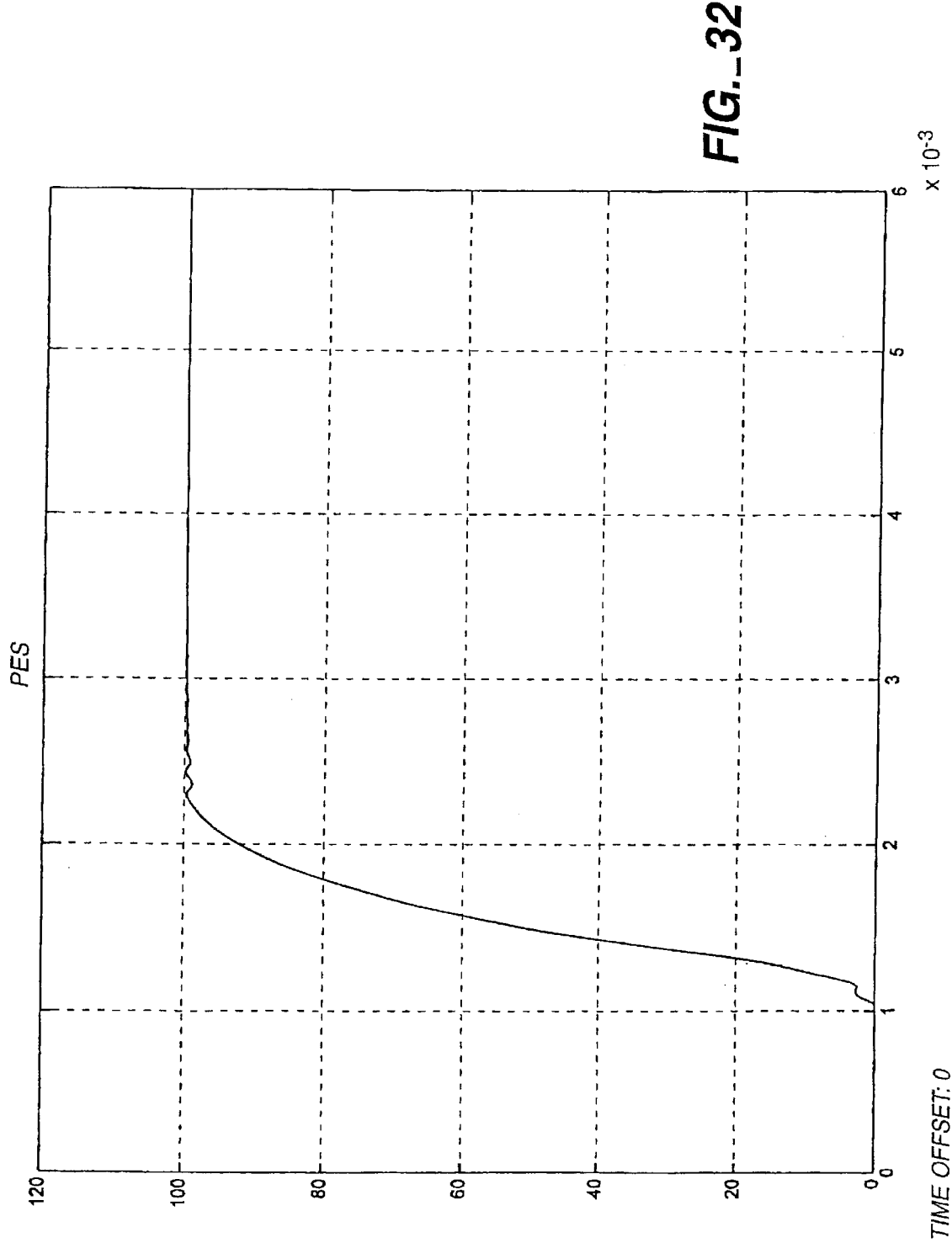
FIG._32

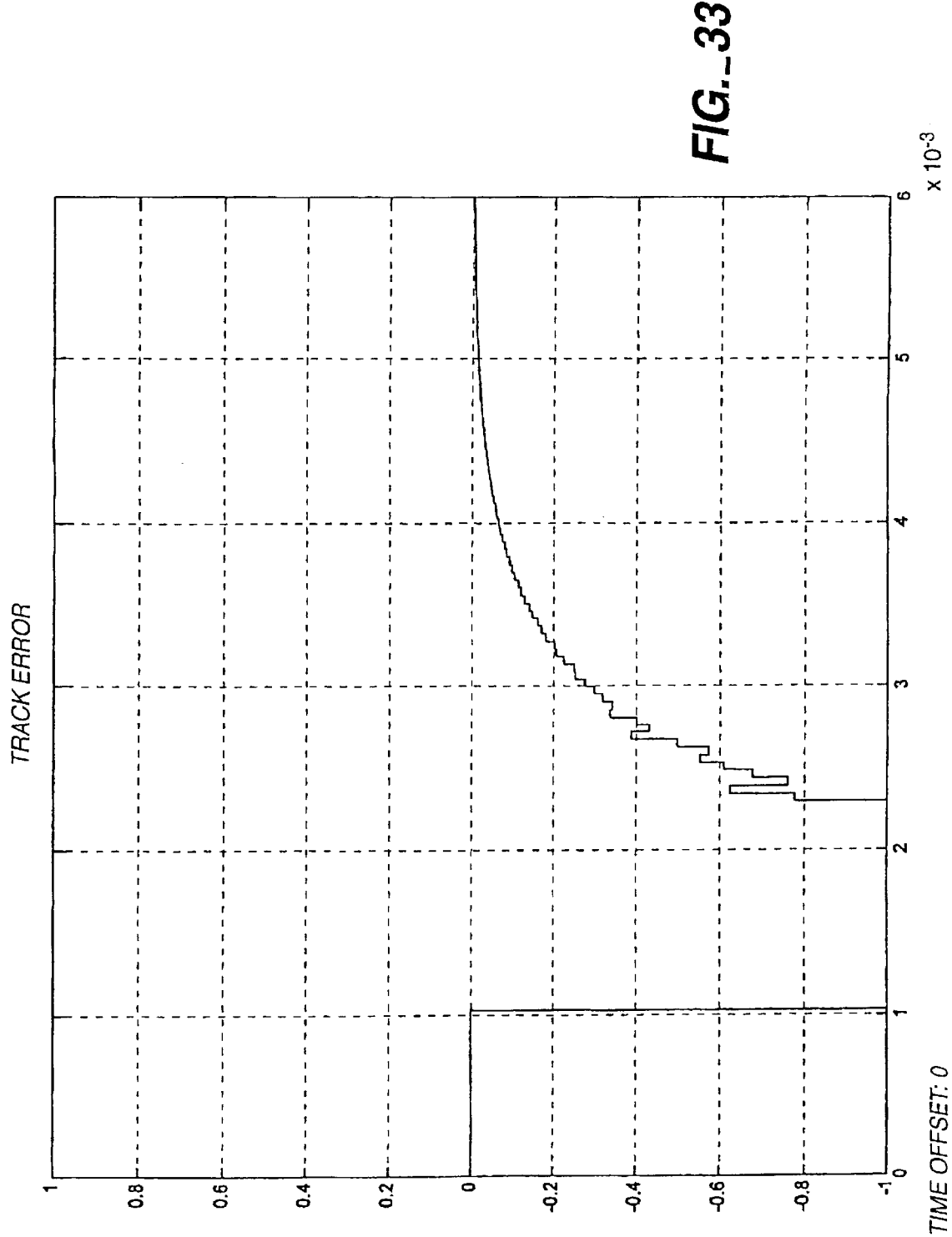

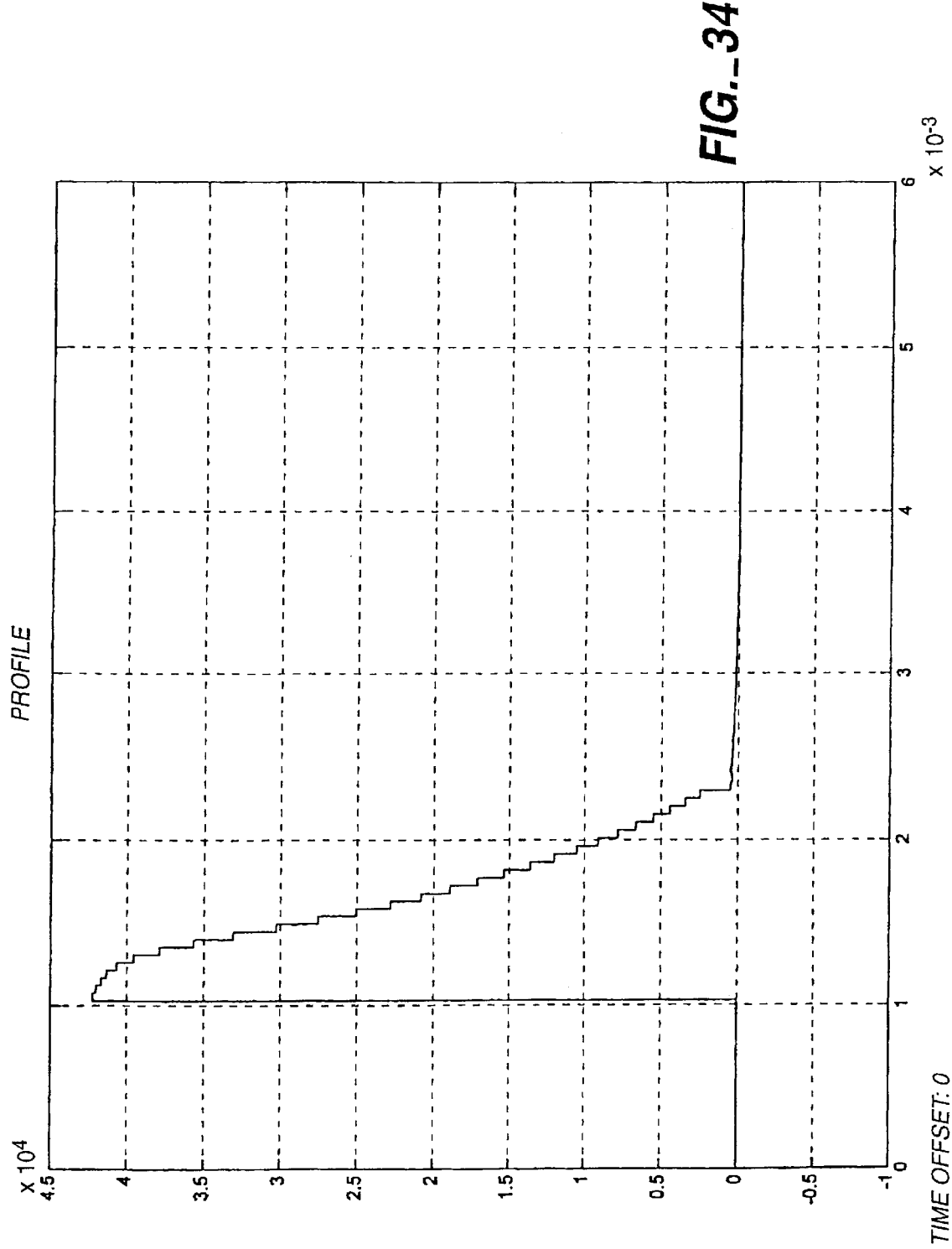
FIG._34

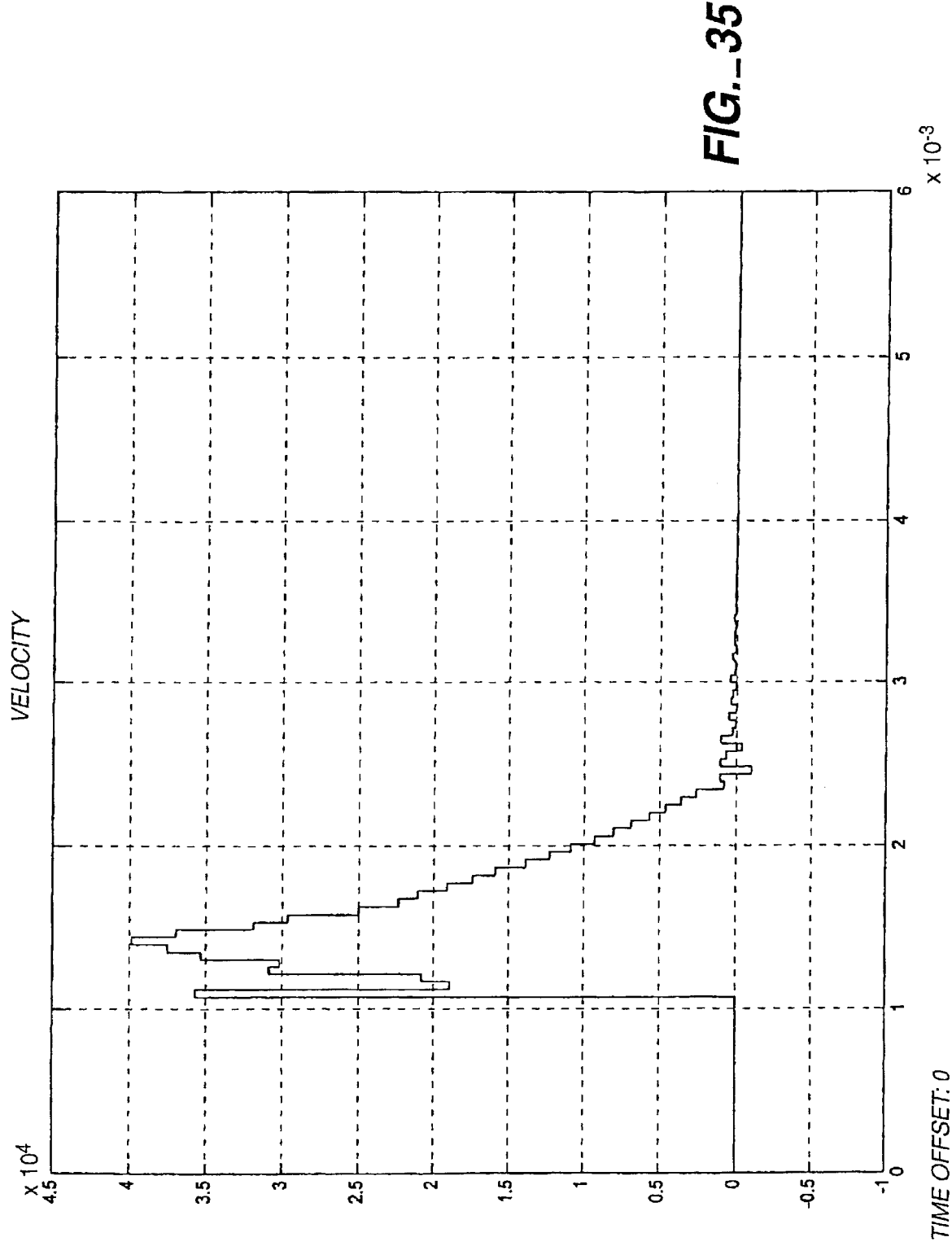
FIG._35

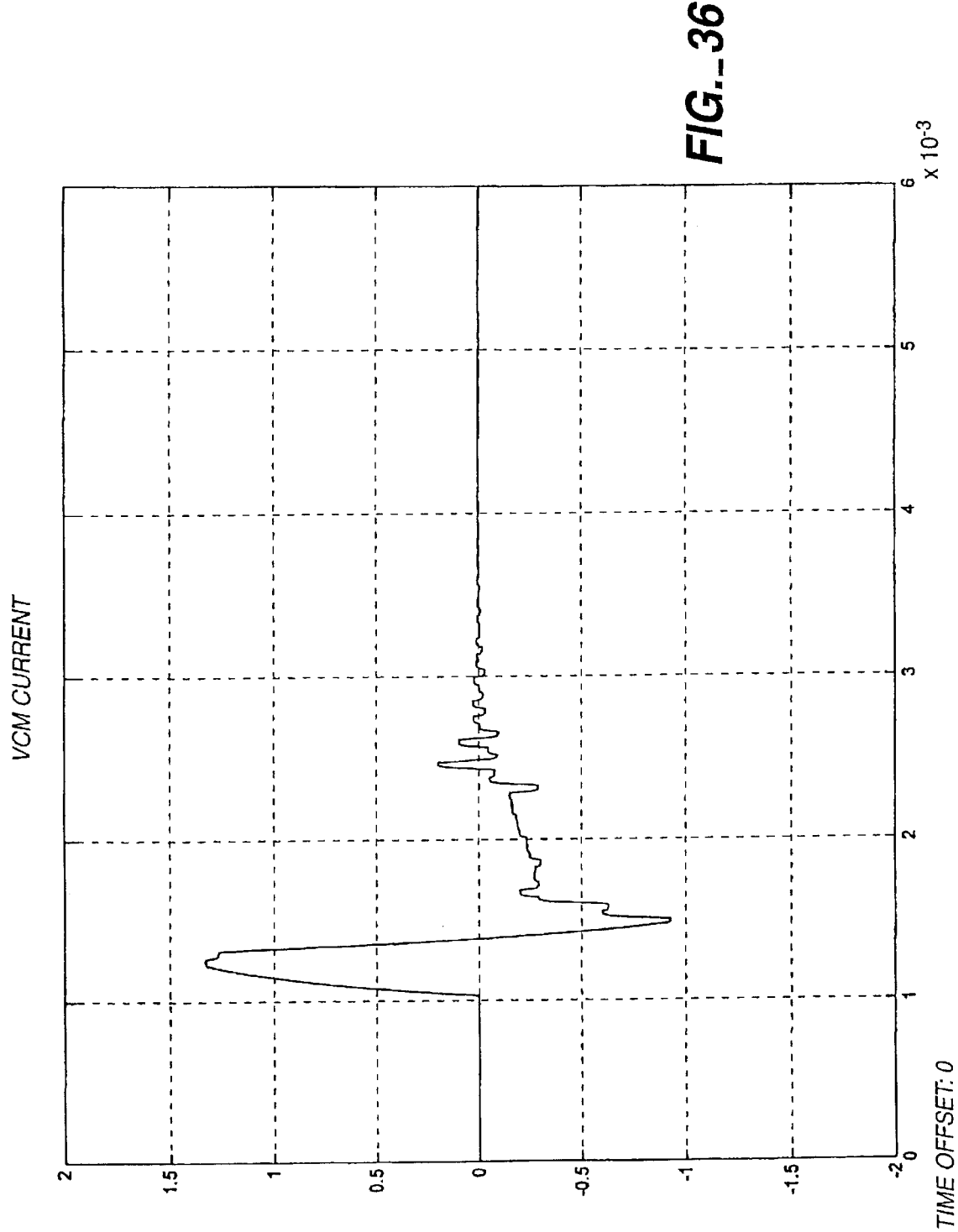
FIG._36

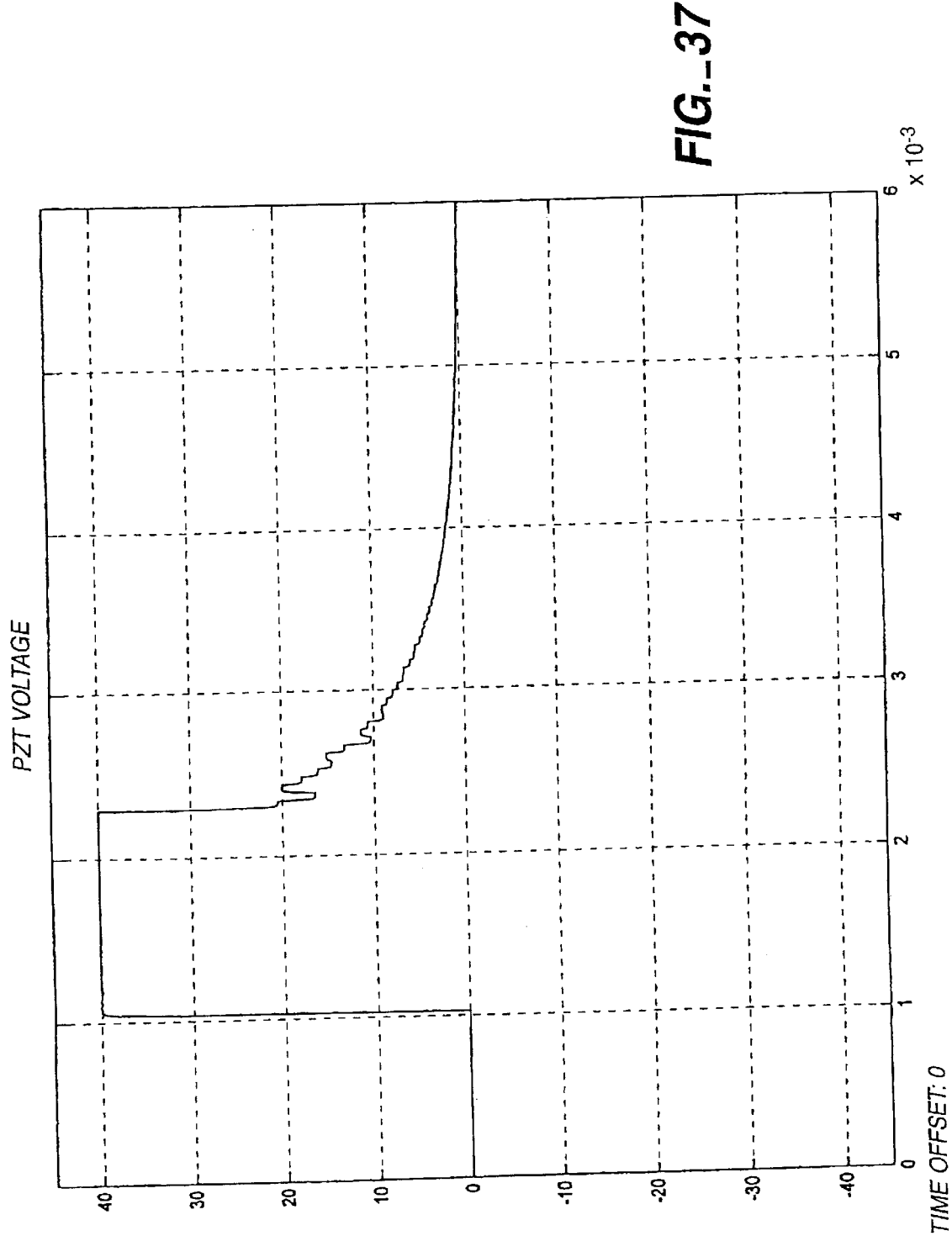
FIG._37

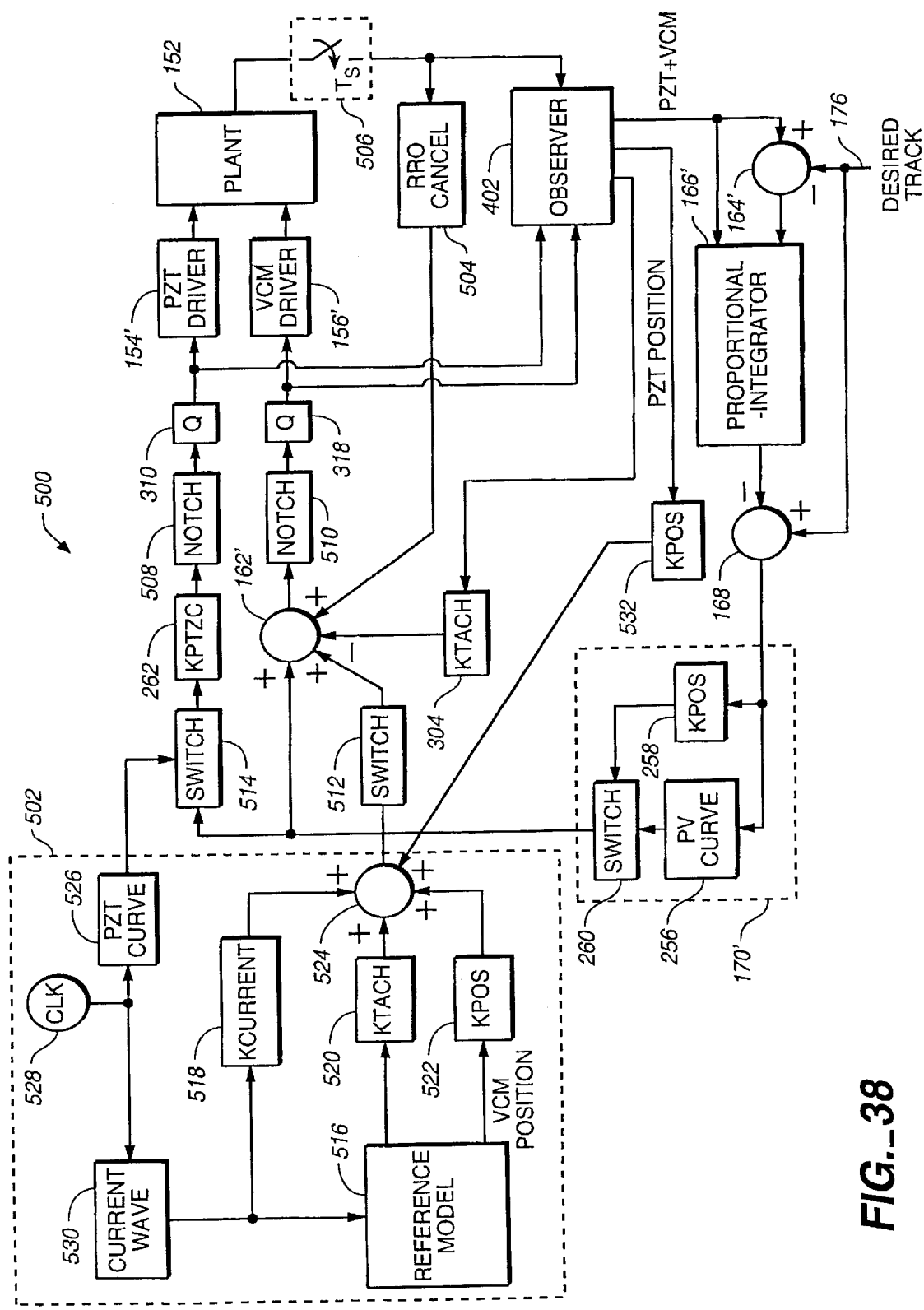
FIG._38

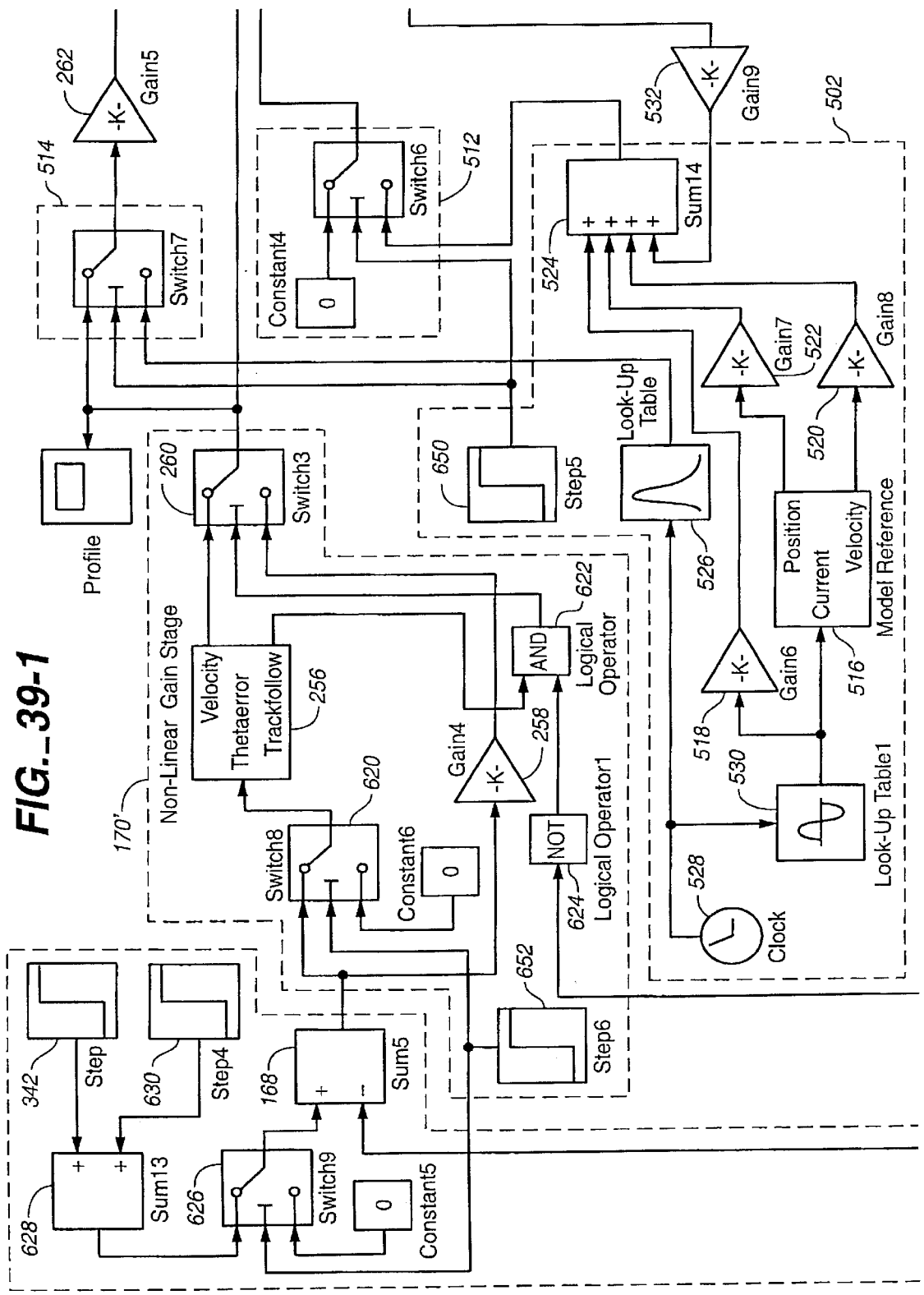
FIG._39-1

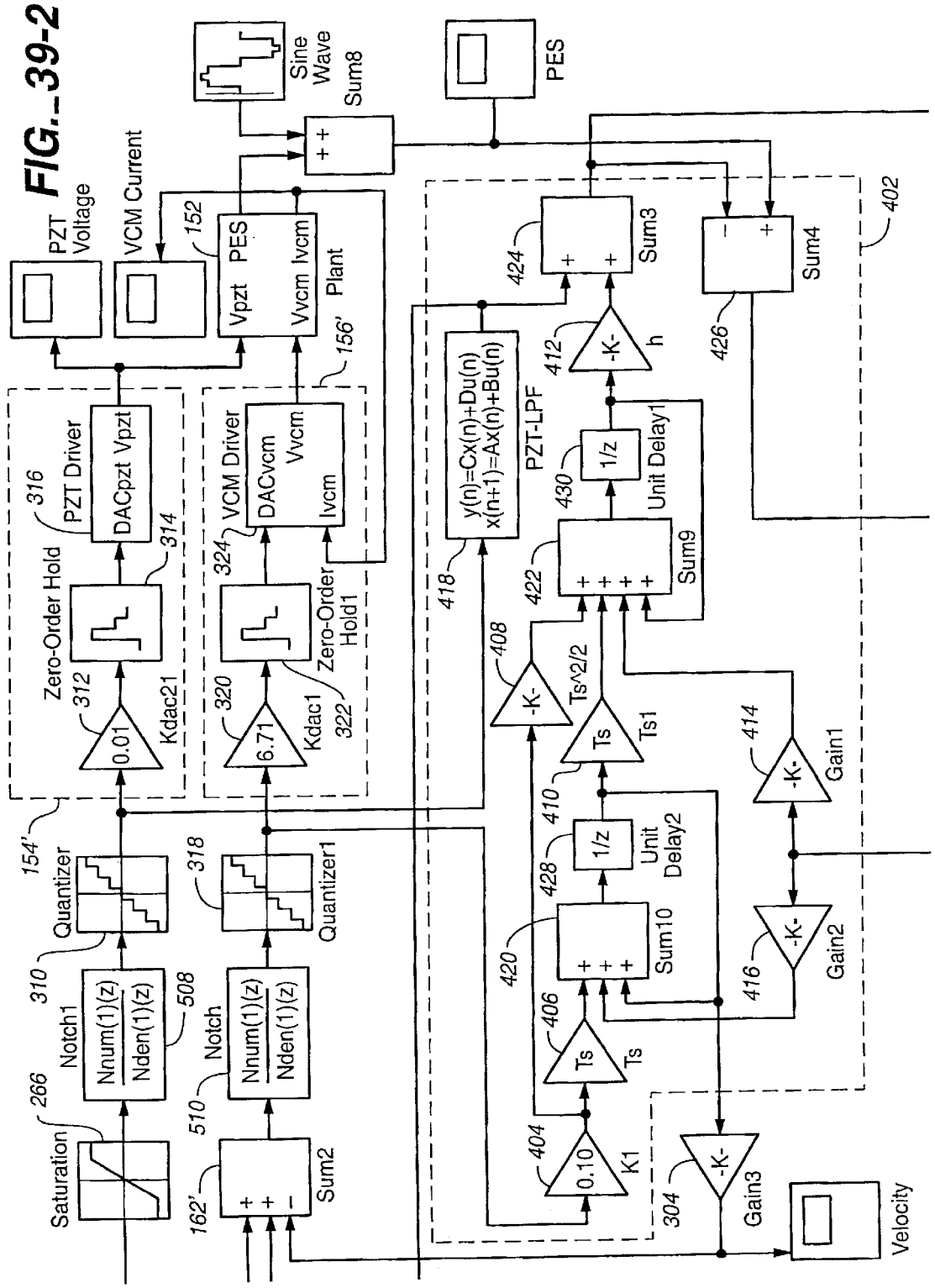
FIG._39-2

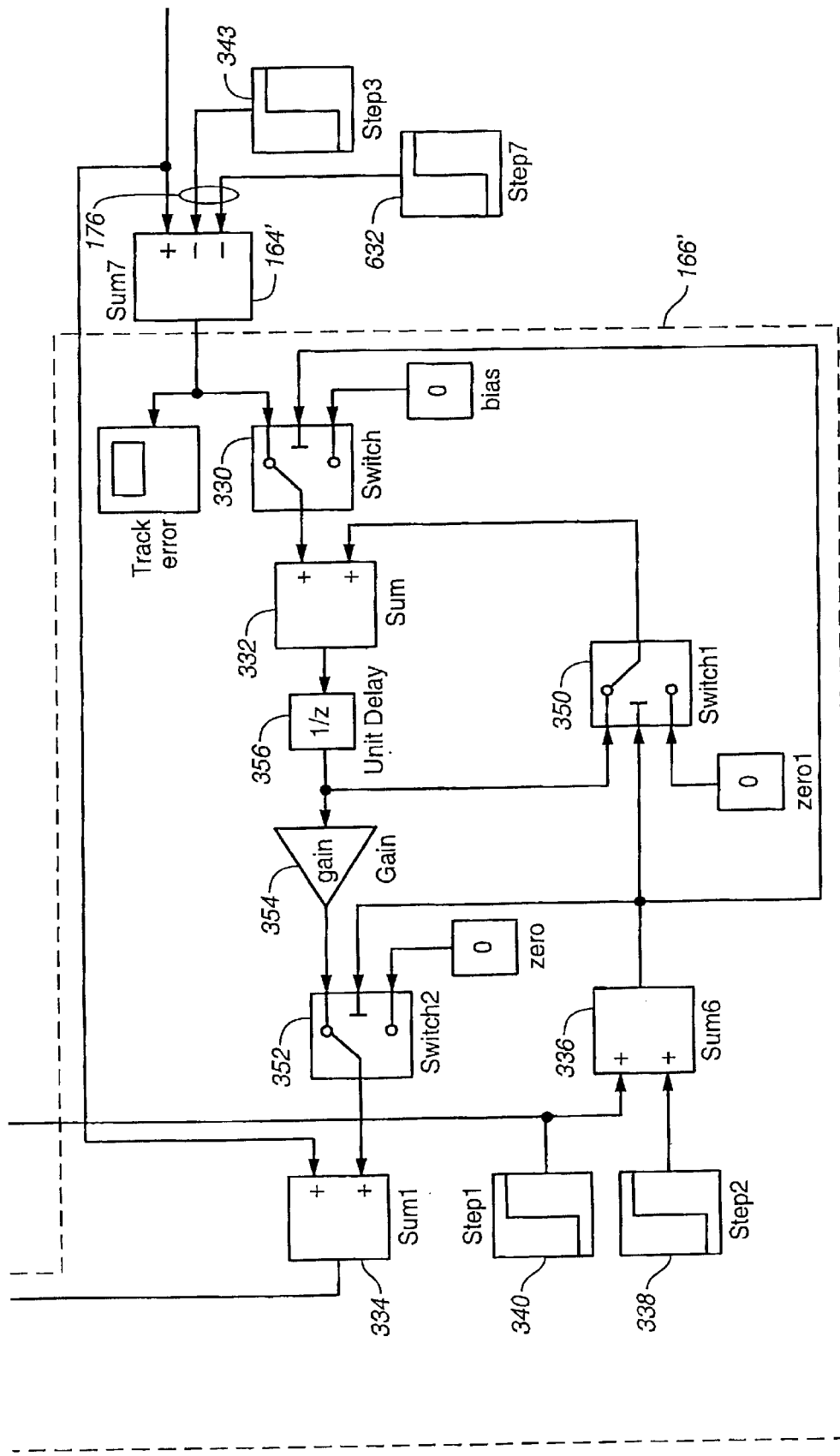
FIG._39-3

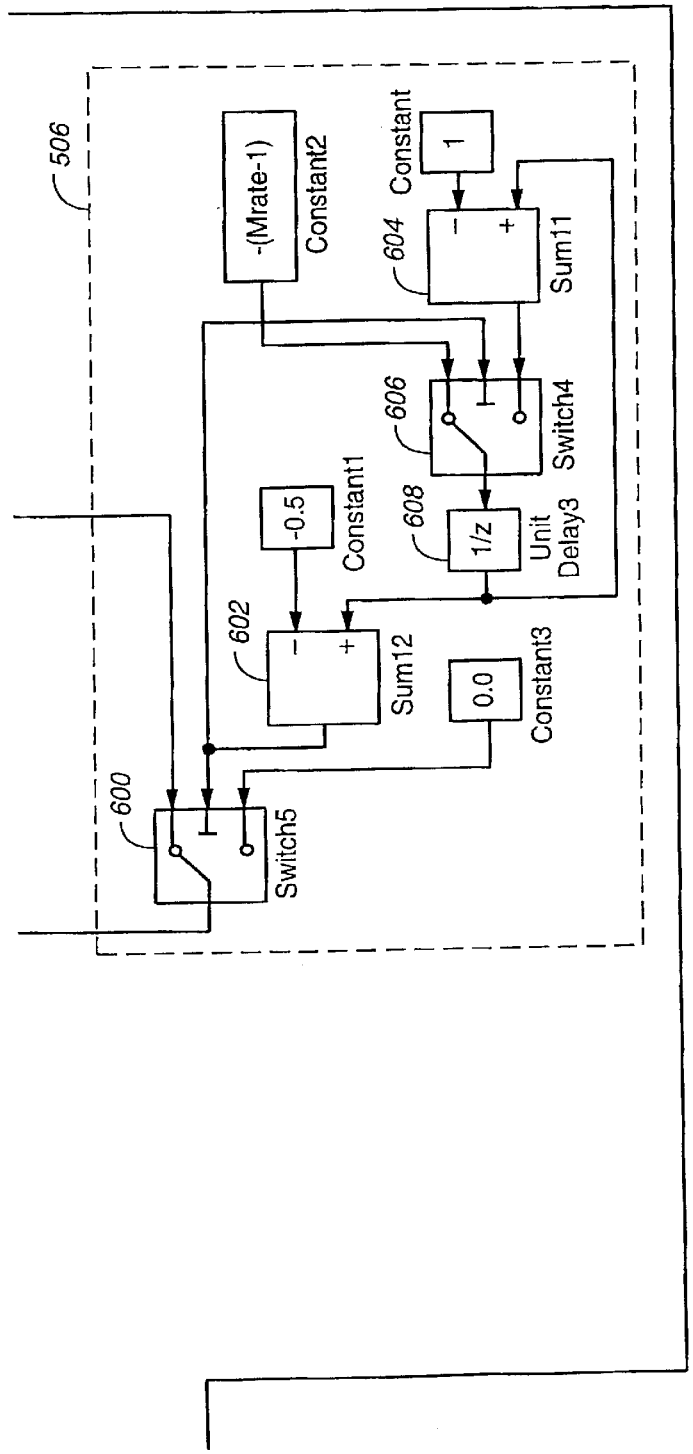
FIG._39-4
FIG._39

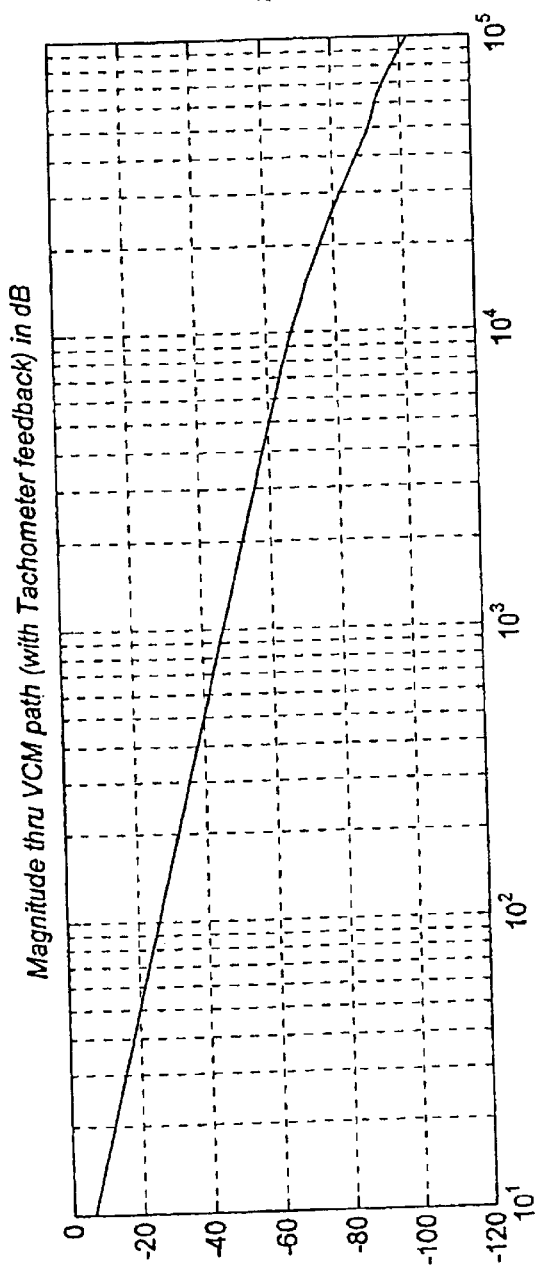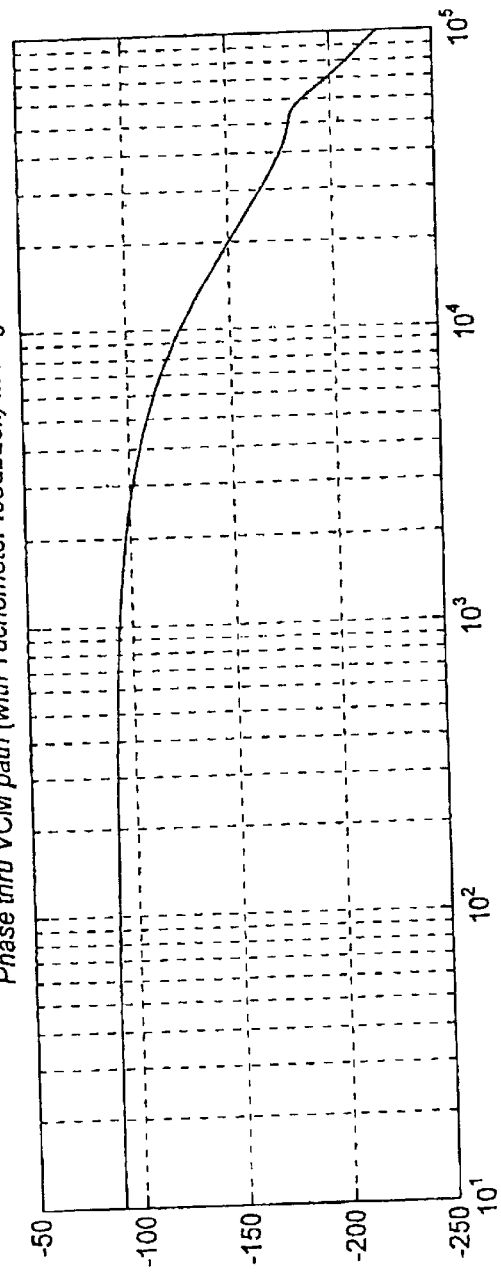

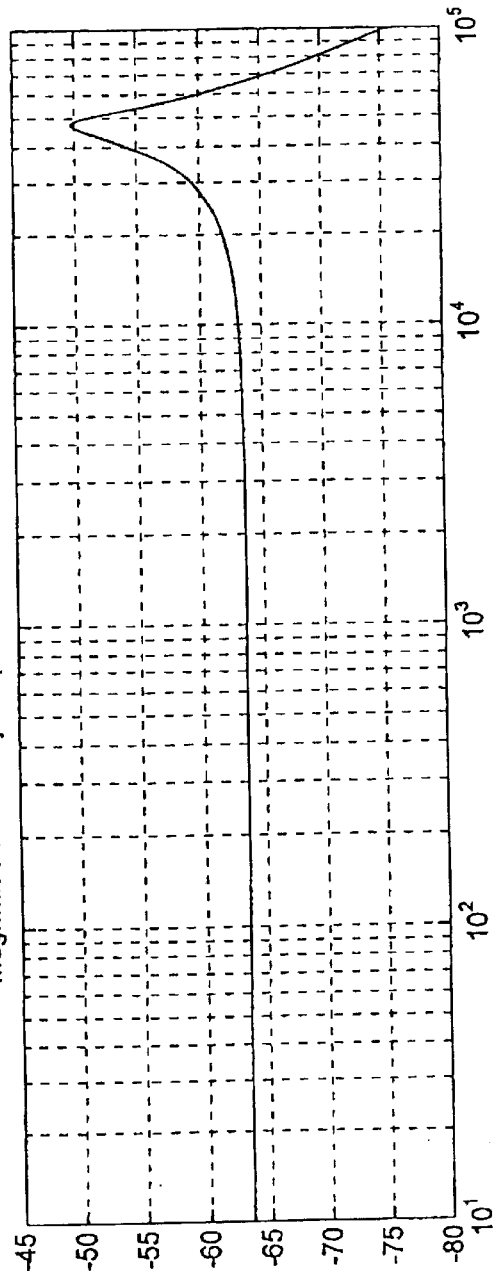
FIG._41-1
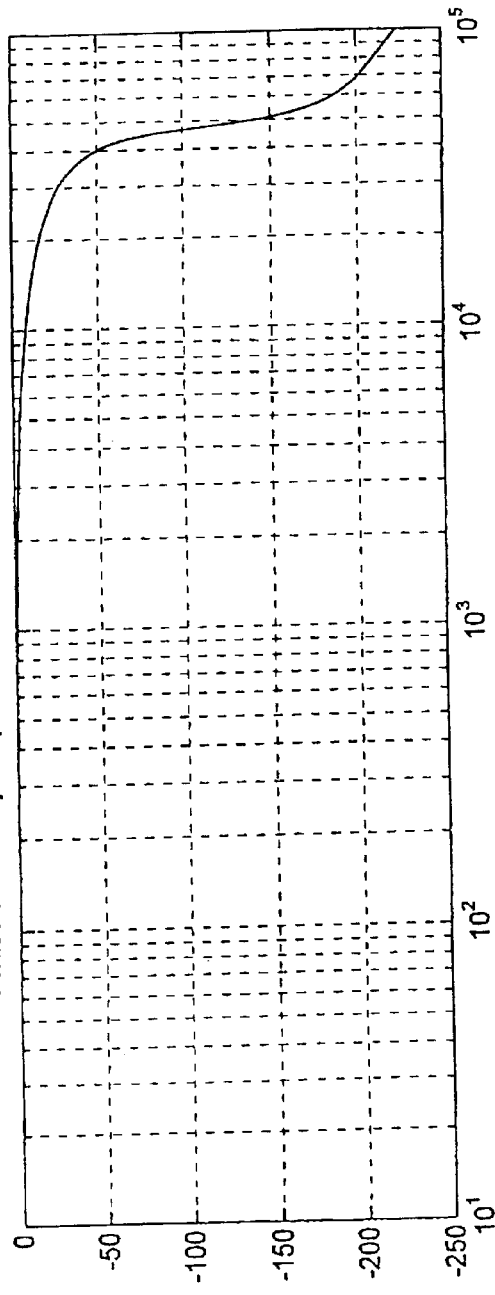
FIG._41-2

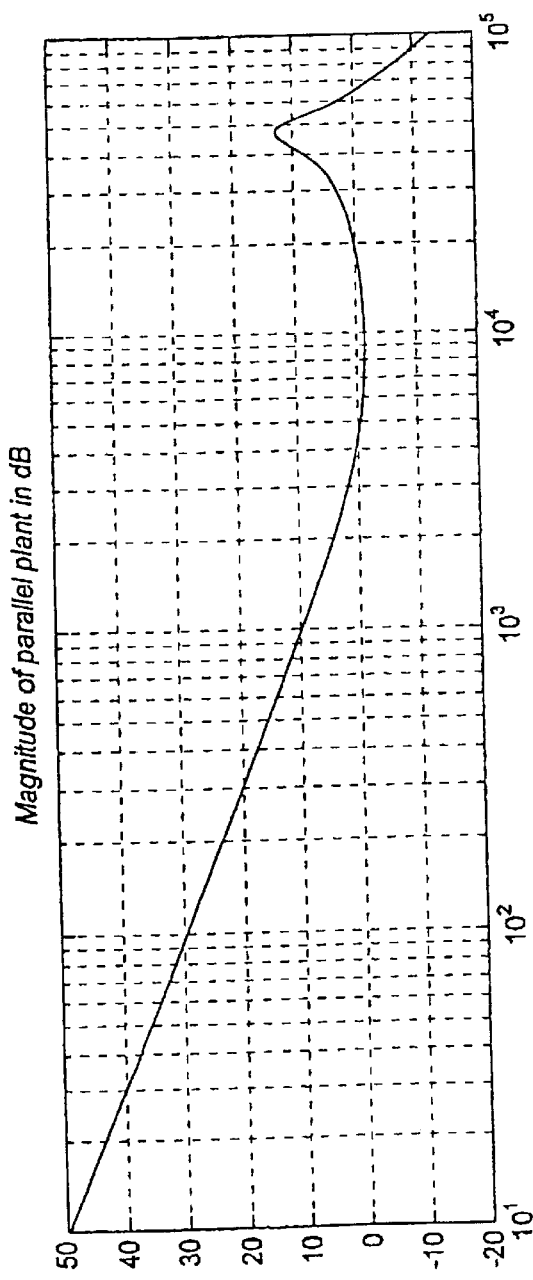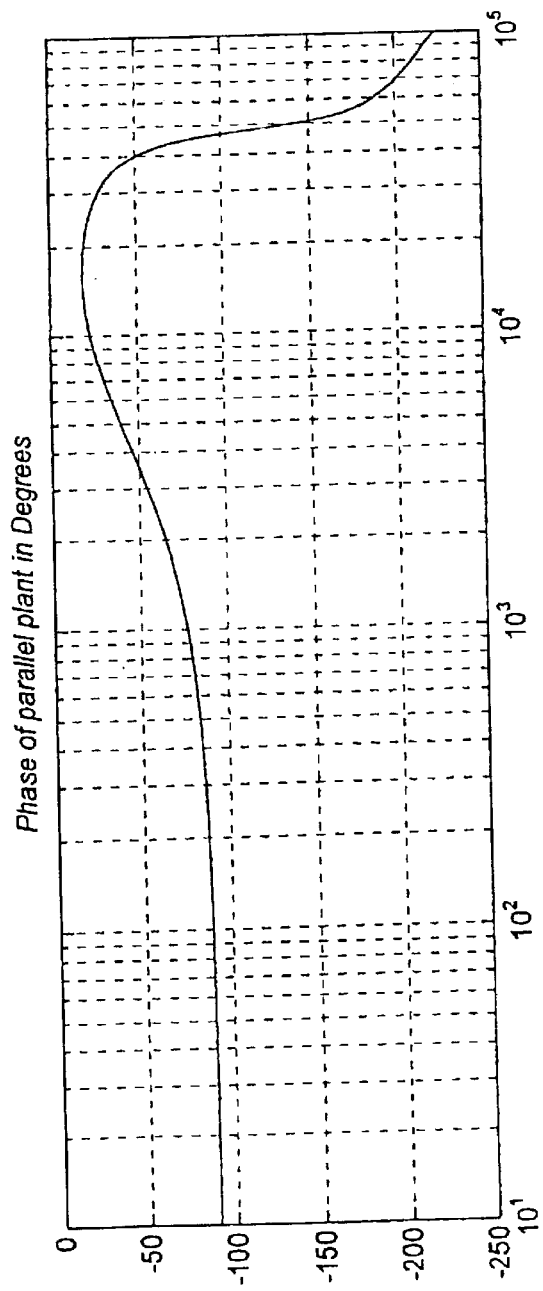

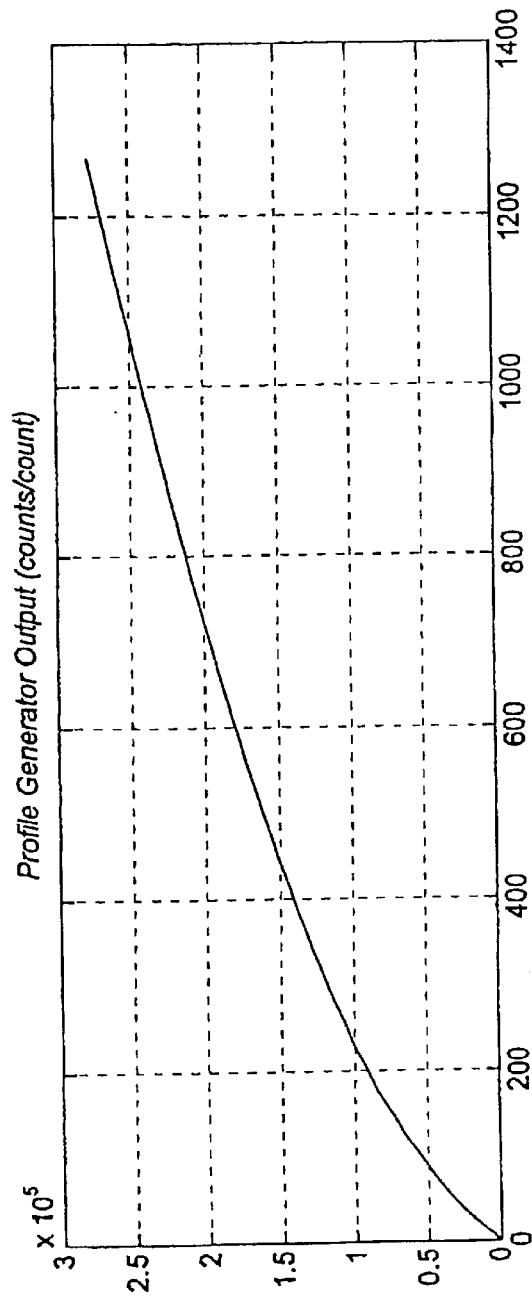
FIG._43-1
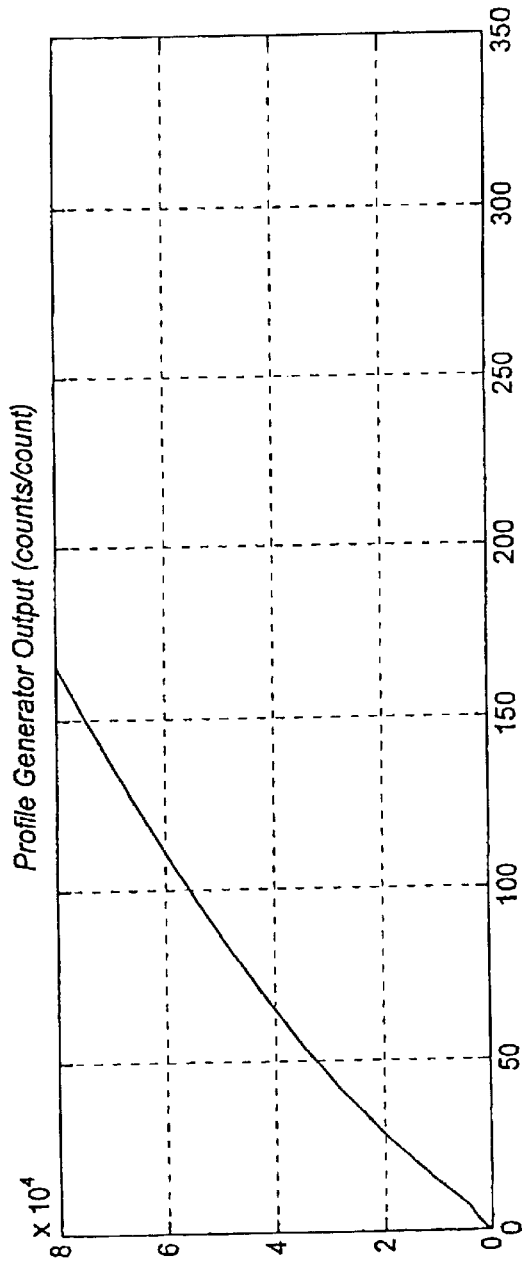
FIG._43-2

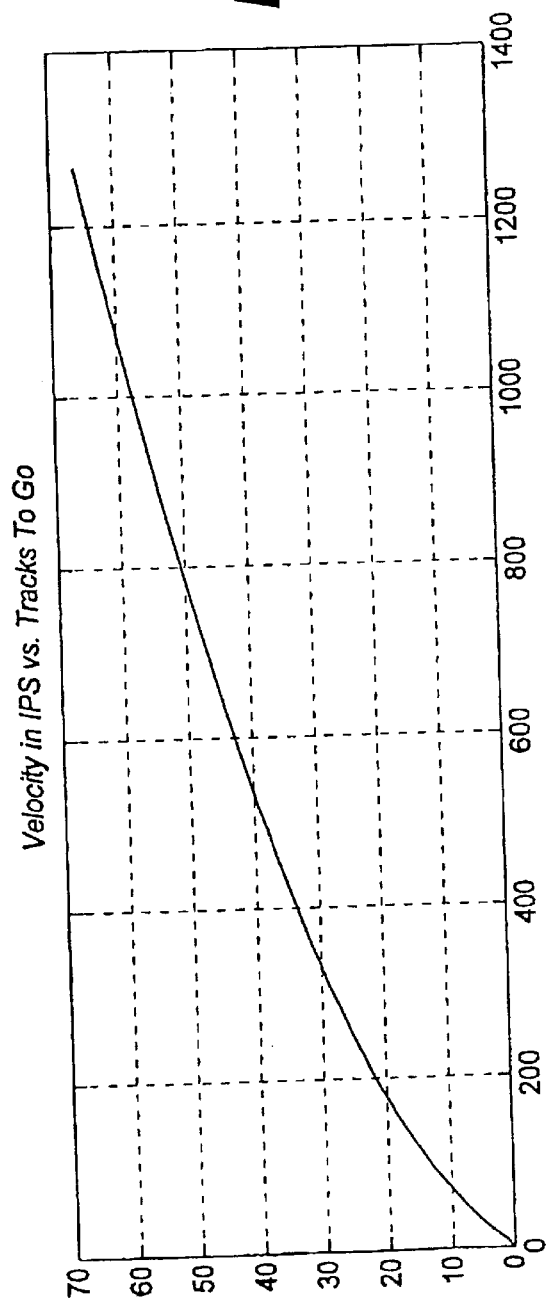
FIG._44-1
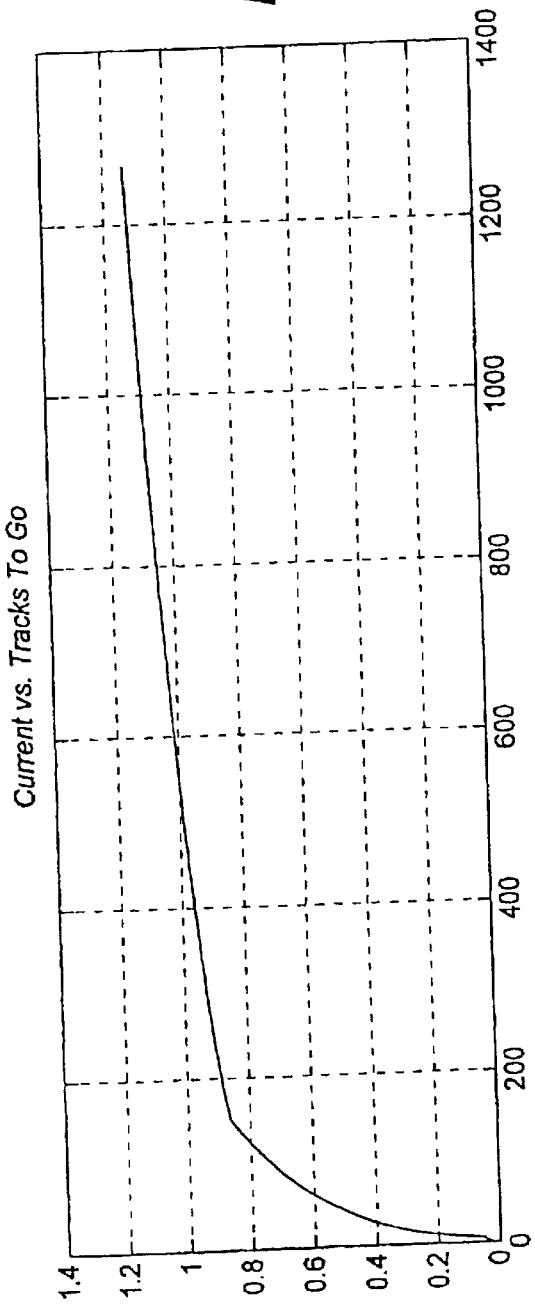
FIG._44-2

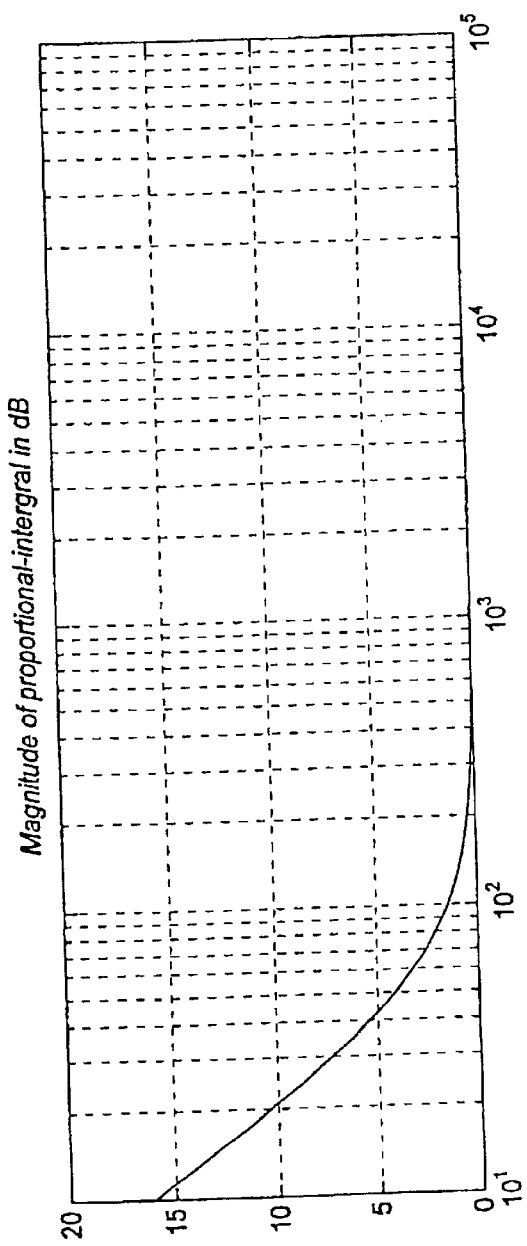
FIG._45-1
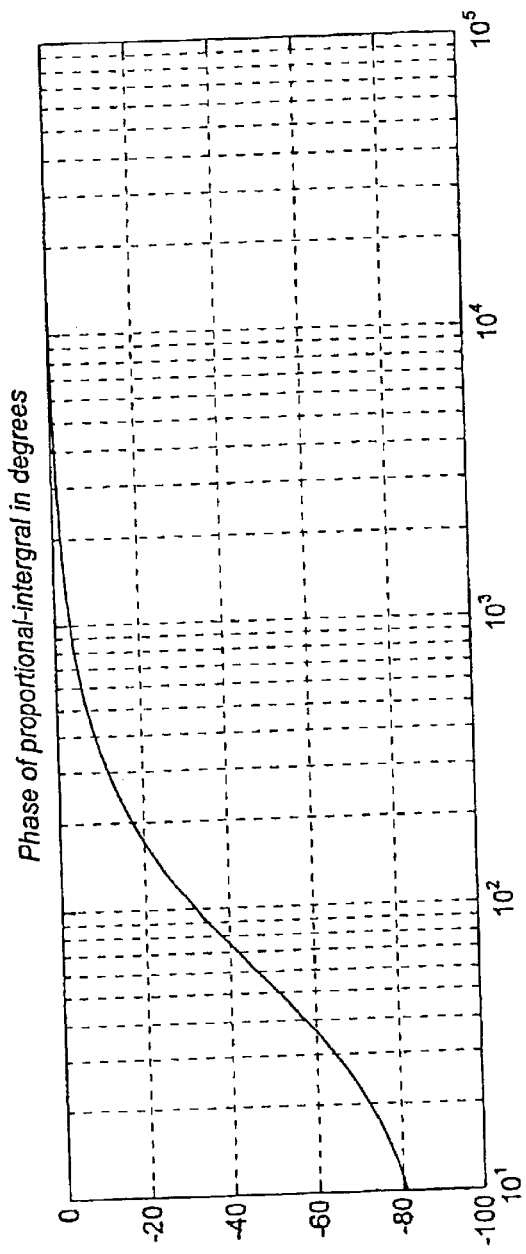
FIG._45-2

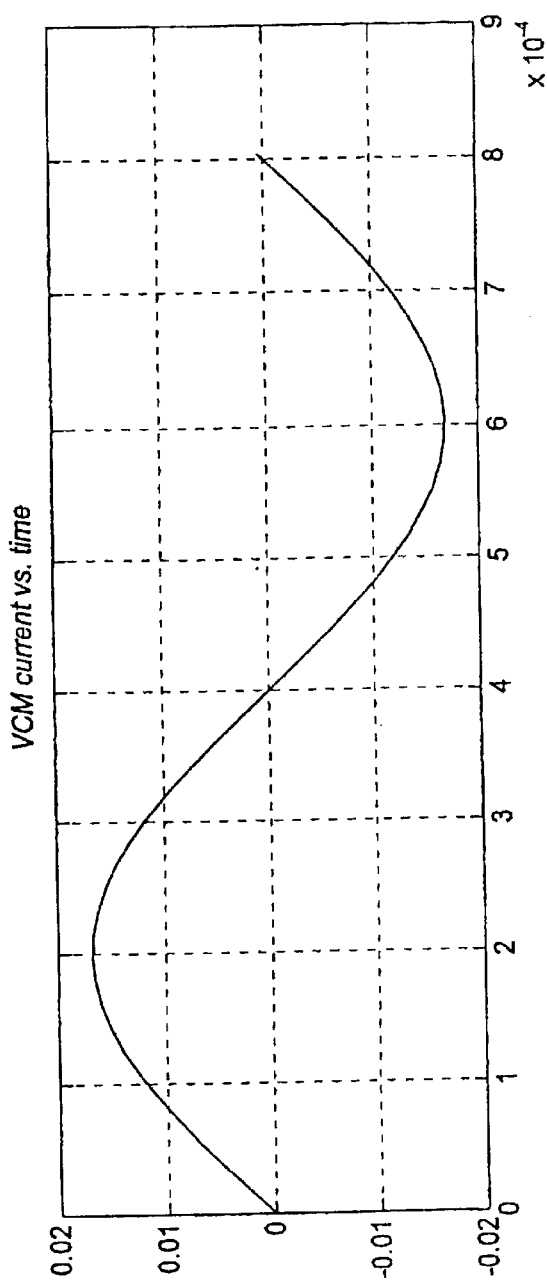
FIG._46-1
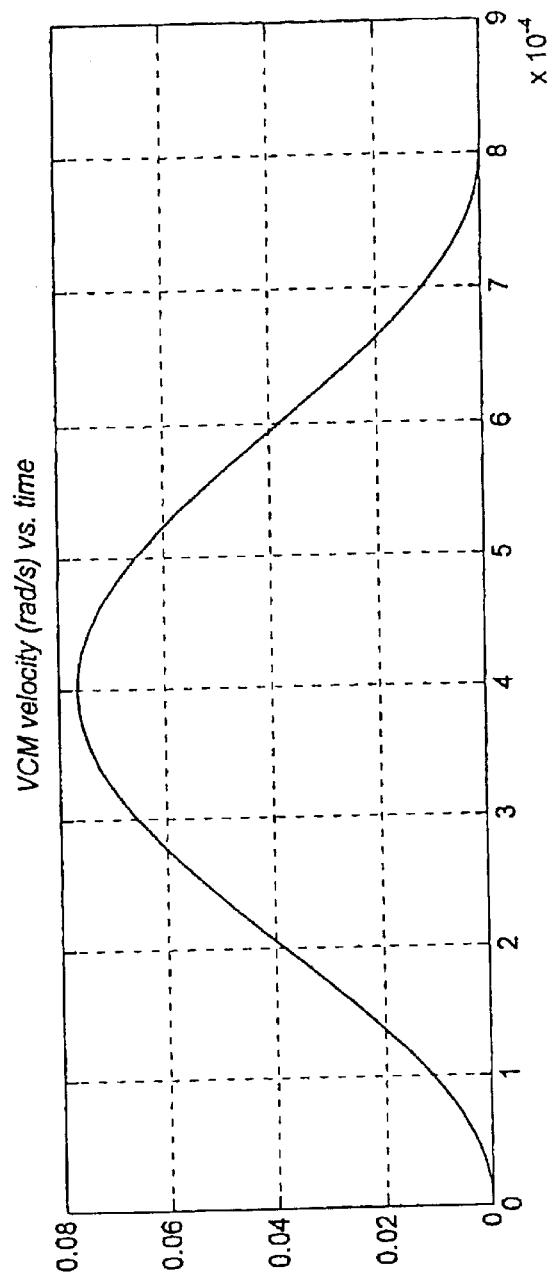
FIG._46-2

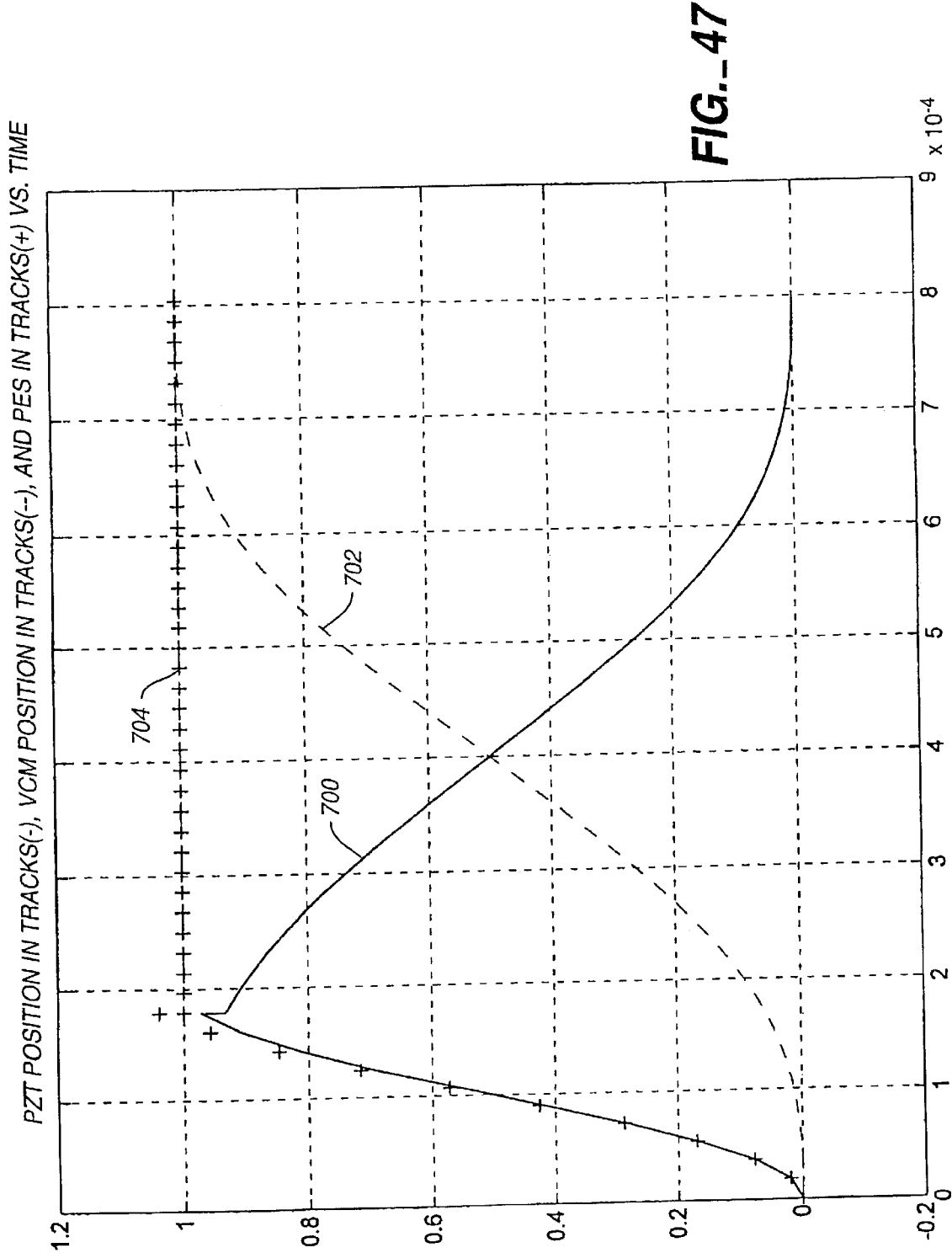
FIG._47

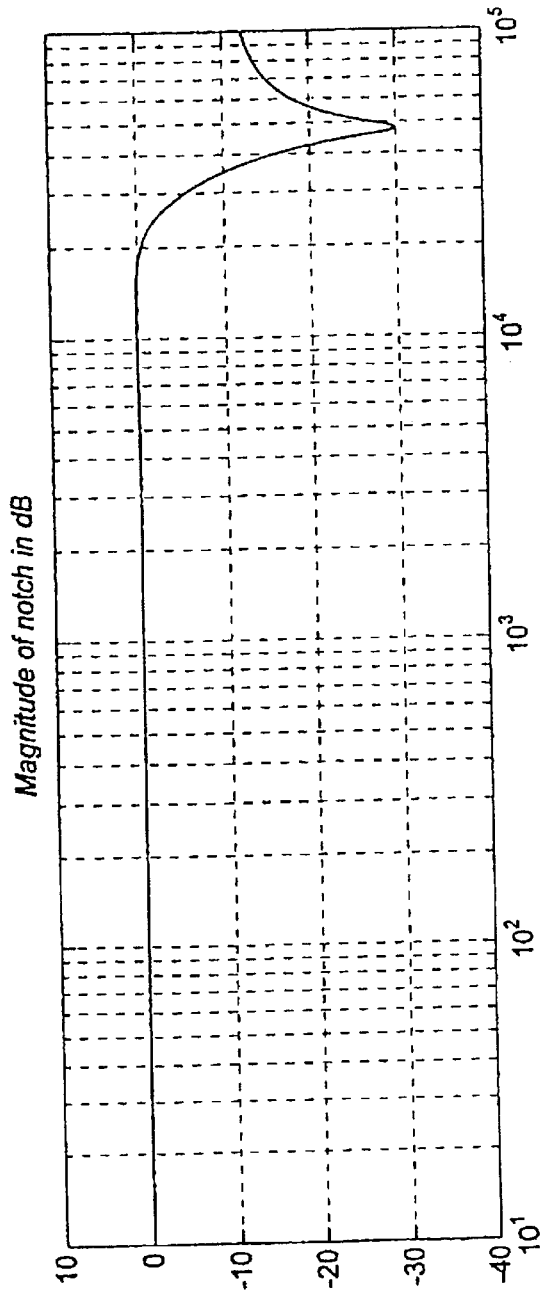
FIG._48-1
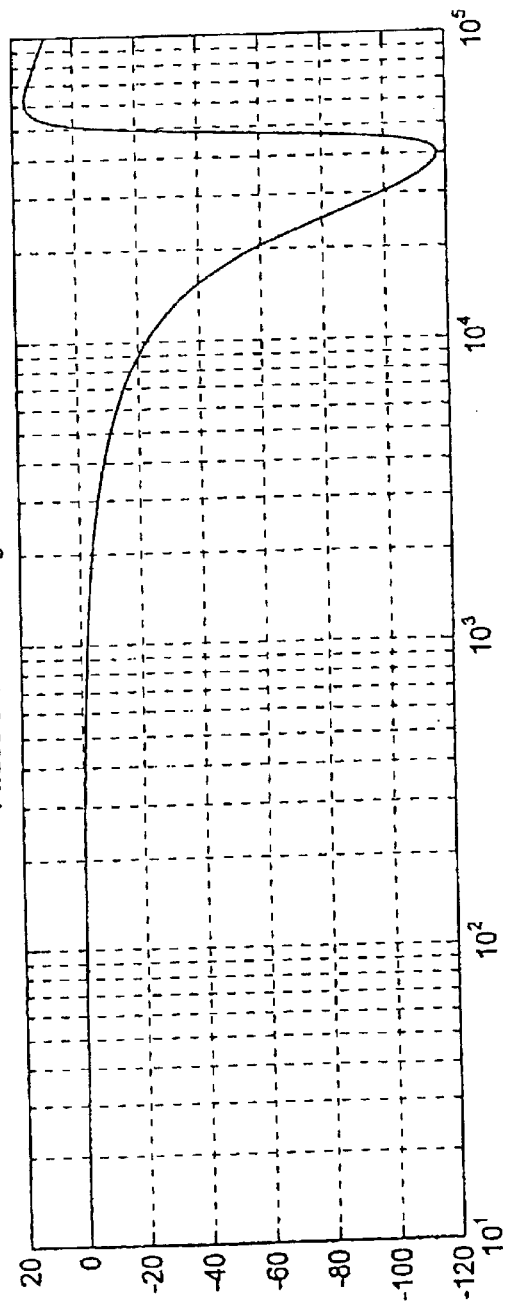
FIG._48-2

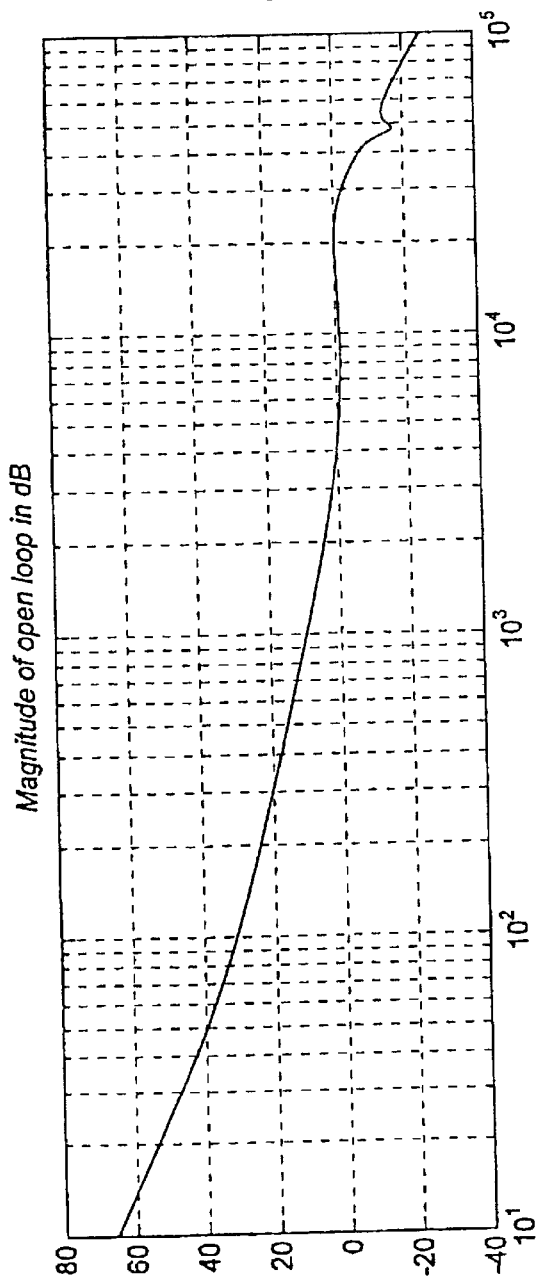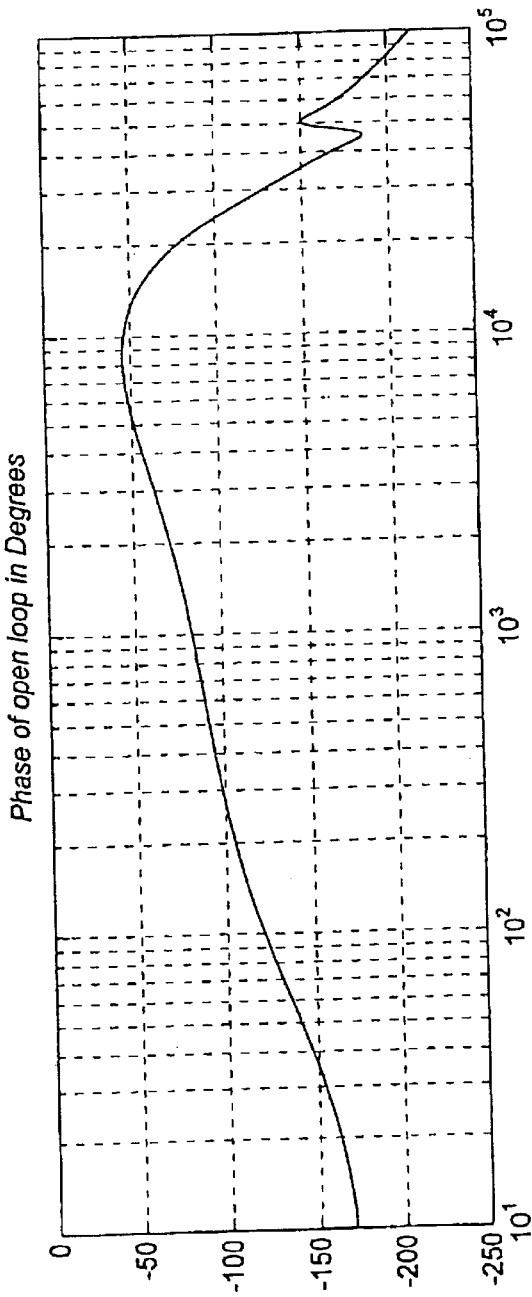

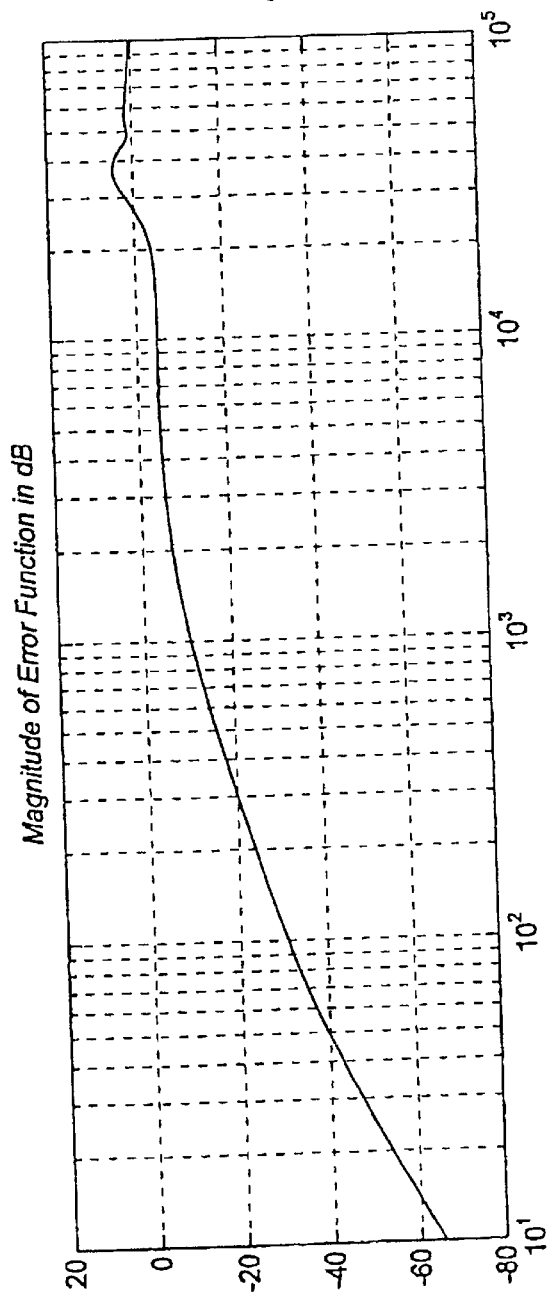
FIG._50-1
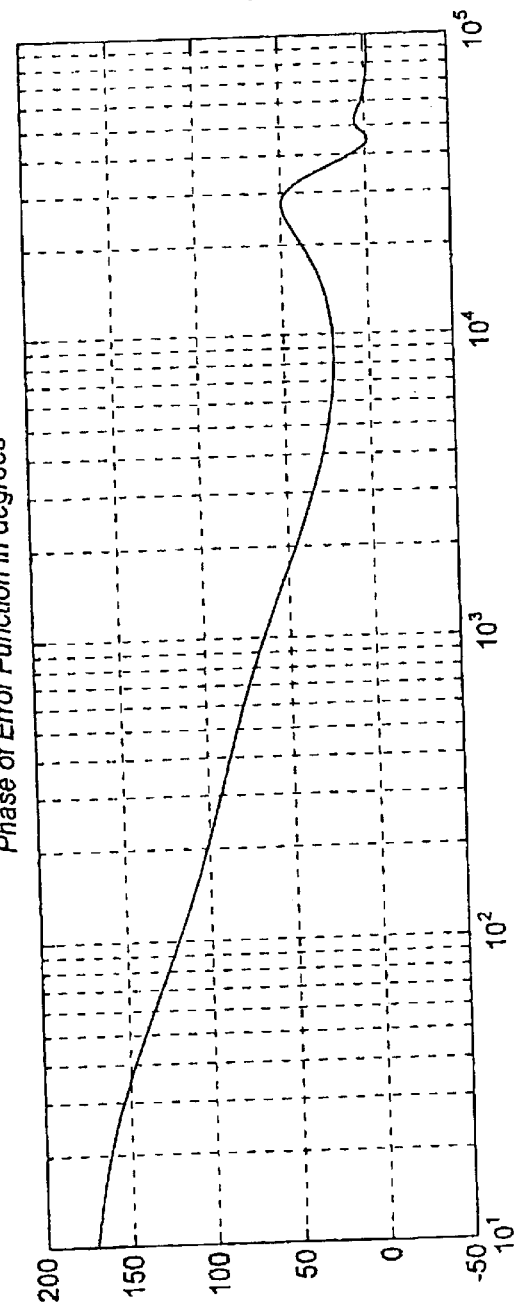
FIG._50-2

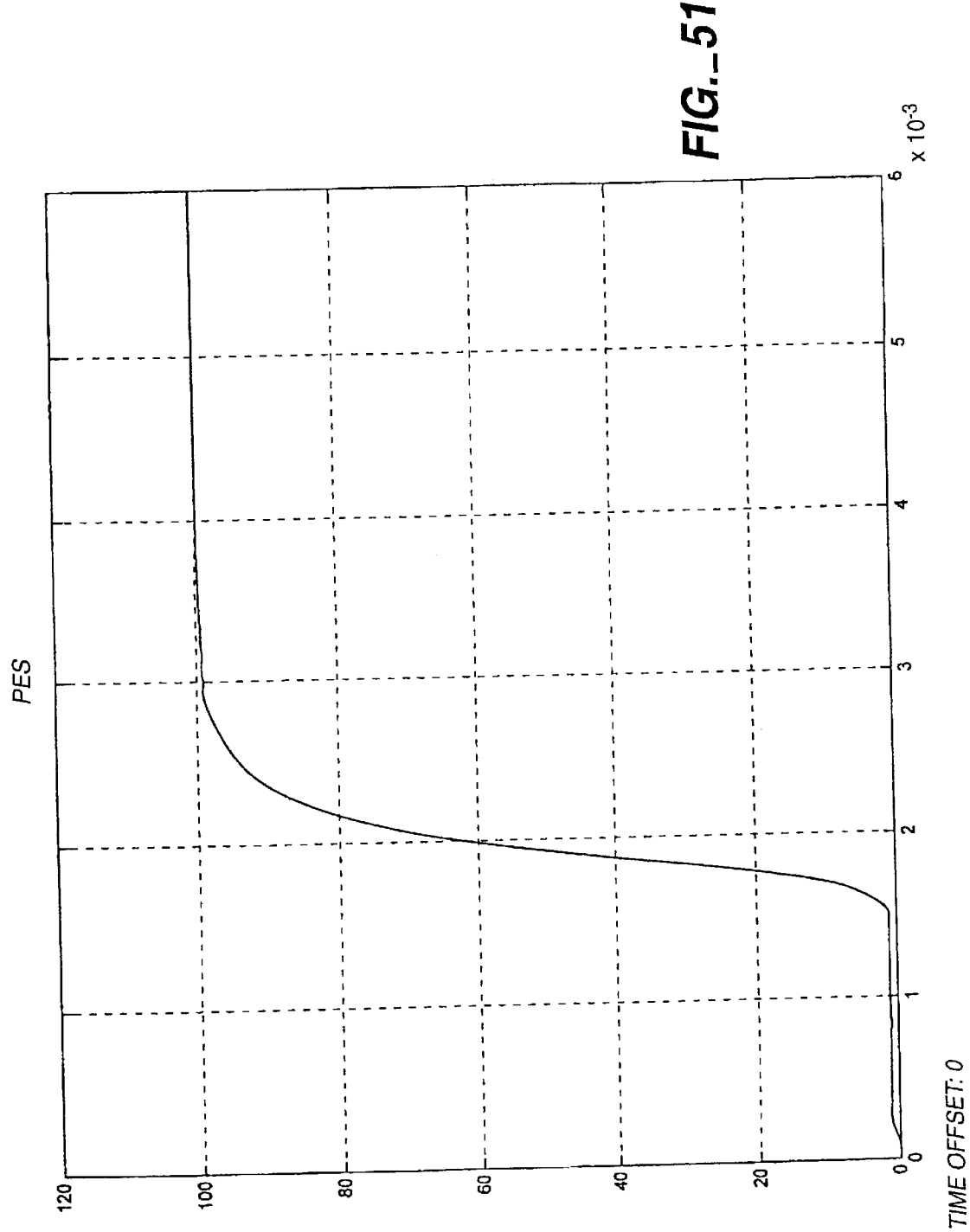
FIG._51

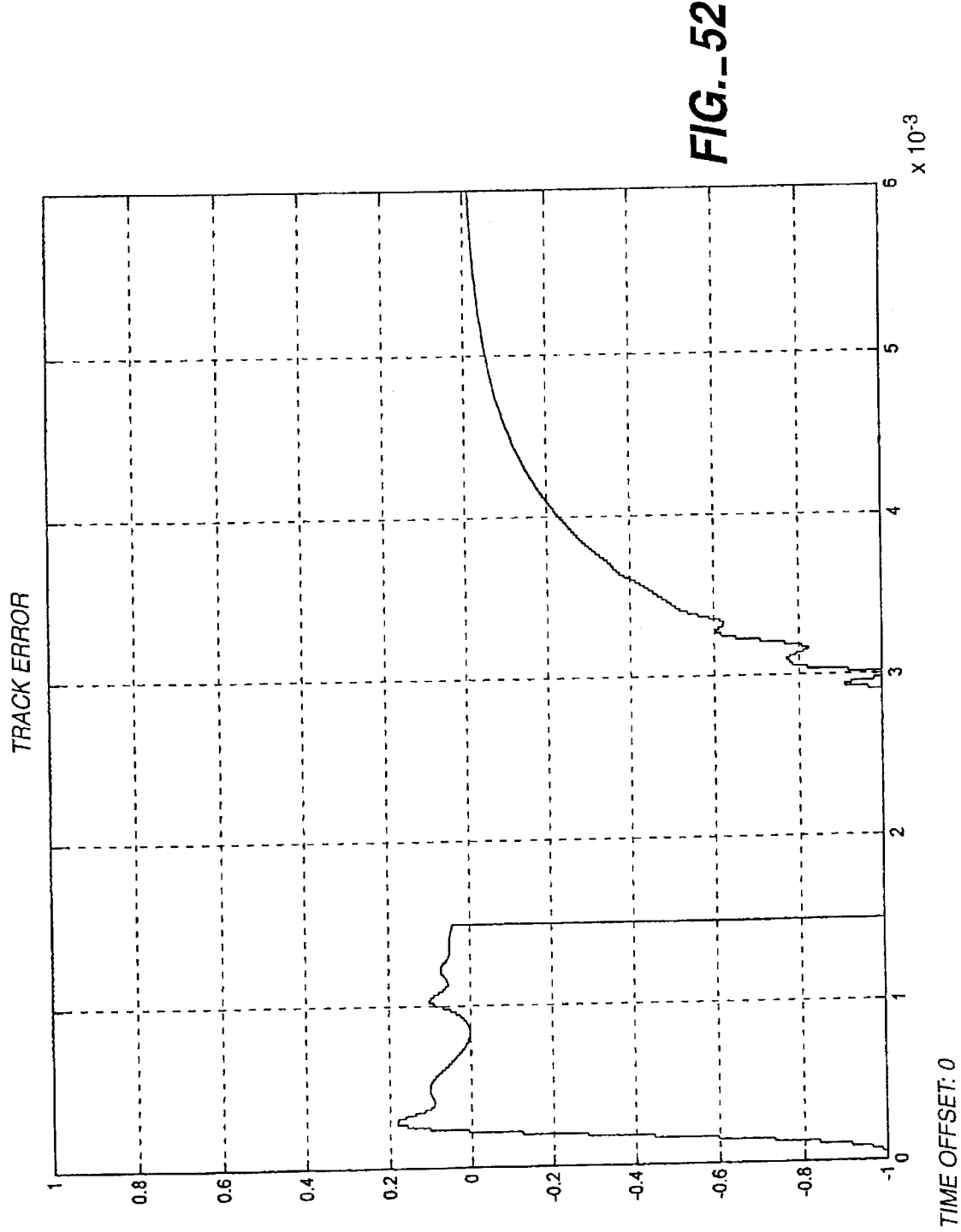
FIG._52

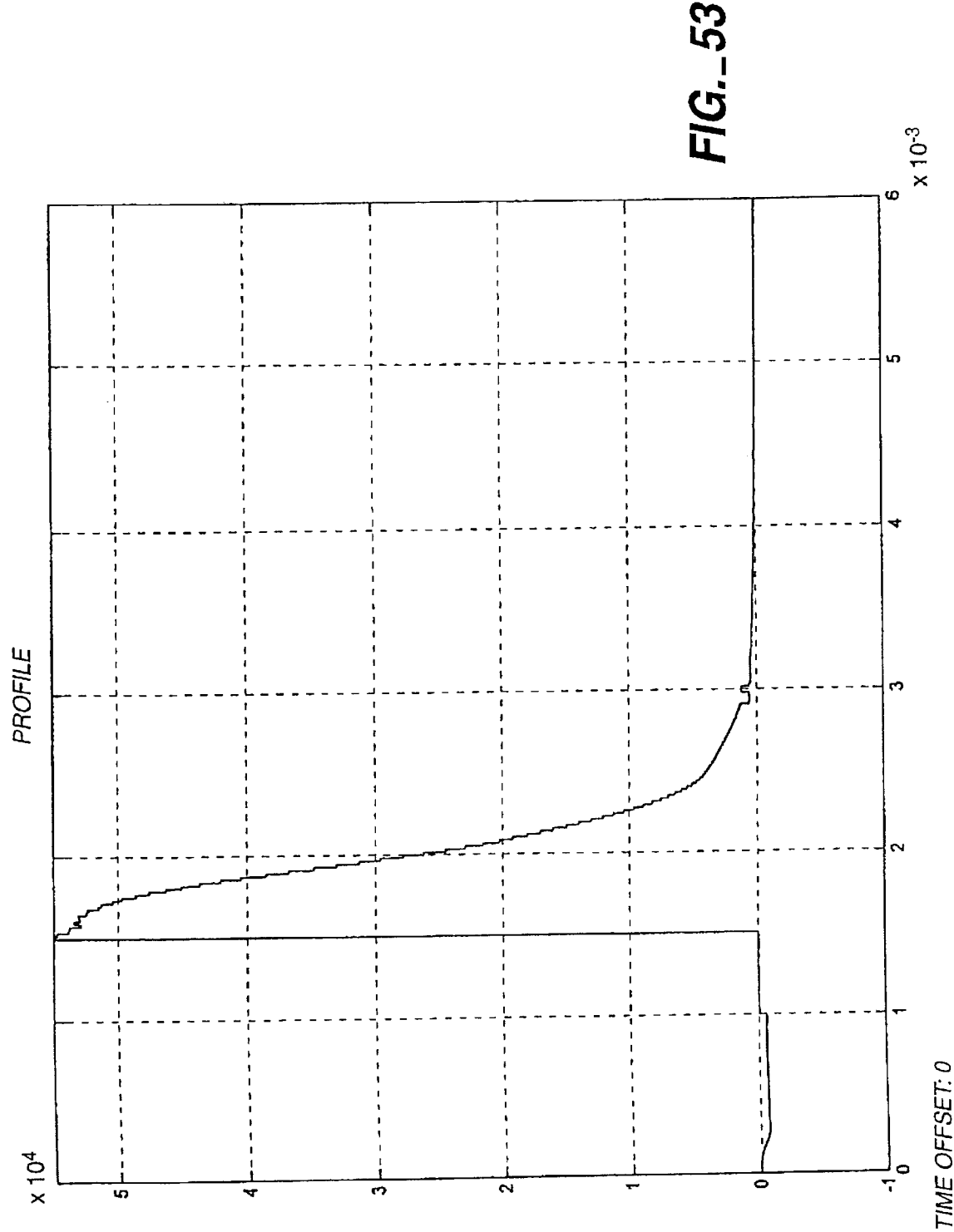
FIG._53

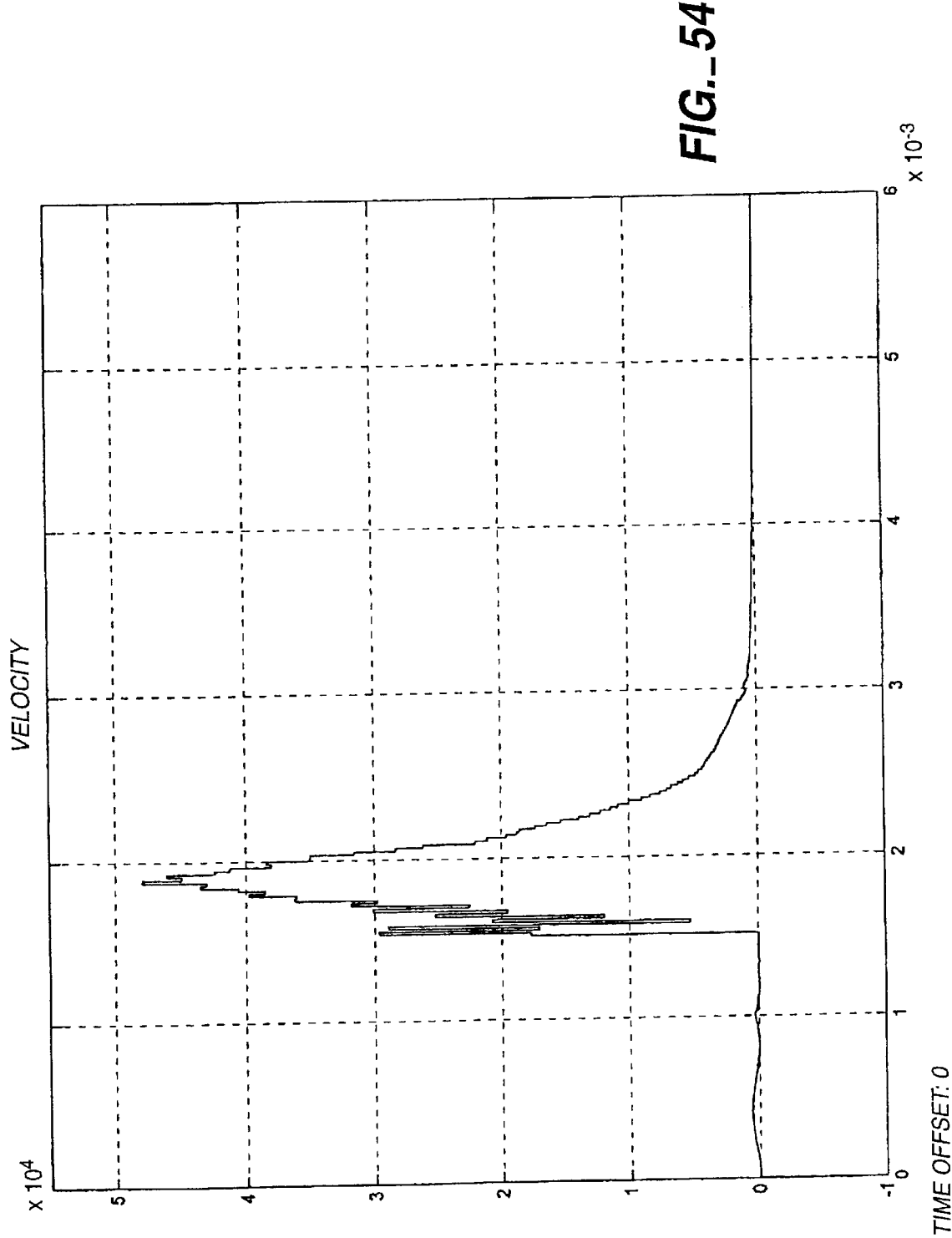

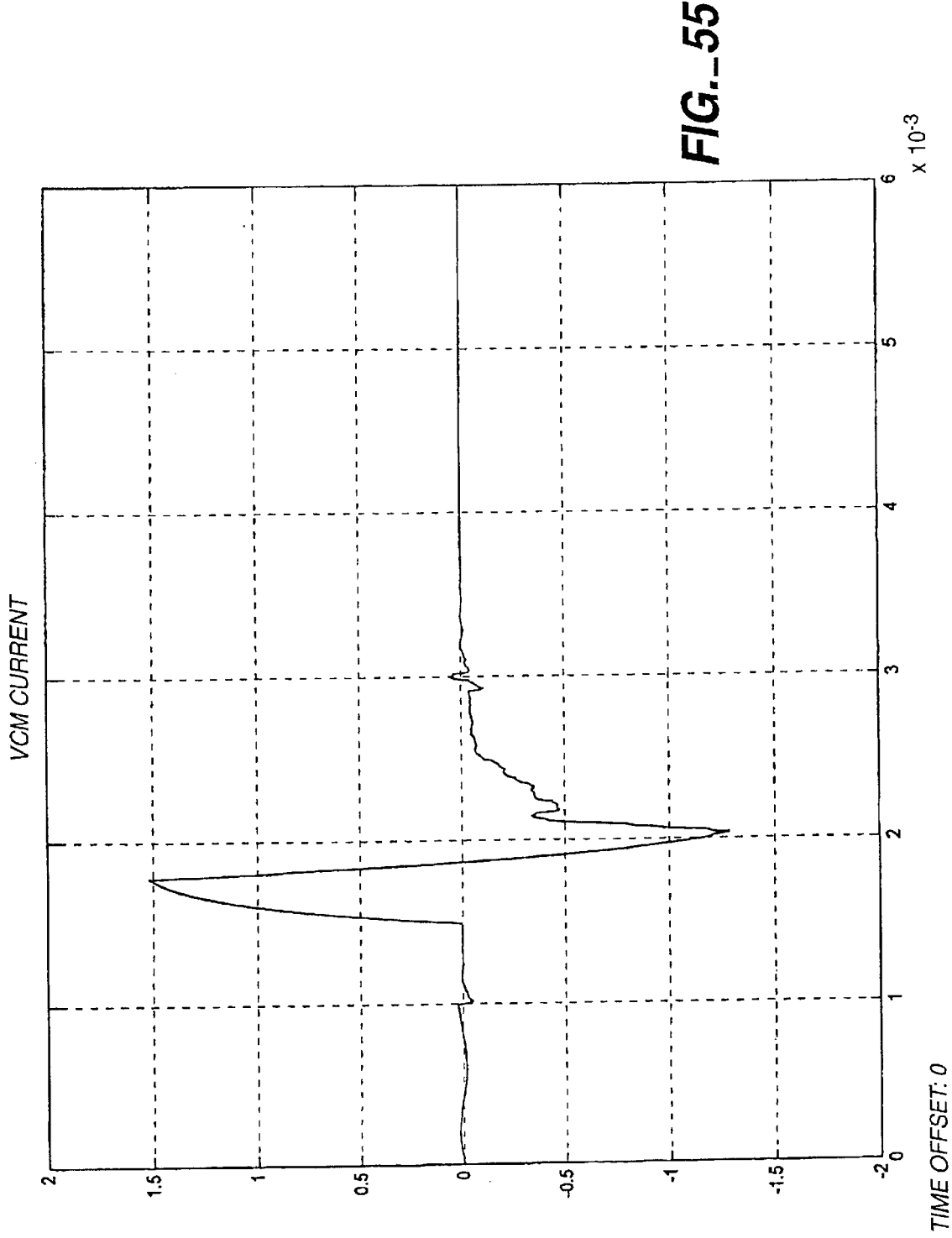
FIG._55

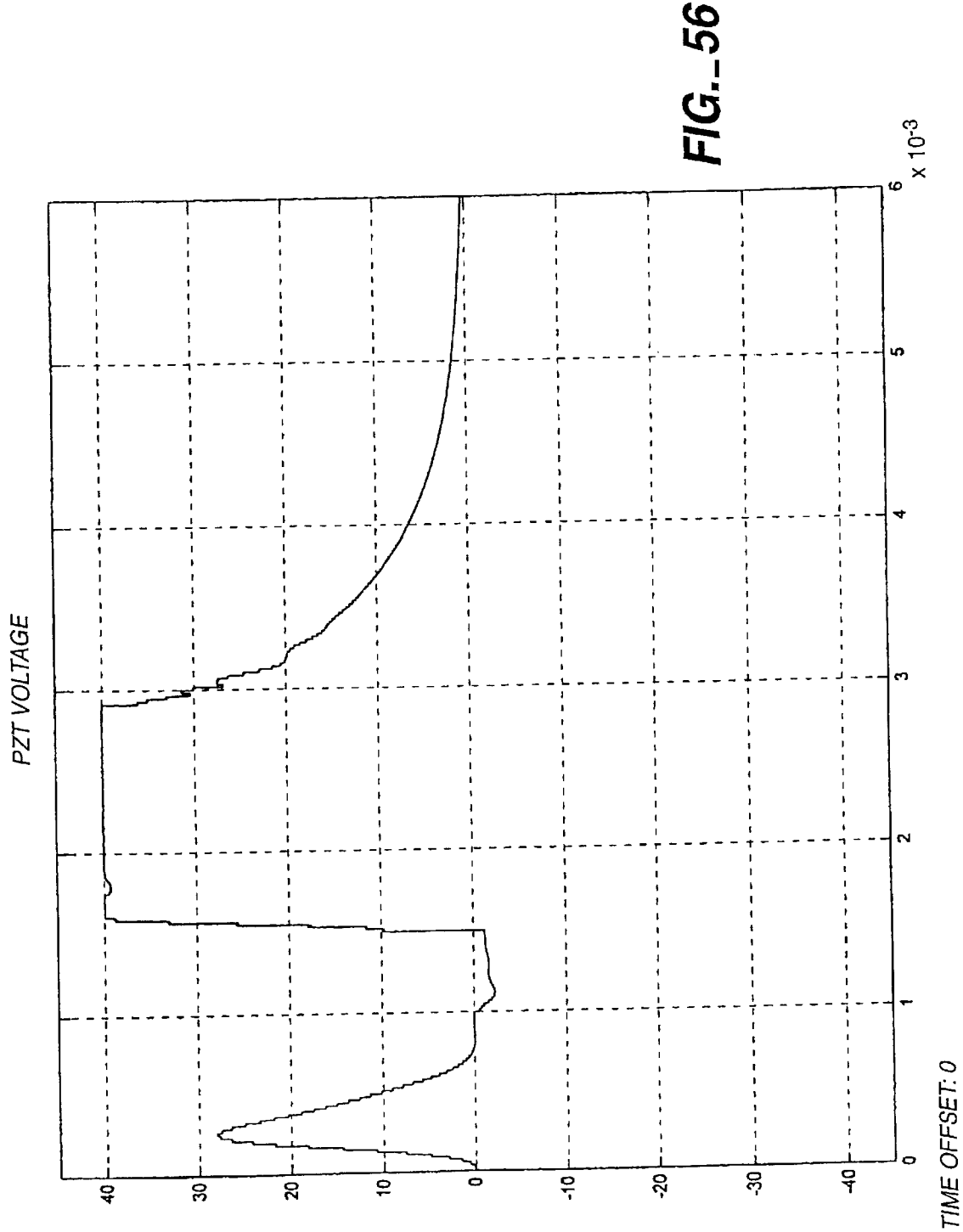
FIG._56

PQ ENHANCED OBSERVER BASED DUAL STAGE SERVO CONTROLLER

CROSS-REFERENCE TO RELATED APPLICATION

The present patent application is a continuation in part of co-pending U.S. patent application Ser. No. 09/553,365, entitled PQ ENHANCED DUAL STAGE SERVO CONTROLLER, filed Apr. 20, 2000.

The present application also claims priority from provisional U.S. patent application Ser. No. 60/145,507, entitled PQ ENHANCED OBSERVER BASED DUAL STAGE SERVO CONTROLLER, filed Jul. 23, 1999.

FIELD OF THE INVENTION

The present invention relates generally to a servo system in a disc drive. More particularly, the present invention relates to a disc drive having an enhanced dual stage servo control system.

BACKGROUND OF THE INVENTION

A typical disc drive includes one or more discs mounted for rotation on a hub or spindle. A typical disc drive also includes one or more transducers supported by an air bearing which flies above each disc. The transducers and the air bearing are collectively referred to as a data head. A drive controller is conventionally used for controlling the disc drive system based on commands received from a host system. The drive controller controls the disc drive to retrieve information from the discs and to store information on the discs.

An actuator typically operates within a closed-loop servo system. The actuator typically includes an actuator arm that supports a flexure of flexure assembly which, in turn, supports the data head. The actuator moves the data head radially over the disc surface for track seek operations and holds the transducer directly over a track on the disc surface for track following operations. The time when the data head is near a target track and fine tuning its position just prior to commencing track following is referred to as track settle or seek settle.

Information is typically stored on the discs by providing a write signal to the data head to encode information on the surface of the disc representing the data to be stored. In retrieving data from the disc, the drive controller controls the servo actuator so that the data head flies above the disc, sensing the on the disc, and generating a read signal based on that information. The read signal is then decoded by the drive controller to recover the data represented by the information stored on a disc, and consequently represented in the read signal provided by the data head.

Accurate positioning of the data head over a track on the disc is of great importance in writing data to the disc and reading data from the disc.

In prior systems, servo operations were accomplished based on a dedicated servo head. In a dedicated servo type of system, servo information is all written to one dedicated surface of a disc in the disc drive. All of the heads in the disc drive are mechanically coupled to the servo head which is used to access the servo information. Thus, all of the heads in the dedicated servo disc drive are positioned based on the servo information read from the servo surface. This type of system allows the disc drive to conveniently execute parallel read and write operations. In other words, with appropriate circuitry in the drive controller, read and write operations can be executed in parallel using a plurality of the data heads mounted on the actuator, the data heads being simultaneously positioned based on the servo information read from the dedicated servo surface.

However, track densities on magnetic discs have been increasing for many years. Increased track densities on the magnetic disc require more accurate and higher resolution positioning. The mechanical offset between heads in a dedicated servo system can exceed one track width. Thus, the industry has seen a tendency to shift to embedded servo information in certain applications.

In an embedded servo system, servo information is embedded on each track on each surface of every disc. Thus, each data head returns a position signal independently of the other data heads. Therefore, the servo actuator is used to position each individual data head while that particular data head is accessing information on the disc surface. The positioning is accomplished using the embedded servo data for the track over which the data head is then moving.

Prior conventional servo controllers have included proportional-integral-derivative (PID) controllers which are composed of two components: an observer and a regulator. The observer receives input position information each time a servo sector is crossed, and estimates position and velocity. The regulator then provides feedback on the observed signals. In a seek mode, the regulator typically zeros the error between a reference velocity trajectory and the observed velocity. In track following mode, the regulator zeros the error between the desired track position and the observed track position. The regulator controls according to a PID control technique.

However, PID controllers can be difficult to implement in all disc drive applications. For example, it may be desirable to provide microactuators between the flexure assembly and the transducer or slider assembly or on the actuator arm or on the suspension or flexure assembly. Where microactuators are provided, the servo actuator system might evolve from a single input single output (SISO) system where the input is an error signal and the output is a voice coil current signal, to a multiple input multiple output (MIMO) system which receives a variety of inputs from the microactuators and provides a position output signal to the voice coil motor and each of the microactuators. Such a system could also be controlled by simply decentralizing a PID controller so one target track input is received, but two outputs are provided, one for the voice coil motor and one for the microactuator. This may present problems. For example, it is difficult to control both actuators with a single controller while maintaining desired gain and stability for both control loops during track follow as well as track seek and settle. While Messner has discussed a system in Schroeck and Messner, On Controller Design For Linear Time-Invariant Dual-Input Single-Output Systems this is only directed to accommodating track follow with a PQ controller.

SUMMARY OF THE INVENTION

The present invention includes a servo control system for controlling a dual stage actuator in a disc drive. The disc drive includes a data head for accessing information on a disc surface, and the dual stage actuator includes a coarse actuator and at least one fine actuator. The control system includes a fine actuator driver and a coarse actuator driver for driving the fine and coarse actuators, respectively. The control system also includes an observer which receives the coarse and fine actuator input signals and estimates a response of the coarse and fine actuators. The estimated response is used in driving the coarse and fine actuators.

BRIEF DESCRIPTION OF THE DRAWINGS

FIG. 1 illustrates a disc drive in accordance with one embodiment of the present invention.

FIG. 2 illustrates an actuator assembly in accordance with one embodiment of the present invention.

FIG. 3 illustrates a head gimbal assembly in accordance with one embodiment of the present invention.

FIG. 4 illustrates a servo control system.

FIGS. 5 and 6 illustrate partial schematic diagrams corresponding to the control system shown in FIG. 4.

FIGS. 7-1 to 7-6 are Bode plots and phase diagrams corresponding to the control system shown in FIGS. 4–6.

FIG. 8 is a block diagram of a control system in accordance with one embodiment of the present invention.

FIGS. 9, 9A and 9B illustrate is a more detailed block diagram of the control system shown in FIG. 8.

FIG. 10-1 to 10-10 are Bode plots and phase diagrams corresponding to elements of the control system shown in FIG. 9.

FIG. 11-1 to 11-4 are graphs illustrating the output of the profile generator and the velocity and current of the voice coil actuator versus number of tracks go to a target track.

FIGS. 12-1 and 12-2 are a Bode plot and phase diagram, respectively, of a lag network in accordance with one embodiment of the present invention.

FIGS. 13-1 and 13-2 are a Bode plot and phase diagram of a notch component in accordance with one embodiment of the present invention.

FIGS. 14-1 and 14-2 are a Bode plot and phase diagram of an error function.

FIGS. 15–20 show graphs of a position error sample, track error, velocity profile, velocity tachometer output, voice coil motor current and microactuator voltage, respectively.

FIG. 21 is a block diagram of a control system in accordance with another embodiment of the present invention.

FIGS. 22, 22-1, and 22-2 illustrate a more detailed block diagram of the control system shown in FIG. 21.

FIGS. 23-1 through 25-2 are bode plots and phase diagram of components shown in FIGS. 22 through 22-2.

FIGS. 26-1 and 26-2 illustrate an output response of a non-linear gain stage illustrated in FIG. 22.

FIGS. 27-1 and 27-2 are plots of velocity and currents versus tracks to go to the,target track.

FIGS. 28-1 through 30-2 are bode plots and phase diagrams of different elements illustrated in FIG. 22.

FIGS. 31-1 to 31-2 are a bode plot and phase diagram of an error function.

FIG. 32 illustrates a position error signal.

FIG. 33 is a graph of track error in tracks versus time.

FIG. 34 graphs velocity profile in tracks versus time.

FIG. 35 is a graph of a velocity tachometer output.

FIG. 36 is a graph of voice coil motor current in milliamps versus time.

FIG. 37 is a graph of microactuator voltage in volts versus time.

FIG. 38 is a block diagram of a control system in accordance with another embodiment of the present invention.

FIGS. 39 through 39-4 illustrate a more detailed block diagram of the control system shown in FIG. 38.

FIGS. 40-1 through 42-2 are bode plots and phase diagrams for various components of the control system illustrated in FIG. 39.

FIGS. 43-1 and 43-2 illustrate non-linear gain stage response in counts per track.

FIGS. 44-1 and 44-2 illustrate velocity (in inches per second) and voice coil motor current (in milliamps) versus tracks to go to a target track.

FIGS. 45-1 and 45-2 are a bode plot and phase diagram, respectively, for the proportional-integrator shown in FIG. 39 in track follow mode.

FIGS. 46-1 and 46-2 are plots of voice coil motor current (in amperes) and velocity (in radians per second), respectively, versus time.

FIG. 47 is a plot of microactuator position, VCM position and position error in number of tracks versus time.

FIGS. 48-1 through 50-2 are bode plots and phase diagrams for various components of the control system shown in FIG. 39.

FIG. 51 is a graph of position error in tracks versus time.

FIG. 52 is a graph of track error in tracks versus time.

FIG. 53 is a graph of velocity profile in tracks versus time.

FIG. 54 is a graph of velocity tachometer output.

FIG. 55 is a graph of voice coil motor current in milliamps versus time.

FIG. 56 is a graph of microactuator voltage in volts versus time.

DETAILED DESCRIPTION OF ILLUSTRATIVE EMBODIMENTS

Figures 1, 22:
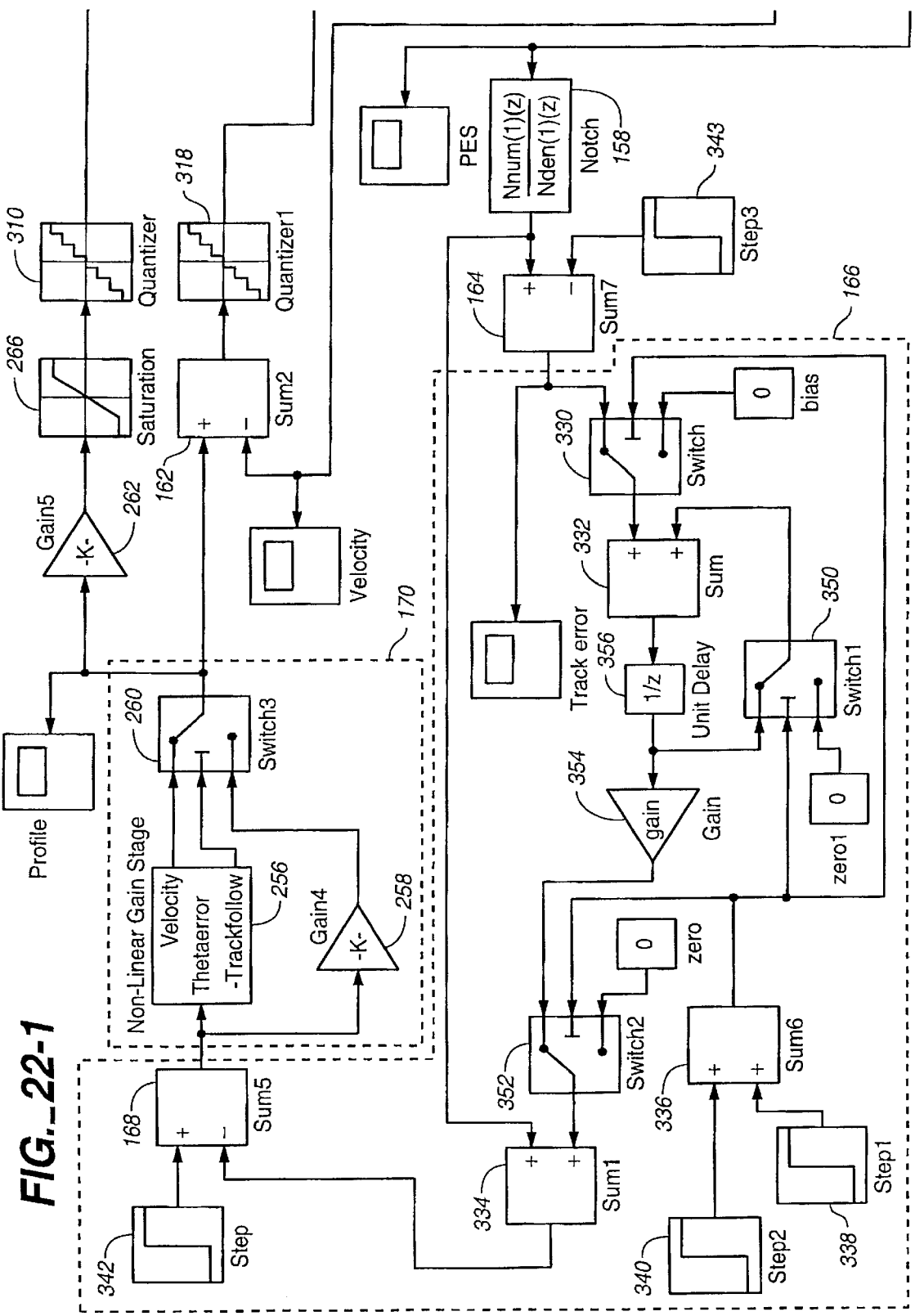

FIG. 1 is a plan view of one embodiment of a disc drive 110. Disc drive 110 includes a disc pack 112, which is mounted on a spindle motor (not shown) by a disc clamp 114. Disc pack 112, in one embodiment, includes a plurality of individual discs which are mounted for co-rotation about a central axis 115. Each disc surface on which data is stored has an associated data head or head gimbal assembly (HGA) 116 which is mounted to an actuator assembly 118 in disc drive 110. The actuator assembly shown in FIG. 1 is of the type known as a rotary moving coil actuator and includes a voice coil motor (VCM) shown generally at 120. Voice coil motor 120 rotates actuator assembly 118 with its attached HGAs 116 about a pivot axis 121 to position HGAs 116 over desired data tracks on the associated disc surfaces, under the control of electronic circuitry housed within disc drive 110.

More specifically, actuator assembly 118 pivots about axis 121 to rotate head gimbal assemblies 116 generally along an arc 119 which causes each head gimbal assembly 116 to be positioned over a desired one of the tracks on the surfaces of discs in disc pack 112. HGAs 116 can be moved from tracks lying on the innermost radius, to tracks lying on the outermost radius of the discs. In one embodiment, each head gimbal assembly 116 has a gimbal which resiliently supports a slider relative to a load beam so that the slider can follow the topography of the disc. The slider, in turn, includes a transducer which is utilized for encoding information on, and reading information from, the surface of the disc over which it is moving. It should be noted that the information can be magnetically encoded, optically encoded, etc.

FIG. 2 is a perspective view of actuator assembly 118. Actuator assembly 118 includes base portion 122, a plurality of actuator arms 126, a plurality of microactuators 127 (which can reside between the slider and the suspension, between the data head and the slider, or elsewhere), a plurality of load beams 128, and a plurality of head gimbal assemblies or suspensions 116. Base portion 122 includes a bore which is, in one embodiment, coupled for pivotal movement about axis 121. Actuator arms 126 extend from base portion 122 and are each coupled to the first end of either one or two load beams 128. Load beams 128 each have a second end which is coupled to a head gimbal assembly 116.

FIG. 3 illustrates a greatly enlarged view of one embodiment a head gimbal assembly 116, although many other embodiments could be used as well. Head gimbal assembly 116 includes gimbal 130, which has a pair of struts 132 and 134, and a gimbal bond tongue 136. Head gimbal assembly 116 also includes slider 138 which has an upper surface 140 and a lower, air bearing surface 142. Transducers 144 are also illustratively located on a leading edge of slider 138. The particular attachment between slider 138 and gimbal 130 is accomplished in any desired manner, as can the attachment of microactuator 127 to the assembly to move the transducer. Briefly, in one embodiment, a compliant sheer layer is coupled between the upper surface 140 of slider 138 and a lower surface of gimbal bond tongue 136, with an adhesive. The compliant sheer layer permits relative lateral motion between slider 138 and gimbal bond tongue 136. The compliant sheer layer is illustratively a mylar film having a thickness of approximately 150 microns. Also, gimbal bond tongue 136 illustratively terminates at a trailing edge of slider 138 with a mounting tab 146 which provides a surface at which slider 138 is attached to gimbal bond tongue 136.

FIG. 4 is a block diagram illustrating servo control system 150. System 150 is shown controlling plant 152 which illustratively corresponds to voice coil motor 120 and microactuator 127. In one illustrative embodiment, the microactuator 127 is a PZT element. Although many other embodiments could be implemented, the present discussion continues with respect to the microactuator being implemented as a PZT element.

System 150 also includes PZT driver 154, VCM driver 156, notch filter 158, differentiator 160, summing nodes 162 and 164, proportional integrator (PI) 166, summing node 168 and profile generator 170. Position error sample (PES) signal 172 is based on information read from a disc and represents the position of the data head relative to the target track center. PES signal 172 is provided to notch filter 158 which filters notches at desired frequencies and provides a notch PES signal 174. The notch PES signal 174 is provided to differentiator 160, proportional integrator 166 and summing node 164.

A commanded track signal (or target track signal) 176 is provided and is indicative of a track to be accessed on a disc in the disc drive. The commanded track signal 176 is provided to summing node 164 and summing node 168. Proportional integrator 166 provides an output signal 178 based on the notched PES signal 174 and the output from summing node 164. The output signal from PI 166 is summed with the commanded track signal and is provided to profile generator 170. The notched PES signal 174 is also provided to differentiator 160 which provides a differentiated output signal 162.

Profile generator 170 generates a voice coil motor current profile (or velocity profile) based on a distance that the data head is from the target track. When the data head is located a long distance from the target track, profile generator 170 generates a non-linear profile to quickly accelerate movement of the data head toward the target track. As the data head approaches the target track, profile generator 170 provides a linear gain which corresponds to the distance of the data head from the target track. This allows the data head velocity to slow down as it approaches the target track. The output of profile generator 170 is provided to PZT driver 154 and summing node 162.

The output of summing node 162 is provided, in turn, to voice coil motor driver (VCM driver) 156. PZT driver 154 provides an output signal (illustratively voltage) to the PZT microactuator in plant 152 to drive the microactuator. Similarly, VCM driver 156 provides an output signal (illustratively a current) to the voice coil motor in plant 152 to drive rotation of the voice coil motor.

Figures 5, 10:
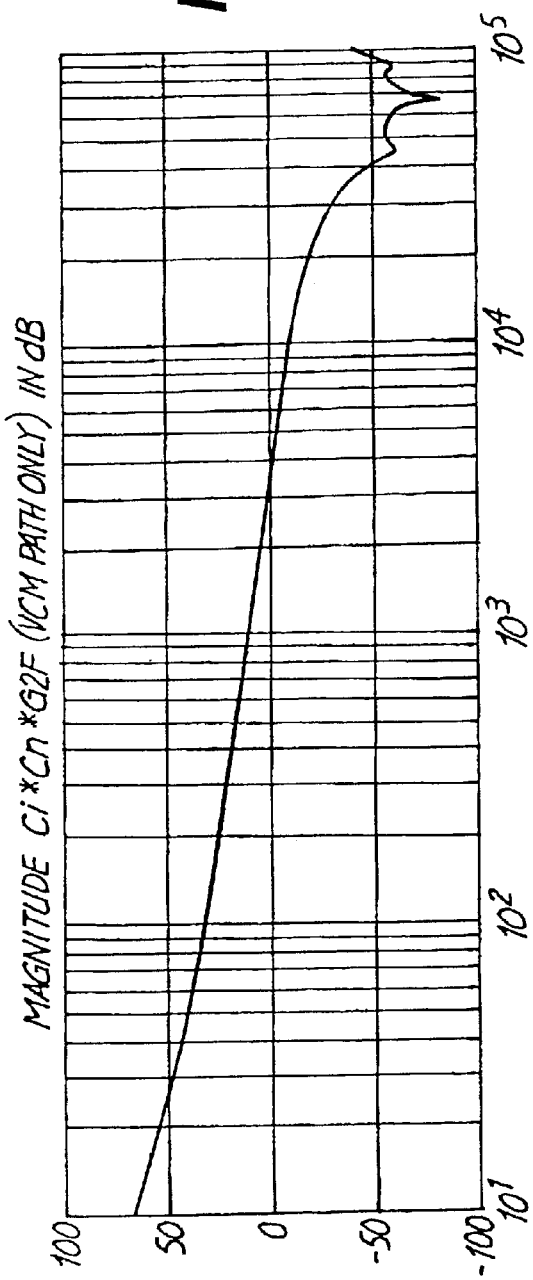

When viewing control system 150 differently, such that PZT driver 154, VCM driver 156, plant 152 and differentiator 160 are all viewed as part of a "new" plant, that portion of control system 150 can be illustrated by the block diagram set out in FIG. 5. The circuit includes differentiator 160, summing nodes 180, 182 and 184, gain blocks 186, 188, 190, 192 and 194, and integrators 196, 198, 200 and 202. It can be seen that the input to the VCM path is defined by IVCM which is provided to summing node 180. Block 186 represents torque constants, etc., found in the circuit, and blocks 196 and 198 are integrators which integrate the signal twice and provide it to summing node 182. Block 194 represents demodulation constants, etc., and provides the output signal Y. Signal Y is fed back through differentiator 160 to summing node 180.

The PZT path is represented by the input voltage VPZT which is fed to block 188, which also represents torque constants. The output of block 188 is provided to summing node 184, which is, in turn, integrated twice through integrators 200 and 202, the output of which is fed though summing node 182. The output from integrator 200, which represents the velocity feed back signal, is also fed back through block 190 to summing node 184. The output of integrator 202, which represents position feedback, is also provided through block 192 to summing node 184.

Figures 6, 10:
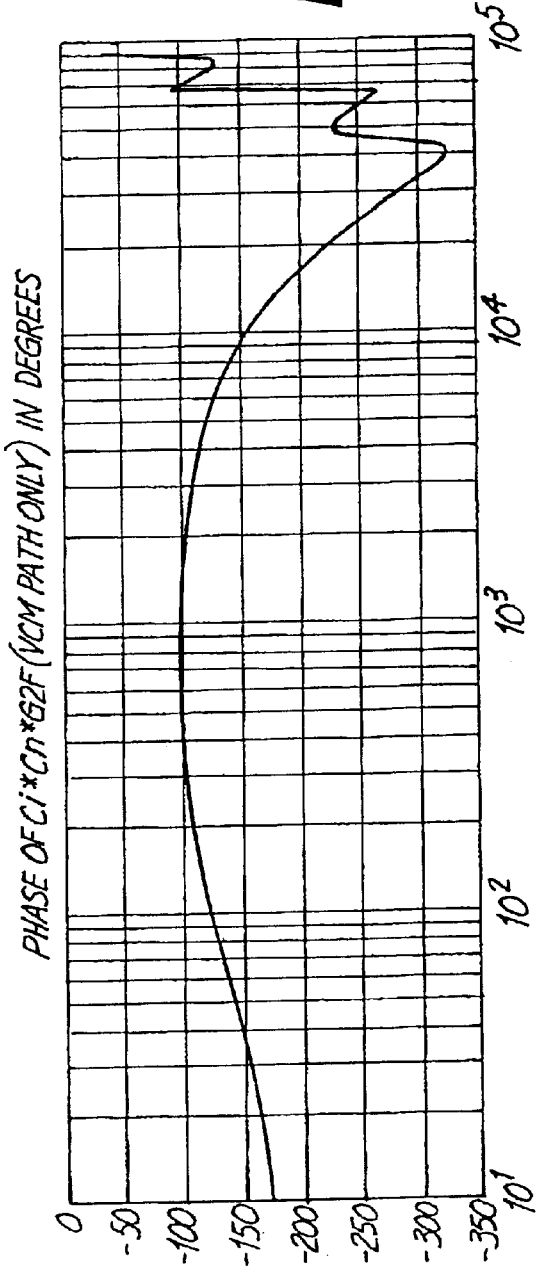

The circuit illustrated in FIG. 5 can be rewritten as that shown in FIG. 6. It will be noted that the KDs block has been moved to the left of summing node 180. It is represented by block 204. This removes differentiator 160 from the feedback path and also removes one of the integrators. It will also be noted that block 186 is slightly modified by including the gain constant $K_D$ therein.

The transfer functions for the VCM path and the PZT path are illustrated by equations 1 and 2 below:

$$\frac{Y}{I_{VCM}} = \frac{1}{K_D s}\left[\frac{\frac{1428344*0.10938K_D}{s}}{1+\frac{1428344*0.10938K_D}{s}}\right] \quad \text{Eq. 1}$$

$$= \frac{1}{K_D s}\left[\frac{1}{1+s/1428344*0.10938K_D}\right]$$

$$\frac{Y}{V_1} = \left[\frac{1428344}{1+\frac{1428344*0.10938K_D}{s}}\right] \quad \text{Eq. 2}$$

$$= \left[\frac{\frac{s}{0.10938K_D}}{1+\frac{s}{1428344*0.10938K_D}}\right]$$

It can be seen from the rewritten circuits shown in FIG. 6 and the transfer functions, that even assuming the input current to the VCM path is 0, the feedback path from Y to summing node 180, through integrator 198, affects the PZT signal. In other words, the PZT path which normally appears as a low pass filter, now looks like a differentiator. The integrator in the feedback path for the PZT makes the path appear as a differentiator so that if there is no change in the input signal (such as during a long seek operation), the PZT signal will move back, more closely centering the microactuator relative to the coarse actuator, thereby eliminating the benefit of reduced seek times which result from the microactuator being fully extended in the direction of the seek.

This can better be illustrated with reference to FIGS. 7-1 through 7-6. FIGS. 7-1 and 7-2 show a Bode plot, and phase diagram, respectively, for differentiator 160. It can be seen that differentiator 160 introduces a 20 dB per decade gain from very low frequencies to approximately $7 \times 10^4$ radians per second, where the gain is limited. FIGS. 7-3 and 7-4 show a Bode plot and phase diagram, respectively, for the VCM path with the differentiator feedback therein. It can be seen from these diagrams that the VCM path, with the feedback, has a –20 dB per decade gain out to approximately 20,000 radians per second, where the slope of the curve switches from –20 dB per decade to approximately –40 dB per decade. This slope change is due to the differentiator.

FIGS. 7-5 and 7-6 illustrate a Bode plot and phase diagram for the PZT path. It can be seen that the +20 dB per decade slope continues all the way to approximately 20,000 radians per second.

Since the log magnitude of the transfer function shown in FIG. 7-5 continues at a rate of 20 dB per decade all the way to a frequency of approximately 20,000 radians per second, then during long seek operations, the input frequency will decrease to a point where the transfer function slips back down the curve shown in FIG. 7-5 and will thus provide reduced gain even while the seek operation is continuing. The effect this has on the PZT actuator is that, as soon as the long seek operation has begun, the PZT actuator will be moved to its furthest extent in the direction of the seek operation. However, as the seek operation continues, the input frequency will reduce to a point where the gain provided by the PZT transfer function will reduce and the PZT actuator will gradually creep back toward the center position relative to the microactuator. This is undesirable, because it eliminates or reduces any benefits in reducing seek times gained through movement of the microactuator.

FIG. 8 illustrates a block diagram of another servo control circuit 250 in accordance with one aspect of the present invention. A number of the blocks are similar to those shown in FIG. 4, and are similarly numbered. However, circuit 250 also includes lag network 252 which is provided in the PZT path. Lag network 252 is configured to alter responsiveness of the microactuator by moving the break point of the Bode plot illustrated in FIG. 7-5 to a much lower frequency such that the gain through the PZT path remains constant at much lower frequencies. Lag network 252 does this by acting substantially like a band pass filter component, with a low corner frequency, by boosting low frequency components and introducing a phase loss. Thus, the control circuit can perform better during long seek operations.

FIGS. 9, 9A and 9B show is a more detailed block diagram of control system 250 shown in FIG. 8. Corresponding items are similarly numbered.

Profile generator 170 includes nonlinear gain stage 256, gain element 258, and switch 260. Lag network 252 includes gain element 262, summing node 264, saturation clipping circuit 266, delay unit 268, gain element 270, summing node 272 and gain element 274. The remaining elements do not form a part of the present invention, and are mentioned briefly later in the application.

The output from summing node 168 is provided to nonlinear gain stage 256. This signal is indicative of the distance that the read head (or data head) is from the target track. When the read head is a long distance from the target track, switch 260 is switched to the position illustrated in FIG. 9 and outputs a velocity profile which is nonlinear to quickly accelerate the read head toward the target track. As the read head approaches the target track, and comes within a predetermined threshold number of tracks of the target track, switch 260 is switched such that constant gain element 258 is selected. This provides a constant gain from profile generator 170 when the data head is closer to the target track. FIGS. 11-1 and 11-2 show the response of nonlinear gain stage 256 according to two different scales. Both are graphs of output count versus input count where one count is equivalent to one track. The output of profile generator 170 is provided to both gain element 262 and lag network 252 and to summing node 162. Summing node 162 also receives at its inverting input the output of differentiator 160 and provides an output to the VCM path.

In lag network 252, gain element 262 provides a constant gain K to summing node 264 which provides an output signal to saturation circuit 266. In one illustrative embodiment, saturation circuit 266 is provided as an anti-windup circuit. Illustratively, saturation circuit 266 is simply a clipping circuit which clips the signal levels received from summing node 264 to a level just below where PZT driver 154 saturates. The clipped output of saturation circuit 266 is provided to delay circuit 268 and to summing node 272. Delay unit 268 provides a feedback output, through constant gain element 274, to summing node 264. The output of delay unit 268 is also provided through constant gain element 270, to the inverting input of summing node 272. The output of summing node 272 is provided to the PZT driver circuit 154.

FIGS. 10-1 and 10-2 are a Bode plot, and phase diagram, respectively, for lag network 252. These diagrams illustrate that the log magnitude of the transfer function of lag network 252 has a –20 dB per decade slope at the frequencies of interest.

FIGS. 10-3 and 10-4 illustrate a Bode plot and phase diagram, for the transfer function from the input of gain element 262, (i.e., the input to lag network 252) to the output of notched PES filter 158, with differentiator 160 included in the feedback path, and assuming that the transfer function of notch filter 158 simply cancels sway modes in the PZT microactuator. It can be seen from this diagram that the log magnitude of the transfer function is constant at a much lower frequency allowing the microactuator to be less responsive in the frequencies of interest so the gain is maintained at lower frequencies.

As the PZT microactuator approaches saturation, the remaining circuit is simply the VCM path. FIGS. 10-5 and 10-6 are an open loop Bode plot and phase diagram, respectively, for the VCM path. The Bode plot illustrated in FIG. 10-5 shows this path is stable. Therefore, even if the PZT actuator were to saturate, the controller would be stable.

As mentioned in the background of the specification, Mesner noted that for dual stage actuators, in order for the two paths to constructively interfere, they must have a phase difference of less than 120 degrees at the point where the two paths have approximately equal gains. With the present circuit, it will be noted that the output of switch 260 has two paths, one through the PZT path and one through the VCM path. At low frequencies, the VCM path dominates. At intermediate frequencies (of approximately 2500 radians per second) both paths have approximately the same gain. At this point, the phase difference between the two paths should be less than approximately 120 degrees to obtain constructive interference. Above this angular frequency, the PZT path dominates. FIGS. 10-7 and 10-8 illustrate a Bode plot and phase diagram for the transfer function from the output of switch 260, to the output of notch filter 158. Both paths are being driven simultaneously and adequate phase margin is obtained.

The overall open loop Bode plot for circuit 252 is shown in FIG. 10-9, and the phase diagram is illustrated in FIG. 10-10. It can be seen that, at the OdB crossover point, there is a great deal of phase margin. Thus, the present invention provides lag network 252 which inhibits wind-up (or saturation) of the PZT driver, modifies the responsiveness of the PZT path to accommodate long seek operations, and provides a phase difference between the VCM and PZT path at the OdB crossover point (where both paths have approximately the same affect on the output) which is far less than 120 degrees.

The remaining circuit elements will now briefly be described. FIG. 9 illustrates that differentiator 160 includes summing nodes 300 and 302, gain elements 304 and 306 and delay unit 308. The Bode plot and phase diagram for differentiator 160 are shown and discussed above.

PZT driver 154 includes quantizer 310, digital-to-analog (DAC) gain stage 312, zero order hold circuit 314, and the actual driver circuit 316. Quantizer 310 quantizes the input from lag circuit 252 and provides it through gain stage 312 and zero order hold circuit 314 and to driver 316. Driver 316 converts the digital input signal to an analog voltage output signal and provides it to the PZT microactuator. VCM driver 156 includes quantizer 318, DAC gain element 320, zero order hold circuit 322, and the actual driver 324. These elements operate in a similar manner to elements 310, 312 and 314, and an analog signal is applied to the VCM.

Proportional integrator 166 includes switch 330, summing nodes 332, 334 and 336, a plurality of step input circuits 338, 340 and 342, switches 350 and 352, gain element 354 and delay element 356.

FIGS. 113 and 114 illustrate the velocity and current versus the distance of the read head from the target track. In proportional integrator 166, switches 330, 350 and 352 are configured to accommodate three different loops for track seek, track settle and track follow. For the track follow mode, switch 260 in profile generator 170 selects constant gain element 258. Switch 352 selects the output of gain element 354, switch 350 closes the feedback loop around unit delay 356 and switch 330 selects the output of summing node 164. The Bode plot and phase diagram for proportional integrator 166 is illustrated by FIGS. 121 and 122, respectively.

In the track settle mode, switch 260 selects the output of constant gain element 258, switch 352 selects a zero input and switch 350 also selects a zero input. Switch 330 forces a bias value into unit delay 356. The bias value initializes proportional integrator 166 with a cable bias so it is ready to be applied during the track follow mode.

In the track seek mode, the switches are set the same as in the track settle mode except that switch 260 selects the output of the nonlinear gain stage 256 instead of the constant gain block 258. It should also be noted that step input 342, and 343 are equal and represent, in the diagram shown in FIG. 9, the desired track location (or target track signal). The remaining two step functions 340 and 338 place the proportional integrator 155 in the configurations mentioned above for seek, settle and track follow.

Notch filter 158 operates in a known manner and filters certain frequencies (illustratively those associated with microactuator sway) from the PES signal. FIGS. 13-1 and 13-2 illustrate the Bode plot and phase diagram for notch filter 158.

FIGS. 14-1 and 14-2 illustrate a Bode plot and phase diagram for the error function. It can be seen that the log magnitude of the error function is quite flat from approximately 2000 radians per second to 10,000 radians per second, and in fact stays negative until approximately 17,000–18,000 radians per second and peeks at approximately 30,000 radians per second. This performance is significantly enhanced over prior systems.

FIGS. 15–20 are time domain plots for an exemplary 100 track seek operation. The step is initiated at the one-millisecond mark on all of the plots 15–20. FIG. 15 shows the position error sample (PES) in tracks plotted against time in milliseconds. FIG. 16 illustrates track error in track increments plotted against time in milliseconds. FIG. 17 illustrates the velocity profile of the data head in tracks per second against time in milliseconds. FIG. 18 illustrates a velocity tachometer output in tracks per second plotted against time in milliseconds. FIG. 19 shows the voice coil motor current plotted against time in milliseconds, and FIG. 20 illustrates the PZT voltage plotted against time in milliseconds. It can be seen from FIG. 20 that the PZT voltage saturates, which means that the microactuator is fully extended. Thus, the microactuator slowly arrives on track first and then pulls the remainder of the coarse actuator over the center of the target track.

FIG. 21 is a block diagram of another embodiment of a servo control system 400 in accordance with the present invention. A number of the items shown in control system 400 are similar to those shown for control system 250 in FIG. 8 and are similarly numbered. However, it can be seen that rather than simply including a differentiator 160 in the feedback path, control system 400 includes observer 402. In addition, control system 400 includes an additional gain stage 266.

Control system 400 operates somewhat similarly to control system 250. However, it has been found that it may be desirable to increase the accuracy of the velocity feedback signal provided by tachometer gain circuit 304. In other words, it can be seen in FIG. 8 that the velocity feedback includes the velocity attributable to the microactuator (the PZT component) as well as the coarse actuator (the voice coil motor). This velocity feedback signal is provided to summer 162 and used to control VCM driver 156.

As illustrated in FIG. 21, observer. 402 receives a signal from both the PZT driver path and the VCM driver path, as well as the position error sample (PES) signal provided from plant 152. Observer 402 then estimates the contribution to the PES attributable to the PZT path and accommodates for it in providing the feedback signal. Because the PZT path is accounted for by observer 402, the velocity feedback signal provided by tachometer gain stage 304 is more accurate.

FIGS. 22, 22-1 and 22-2 (collectively referred to as FIG. 22) illustrate control system 400 in greater detail. Many of the items are similar to those found in FIGS. 9, 9-A and 9-B (collectively referred to as FIG. 9), and are similarly numbered.

Those items operate in substantially the same fashion and will not be discussed in greater detail here. However, rather than having lag network 252, control system 400 simply provides gain 25 state 262 in the PZT path. As with the lag network, the gain stage 262 feeds into the saturation and clipping circuit 266 and into quantizer 310, and eventually into PZT driver 154'. PZT driver 154' is similar to PZT driver 154, except that the PZT feedback signal is taken prior to quantizer 310. Therefore, quantizer 310 is drawn outside of the PZT driver box 154'.

Similarly, summer 162 receives its input from profile generator 170 and tachometer gain feedback 304 and provides its output to quantizer 318. Because the observer input from the VCM path is taken from the output of quantizer 318, quantizer 318 is drawn outside the block for VCM driver 156'. Other than this, however, VCM driver 156' operates in the same fashion as VCM driver 156 shown in FIG. 9.

Observer 402 includes gain stages 404, 406, 408, 410, 412, 414 and 416. Observer 402 also includes PZT low pass filter network 418, summers 420, 422, 424 and 426. Finally, observer 402 includes unit delay circuits 428 and 230.

The circuit between gain stages 404 and 412 provides a VCM observer signal to summer 424. The feedback from the output of unit delay 430 to the input of summer 422 represents the actual head position caused by the voice coil motor. The signal from the output of summer 426 represents the error between the plant position (measured head position) and the estimated position. The error is fedback, through gain stages 414 and 416 within the observer 402. The input to tachometer gain stage 304 represents the velocity of the voice coil motor, which is fedback to summer 162, through gain stage 304.

Of note, low pass filter 418 provides the observer signal from the PZT path to summer 424 as well. The combination of these two signals is provided to summer 426 where it is combined with the PES signal which is fed back, through gain stages 414 and 416, to summers 420 and 422 to obtain the velocity signal from velocity tachometer gain stage 304.

The particular characteristics of low pass filter 418 will vary, depending on the microactuator. For example, in many PZT microactuator assemblies, the PZT microactuators are driven with a voltage. Displacement of the microactuator follows the voltage, with some hysteresis, to a given frequency above the VCM frequency, and then the movement response rolls off. In other words, the microactuator provides movement at frequencies higher than the VCM, but the movement eventually drops off at quite high frequencies. The specific roll off frequency and frequency response of the microactuator will, of course, depend on the mechanics of the particular microactuator being used as well as the suspension. However, it is simply worth noting that low pass filter 418 acts as a low pass filter to emulate the frequency response of whatever microactuator is implemented in the system. In FIG. 22-2, low pass filter 418 is provided as a state space representation which is a time domain representation of the filter. However, it could just as easily be represented by a transfer function or other frequency domain representation as well. The example in FIG. 22-2 is given for exemplary purposes only.

FIGS. 23-1 through 37 are bode plots and other diagrams which further illustrate the interaction of the various components in FIG. 22. FIGS. 23-1 and 232 illustrate a bode plot and phase diagram, respectively, from the non-inverting input of summer 162 (where switch 260 is disconnected) to the output of notch filter 158. For the sake of this figure, it is assumed that notch filter 158 has a gain of one at the frequencies of interest and that gain stage 262 has a gain of zero.

FIGS. 24-1 and 24-2 illustrate a bode plot and phase diagram, respectively, from the output of circuit 266 to the output of notch filter 158. Again, it should be noted that the gain due to observer 402 and tachometer gain stage 304 are present. The same assumptions that were made with respect to FIGS. 23-1 and 232 are also made for the sake of FIGS. 24-1 and 24-2.

FIGS. 25-1 and 25-2 illustrate a bode plot and phase diagram, respectively, from the output of summer 168, through gain circuit 258, to the output of notch filter 158. Both plants (the voice coil motor and the microactuator) are being driven at the same time. It can thus be seen that, at the frequencies of interest, a great deal of phase margin (phase difference between the VCM and microactuator is less than 120 degrees at frequencies where the two motors have equal gains) is obtained.

FIGS. 26-1 and 26-2 illustrate the frequency response of the profile generator 170. The plot is provided in counts per count, where one count is representative of a single track.

FIGS. 27-1 and 27-2 plot the velocity and voice coil current as a function of tracks to go the desired target track. Velocity is in inches per second and current is in milliamps.

FIGS. 28-1 and 28-2 show a bode plot, and phase diagram, respectively, for proportional integrator 166. FIGS. 29-1 and 29-2 shows a bode plot and phase diagram, respectively, for notch filter 158. The overall open loop bode plot of control system 400 is illustrated by FIGS. 30-1 and 30-2. It should be noted that a great deal of phase margin is obtained at the 0dB crossover point.

FIGS. 31-1 and 31-2 are a bode plot and phase diagram, respectively, for the error function associated with control system 400. It can be seen that the error function is negative until approximately 30,000 radians per second.

The remaining Figures are time domain plots which illustrate a 100 track seek. In each of FIGS. 32–37 the track seek is initiated at 1 millisecond on the plots shown. FIG. 32 illustrates the position error signal in tracks versus milliseconds. FIG. 33 illustrates the track error in tracks versus milliseconds. FIG. 34 illustrates the velocity profile in tracks versus milliseconds. FIG. 35 illustrates the velocity tachometer output from gain stage 304 in tracks versus milliseconds. FIG. 36 shows voice coil motor current in milliamps versus milliseconds, and FIG. 37 shows PZT voltage in volts versus milliseconds. It can be seen that the microactuator voltage saturates, which means that the microactuator is fully extended in the direction of the track seek. The transducer arrives on track slowly and the microactuator slowly pulls the back of the actuator arm over the track such that the microactuator is centered relative to the voice coil motor.

FIG. 38 is a block diagram of another control system 500 in accordance with another embodiment of the present invention. A number of the elements shown in FIG. 38 are similar to those shown in FIGS. 8, 9, 21 and 22, and are similarly numbered.

However, a number of differences are apparent. For instance, it may be desirable to improve seek times for short seek lengths, such as seek lengths up to approximately 120 tracks in distance, but not limited thereto. It may also be desirable to cancel repeatable runout. It has been found that control system 500 works better for short seeks, long seeks, tracks settle and track follow, with the observer 402 staying active all of the time. Control system 500 also includes model circuit 502, repeatable runout canceller 504, multi-rate control switch 506, and notch filters 508 and 510, which have been moved from the PES path output from plant 152 to the individual PZT and VCM paths provided to the input of quantizers 310 and 318.

Profile generator 170' operates substantially the same way as profile generator 170, for long tack seeks. However, for shorter track seeks (such as less than 80 tracks in distance) reference model 502 is switched into the circuit using switches 512 and 514. Model 502 includes reference model block 516, current gain stage 518, tachometer gain stage 520, position gain stage 522, four way summer 524, PZT curve generator 526, clock 528 and current wave curve generator 530.

Reference model 516 and curve generators 526 and 528 generate time domain waveforms for the microactuator voltage and voice coil motor current which are optimized for different short seek lengths. Thus, model 502 and position circuit 258 are switched into the microactuator and VCM paths using switches 512, 514 and 260 for short length track seeks, and non-linear gain stage 256 in profile generator 170' is switched out. Further, since the output to position gain stage 522 is VCM position only, and the output to position gain stage 258 includes both VCM and microactuator position, this is accounted for by providing position gain circuit 532 which corresponds to the microactuator position which can then be accounted for in the output from model 502 to the VCM path.

In system 500, observer 402 is in the circuit during all modes and model 502 is in the circuit during model reference seeks. The states (velocity and position) that are used to drive the voice coil motor and microactuator are calculated appropriately. It should be noted that the rest of control system 500 is provided with the estimated position and velocity from the model or observer, rather than the measured PES signal from plant 152.

Multi-rate control switch 506 is used for correction during valid PES times. For instance, in an embedded servo system, when a valid PES sector is encountered on the disc surface, switch 506 switches in the PES signal such that the states calculated by the observer can be corrected at the valid PES sample times. This allows the actuator states to be corrected only when valid correction data can be obtained.

FIG. 38 also shows that control system 500 includes repeatable runout (RRO) canceller 504. In one illustrative embodiment, RRO canceller 504 is simply implemented as a conventional least mean square (LMS) algorithm which is used for canceling repeatable runout in the actuator states. Of course, any other suitable repeatable runout canceller can be used as well.

FIGS. 39, and 39-1 to 39-4 (collectively referred to as FIG. 39) illustrate control system 500 in greater detail. A number of the items illustrated in FIG. 39 are similar to those shown in FIGS. 8, 9, 21 and 22 and are similarly numbered. It should also be noted that, in FIG. 39, repeatable runout canceller 504 is not illustrated.

It can be seen in FIG. 39 that switch circuit 506 includes switch 600, summers 602 and 604, switch 606, delay unit 608, and delay unit 608. Switch 600 receives a zero at one of its inputs and the error between the estimated position and the actual position from summer 426 at its other input. When a valid PES sample occurs, switch 600 selects the output of summer 426. During multi-rate times, switch 600 selects the zero output. Switch 600 provides, at its output, the feedback within the observer 402. Therefore, observer 402 calculates the velocity and states at both the valid PES sample times and at the mulitrate times. However, the correction value is only provided through switch 600 (from summer 426) at times when a valid PES sample exists. Of course, the characteristics of switch circuit 506 will vary, depending upon the times at which valid PES signals are obtained, to provide the PES signal only when valid.

Model 502 will now be discussed in greater detail. VCM current wave generator 530 and microactuator curve generator 526 are implemented in the illustrative embodiment, as look-up tables. The tables include input values, which are input to the microactuator and VCM paths, respectively, which are provided for short track seeks, such as seeks up to approximately 120 tracks in distance, but not limited thereto. These values are optimized outputs to the microactuators and VCM for the different track seeks for which they are calculated. The output from look-up table 526 is illustratively a value indicative of a microactuator voltage, while the output from look-up table 530 is illustratively a value indicative of a VCM current.

The microactuator voltage is provided to switch 514 which switches in the output from look-up table 526 during short track seeks and switches it out during other disc drive modes. The output from look-up table 530 is provided as a current value to model reference circuit 516. It is also provided to gain stage 518 which is a VCM current gain stage which provides its output to summer 524. Model reference circuit 516 acts as a double integrator to digitally integrate the current value input once, and then a second time, to obtain VCM velocity and position and provide those outputs to gain stages 520 and 522. The gain stages 520 and 522 provide velocity and position signals, respectively, to 4-way summer 524.

The VCM model output must also account for the movement of the microactuator. Therefore, an output from observer 402, which observes and simulates the microactuator path through low pass filter 418 is provided through gain stage 532. The output of gain stage 532 is also provided to 4-way summer 524 such that the movement corresponding to the microactuator is accounted for in the VCM path. Switch 512 is also provided and is used to switch the output from the model into the VCM path during short track seeks and to switch it out of the VCM path during other disc drive modes.

Profile generator 170' is similar to profile generator 170 illustrated in the previous figures and operates in a similar fashion. However, profile generator 170' includes switch 620, as well as AND and NOT logic operators 622 and 624, respectively, all of which will be described in greater detail below. Similarly, proportional integrator 166' is similar to proportional integrator 166 except that it also includes switch 626, summing node 628, and step input 630. In addition, summer 164' is similar to summer 164 in the previous figures, except that it is a 3-way summer and also includes an input from step input 632.

A number of the operational modes of control system 500 will now be described. In track settle mode, switch 260 selects the output of gain stage 258. Also, the step function provided by step generator 650 forces switch 514 to select the output of switch 260. (These selections by switches 260 and 514 switch the output from profile generator 170' into the microactuator path rather than the output from model 502). It also forces the output of switch 512 to zero. Thus, no contribution from model 502 is provided in either the microactuator path or the VCM path. Step function 652 causes switch 620 to select the output of summer 168, and the output of switch 626 to be the desired track or the output of summer 628. Switch 352 selects zero and switch 350 selects the constant zero 1 (which also has a value of zero). Switch 330 forces the value at the bias block into unit delay 356. This initializes proportional integrator 166' with cable bias so that it is ready to be applied during track following.

In long track seek modes, the switches are selected the same as in settle except that switch 260 selects the output from non-linear gain stage 256, rather than from gain circuit 258. It should also be noted that for the step functions illustrated, step 342 is illustratively equal to step 343 and step 632 is illustratively equal to step 630. These functions represent the desired track locations, which, in the time plots described below, show a one-track move followed by a 99-track move. As described previously, step functions 338 and 340 place the proportional integrator 166' in the configurations mentioned above for seek, settle and track follow modes. The "AND" and "NOT" logic operators 622 and 624 are provided to guarantee that once a long seek reaches a track follow mode, controller 500 stays in the track follow mode.

In a short seek mode (such as a seek of 120 tracks or less) model reference feed forward seeks are performed. The switches are set in the following ways: Step function 652 forces the outputs of switches 620 and 626 to zero. With the output of switch 620 set to zero, switch 260 selects the output of gain stage 258. The step function 650 forces switch 514 to select an input from look-up table 526. Step function 650 also causes switch 512 to select the output of 4-way summer 524 in model reference 502. The switches in proportional integrator 166' are selected in the same way as mentioned for settle or long seek modes.

Since short seeks are done by feed forward, the VCM current and microactuator voltage are time driven. As discussed above, look-up table 526 provides a signal indicative of microactuator voltage as a function of time and look-up table 530 provides a signal indicative of VCM current as a function of time. The model reference circuit 516 illustratively digitally integrates the current once to obtain the velocity output and then a second time to obtain the position output. Gain stage 518 is scaled appropriately to produce the desired current through the voice coil motor. Gain 522 illustratively equals gain 258, gain 520 illustratively equals tachometer gain stage 304 and gain stage 532 illustratively equals gain 258 as well. The feed forward signals from the two look-up tables drive the two actuators open loop. Any error between the two velocity terms (the model reference velocity and the estimated velocity provided by observer 402) or the three position terms (the estimated microactuator or fine position provided by the observer, the estimated coarse and fine position provided by the observer and the model reference, coarse position) is fedback to close the loop.

The remainder of the FIGS. 401 through 56 are somewhat similar to previous figures, but are provided in the context of control system 500, for the sake of completeness.

FIGS. 401 and 402 are a bode plot and phase diagram, respectively, from the non-inverting input of summer 162' to the estimated position provided at the output of summer 424. FIGS. 40-1 and 40-2 assume that the output of switch 260 is not connected, the output of switch 512 is zero and switch 514 is not connected to gain stage 262. It is also assumed that the notch filters 508 and 510 have gains of unity at the frequencies of interest.

FIGS. 41-1 and 41-2 are a bode plot and phase diagram, respectively, from the input of gain stage 262 to the estimated position output provided by observer 402. The observer and tachometer gains are present and the assumptions made with respect to FIGS. 40-1 and 40-2 are made for FIGS. 41-1 and 41-2 as well.

FIGS. 42-1 and 42-2 are a bode plot and phase diagram, respectively, from the output of summer 168 through gain stage 258 to the estimated position signal provided at the output of observer 402. Both paths (the VCM and microactuator paths) are being driven at the same time. Switch 514 selects the output of switch 260 and the output of switch 512 is set to zero.

FIGS. 43-1 and 43-2 show the response of non-linear gain stage 256. The response is plotted in counts per count, where one count input is equivalent to one track.

FIGS. 44-1 and 44-2 plot VCM velocity in inches per second and current in milliamps versus tracks to go to the desired target track.

FIGS. 45-1 and 45-2 are a bode plot and phase diagram, respectively, for proportional integrator 166' in track follow mode.

FIGS. 46-1 and 46-2 show the VCM current and VCM velocity plotted against time. This is the VCM current and velocity output from reference model 502. The VCM current is given in milliamps and the velocity is given in radians per second, while time in both figures is given in tenths of milliseconds.

FIG. 47 shows the microactuator position 700, VCM position 702 and PES 704 in tracks versus time. FIG. 47 illustrates that the head is on track at just prior to 200 microseconds and that the microactuator is primarily responsible for moving the head to the target track so quickly. The microactuator and voice coil motor then interact to center the microactuator relative to the voice coil motor, as the voice coil motor becomes centered on track.

FIGS. 48-1 and 48-2 are a bode plot and phase diagram, respectively, for notch filters 508 and 510. The overall open loop bode plot and phase diagram for control system 500 are illustrated in FIGS. 49-1 and 49-2, respectively. It should be noted that high phase margin is obtained at the OdB crossover point. FIGS. 50-1 and 50-2 show a bode plot and phase diagram, respectively, for the error function of the entire control function 500. It can again be seen that the error function stays negative until approximately 30,000 radians per second.

The remaining time domain plots show a one track seek at time equals zero followed by a 99 track seek starting a time equals 1.5 milliseconds. FIG. 51 shows the position error sample, FIG. 52 shows track error, FIG. 53 shows velocity profile, FIG. 54 shows the output of velocity tachometer gain stage 304, FIG. 55 shows VCM current, and FIG. 56 illustrates microactuator voltage. It can be seen that the microactuator voltage saturates on long seeks which, as with the previous embodiments, indicates that the microactuator is fully extended in the direction of the long seek. The microactuator arrives on track and slowly pulls the back of the actuator arm over the track.

A servo control system 400, 500 controls a dual stage actuator 152 in a disc drive 110 having a data head accessing information on a disc surface 112. The dual stage actuator includes a coarse actuator 120 and at least one fine actuator 127. A fine actuator driver circuit is coupled to the fine actuator 127 to drive the fine actuator 127. A coarse actuator driver circuit is coupled to the coarse actuator 120 to drive the coarse actuator 120. A feedback circuit receives a position signal (PES) indicative of a measured head position, based on position information read by the data head. The feedback circuit compares a desired head position to the measured head position. An observer 402 is coupled to the feedback circuit to receive signals provided to the fine and coarse actuators 120 and 127 to provide an estimated signal to at least one of the fine actuator driver and the coarse actuator driver circuits. The observer 402 estimates response of the fine and coarse actuators.

In one illustrative embodiment, the observer includes a coarse actuator observer 402 portion and a fine actuator observer portion 418. The coarse actuator observer portion simulates a response of the coarse actuator 120 and the fine actuator portion 418 simulates a response of the fine actuator 127.

The observer 402, in one illustrative embodiment, provides the estimated signal to the coarse actuator 120 and accounts for an estimated response of the fine actuator 127 in providing the estimated signal to the coarse actuator 120.

In another illustrative embodiment, the fine actuator 127 is a microactuator which provides less physical movement at high frequencies. Therefore, the fine actuator portion 418 of the observer 402 is implemented as a low pass filter.

In another illustrative embodiment, the observer 402 includes a feedback circuit through gain stages 414 and 416 which feeds back an error value indicative of a difference between the estimated signal and measured head position.

In one embodiment, the feedback circuit is selectively coupled to the coarse and fine actuator drivers and the control system 500 further includes a reference model 502 which selectively provides a fine actuator output to the fine actuator driver and a coarse actuator output to the coarse actuator driver. The reference model 502 is illustratively selectively coupled to the coarse and fine actuator drivers to provide the coarse and fine actuator output to the coarse and fine actuator drivers for track seeks in a given range.

In one illustrative embodiment, the outputs from the model 502 provide signals to accommodate the track seek according to a desired fine actuator profile and a desired coarse actuator profile, based on the number of tracks in the track seek operation.

In another illustrative embodiment of the present invention, the observer 402 receives input signals which are also inputs to the coarse and fine actuators and estimates a response of the coarse and fine actuators and provides an estimated position signal and an estimated correction signal to at least one of the coarse and fine actuator drivers.

In still another embodiment, the servo control system 400, 500, includes a multi-rate control circuit 506 which switches in a correction value, based on the position information read from the disc surface, to correct the estimated output from the observer 402 based on the position information. The multi-rate control circuit 506 also illustratively switches out the correction value so the estimated output remains uncorrected during time periods when the position information is unavailable.

In yet another embodiment of the present invention, the control system 400, 500, includes a repeatable runout canceller 504 which receives position information from the data head and provides a runout cancellation value to the coarse actuator driver.

Although the present invention has been described with reference to preferred embodiments, workers skilled in the art will recognize that changes may be made in form and detail without departing from the spirit and scope of the invention.

What is claimed is:

1. A servo control system for controlling a dual stage actuator in a disc drive having a data head accessing information on a disc surface, the dual stage actuator including a coarse actuator and at least one fine actuator, the servo control system, comprising:

a fine actuator driver coupled to the fine actuator to drive the fine actuator;

a coarse actuator driver coupled to the coarse actuator to drive the coarse actuator;

a feedback circuit receiving a position signal, indicative of a measured head position, based on position information read by the data head and comparing a desired head position to the measured head position; and an observer coupled to the feedback circuit to receive signals provided to the fine and coarse actuators and to provide an estimated signal to at least one of the fine actuator driver and the coarse actuator driver to estimate response of the fine or coarse actuator.

2. The servo control system of claim 1 wherein the observer comprises:

a coarse actuator observer portion simulating a response of the coarse actuator; and a fine actuator portion simulating a response of the fine actuator.

3. The servo control system of claim 2 wherein the observer provides the estimated signal to the coarse actuator and accounts for an estimated response of the fine actuator in providing the estimated signal to the coarse actuator.

4. The servo control system of claim 2 wherein the fine actuator provides less movement in response to an actuation signal at increased frequencies and wherein the fine actuator portion of the observer comprises a low pass filter.

5. The servo control system of claim 1 wherein the observer comprises:

a feedback circuit feeding back an error value indicative of a difference between the estimated signal and measured head position.

6. The servo control system of claim 1 wherein the feedback circuit is selectively coupled to the coarse and fine actuator drivers and further comprising:

a reference model selectively providing a fine actuator-output to the fine actuator driver and a coarse actuator output to the coarse actuator driver.

7. The servo control system of claim 6 wherein the reference model is selectively coupled to the coarse and fine actuator drivers to provide the coarse and fine actuator outputs to the coarse and fine actuator drivers for track seeks in a given range of tracks.

8. The servo control system of claim 7 wherein the coarse and fine actuator outputs are predetermined signals to accommodate the track seek according to a desired fine actuator profile and a desired coarse actuator profile based on the number of tracks in the track seek.

9. A servo control system for controlling a dual stage actuator in a disc drive having a data head accessing information on a disc surface, the dual stage actuator including a coarse actuator and at least one fine actuator, the servo control system comprising:

a fine actuator driver coupled to the fine actuator to drive the fine actuator based on a fine actuator input signal;

a coarse actuator driver coupled to the coarse actuator to drive the coarse actuator based on a coarse actuator input signal;

an observer receiving the coarse and fine actuator input signals and estimating a response of the coarse and fine actuators and providing an estimated position signal and an estimated correction signal to at least one of the coarse and fine actuator drivers; and a feedback circuit coupled to the observer and the coarse and fine actuator drivers to provide a driver signal to the coarse and fine actuator drivers based on the estimated position signal.

10. The servo control system of claim 9 wherein the feedback circuit is selectively coupled to the coarse and fine actuator drivers and further comprising:
   a reference model selectively providing a fine actuator output to the fine actuator driver and a coarse actuator output to the coarse actuator driver.

11. The servo control system of claim 10 wherein the reference model is selectively coupled to the coarse and fine actuator drivers to provide the coarse and fine actuator outputs to the coarse and fine actuator drivers for track seeks in a given range of tracks.

12. The servo control system of claim 11 wherein the reference model is selectively coupled to the coarse and fine actuator drivers to provide the coarse and fine actuator outputs to the coarse and fine actuator drivers for track seeks within a predetermined threshold number of tracks.

13. The servo control system of claim 12 wherein the predetermined number of tracks is approximately 80 tracks.

14. The servo control system of claim 11 wherein the coarse and fine actuator outputs are predetermined signals to accommodate the track seek according to a desired fine actuator profile and a desired coarse actuator profile based on the number of tracks in the track seek.

15. The servo control system of claim 11 wherein the reference model includes a coarse actuator look-up table and a fine actuator look-up table, the coarse and fine actuator look-up tables storing profile values accessed based on the number of tracks in the track seek.

16. The servo control system of claim 11 wherein the coarse actuator output initially includes a value inclusive of fine actuator response and wherein the reference model receives a feedback signal from the observer indicative of estimated movement of the fine actuator, to accommodate for movement of the fine actuator in outputting the coarse actuator output to the coarse actuator.

17. The servo control system of claim 9 wherein the data head reads position information from a servo sector on the disc surface and provides the position information to the observer, and further comprising:
   a multi-rate control circuit switching in a correction value, based on the position information, to correct the estimated output from the observer based on the position information.

18. The servo control system of claim 17 wherein the multi-rate control circuit switches out the correction value so the estimated output remains uncorrected during time periods when the position information is unavailable.

19. The servo control system of claim 9 and further comprising:
   a repeatable runout cancellation circuit receiving position information from the data head and providing a runout cancellation value to the coarse actuator driver.

* * * * *